United States Patent
Kondo et al.

(10) Patent No.: US 7,522,748 B2
(45) Date of Patent: Apr. 21, 2009

(54) METHOD AND APPARATUS FOR PROCESSING IMAGE DATA AND SEMICONDUCTOR STORAGE DEVICE

(75) Inventors: Tetsujiro Kondo, Tokyo (JP); Hisakazu Shiraki, Kanagawa (JP); Akihiro Okumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 10/640,614

(22) Filed: Aug. 14, 2003

(65) Prior Publication Data

US 2004/0105598 A1 Jun. 3, 2004

(30) Foreign Application Priority Data

Aug. 15, 2002 (JP) .............................. 2002-274058
Aug. 15, 2002 (JP) .............................. 2002-274059

(51) Int. Cl.
  *G06K 9/00* (2006.01)
(52) U.S. Cl. ..................................... 382/107; 382/103
(58) Field of Classification Search ................. 382/103, 382/107
  See application file for complete search history.

(56) References Cited

U.S. PATENT DOCUMENTS

| | | | | |
|---|---|---|---|---|
| 6,307,888 B1 * | 10/2001 | Le Clerc | ................ | 375/240.29 |
| 6,317,819 B1 * | 11/2001 | Morton | ........................ | 712/22 |
| 6,856,701 B2 * | 2/2005 | Karczewicz et al. | ........ | 382/247 |

FOREIGN PATENT DOCUMENTS

| | | |
|---|---|---|
| EP | 1 096 791 A2 | 5/2001 |
| JP | 7-193822 | 7/1995 |
| JP | 8-116542 | 5/1996 |
| JP | 10-191352 | 7/1998 |
| JP | 2001-126061 | 5/2001 |
| WO | WO 00/45340 | 8/2000 |

OTHER PUBLICATIONS

Peter M. Kuhn, "Fast MPEG-4 Motion Estimation: Processor Based and Flexible VLSI Implementations", Journal of VLSI Signal Processing, XP-000862772, vol. 23, No. 1, Oct. 1999, pp. 67-92.
Peter M. Kuhn, "Algorithms, Complexity Analysis and VLSI Architectures for MPEG-4 Motion Estimation", XP-002408643, 1999, pp. III-VI, 24-33, and 50-53.

* cited by examiner

*Primary Examiner*—Wesley Tucker
(74) *Attorney, Agent, or Firm*—Oblon, Spivak, McClelland, Maier & Neustadt, P.C.

(57) ABSTRACT

An image processing device and an image processing method calculate motion vectors with a small amount of calculation. A frame memory stores first and second image data, a memory includes multiple elements, and a control unit. Each element includes a pixel for storing a first pixel value of a first pixel of the first image data, a pixel for storing a second pixel value of a second pixel of the second image data, a minimal pixel difference storage unit for storing a first difference value, a motion vector storage unit for storing phase information, a comparison updating unit for comparing the first difference value stored in the minimal pixel difference storage unit, with a second difference value between the first pixel and the second pixel, updating the first difference value with the second difference value according to the results of comparison, and outputting updating information according to said updating, and an updating unit for updating the phase information according to the updating information.

49 Claims, 37 Drawing Sheets

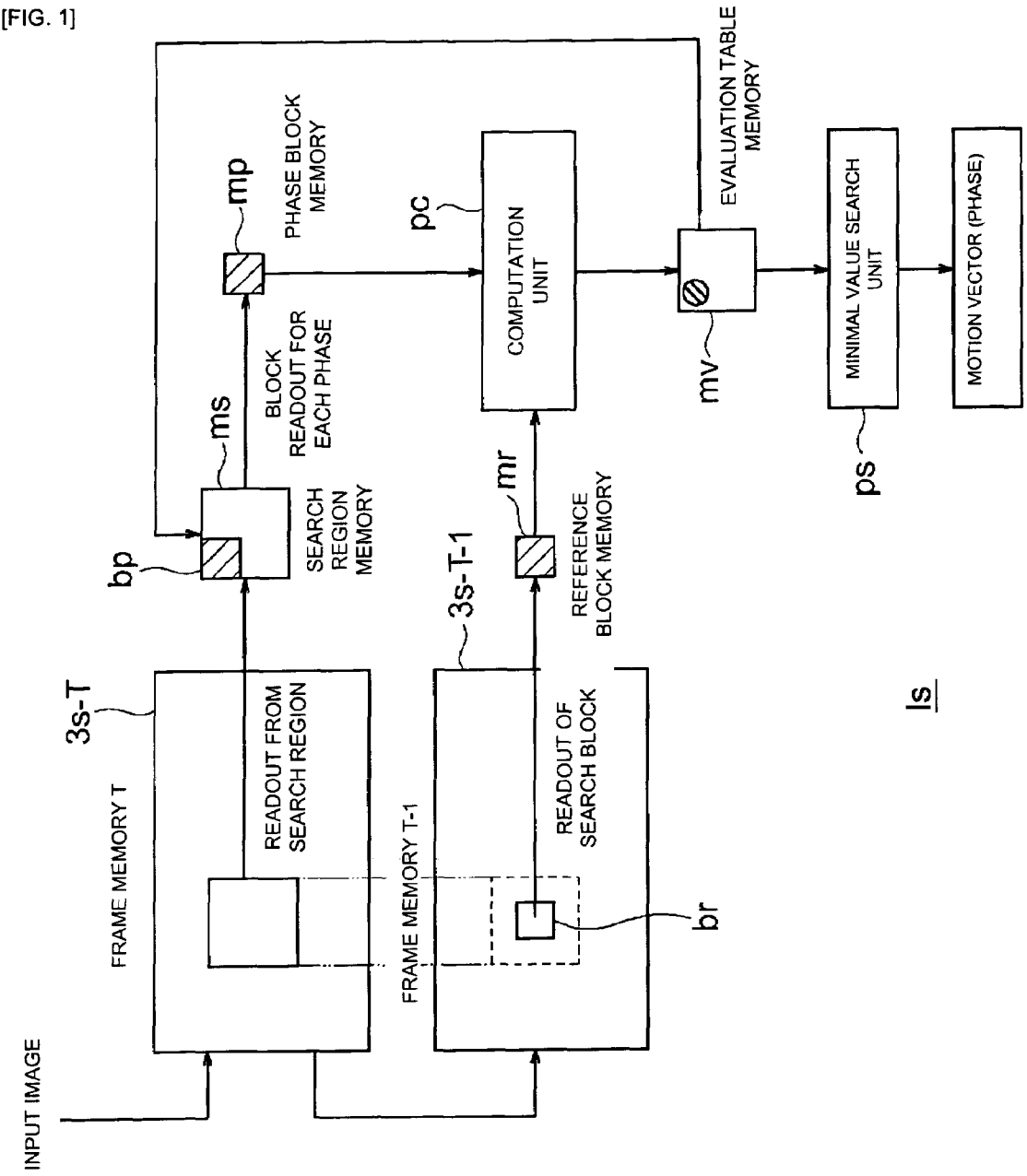

[FIG. 2]
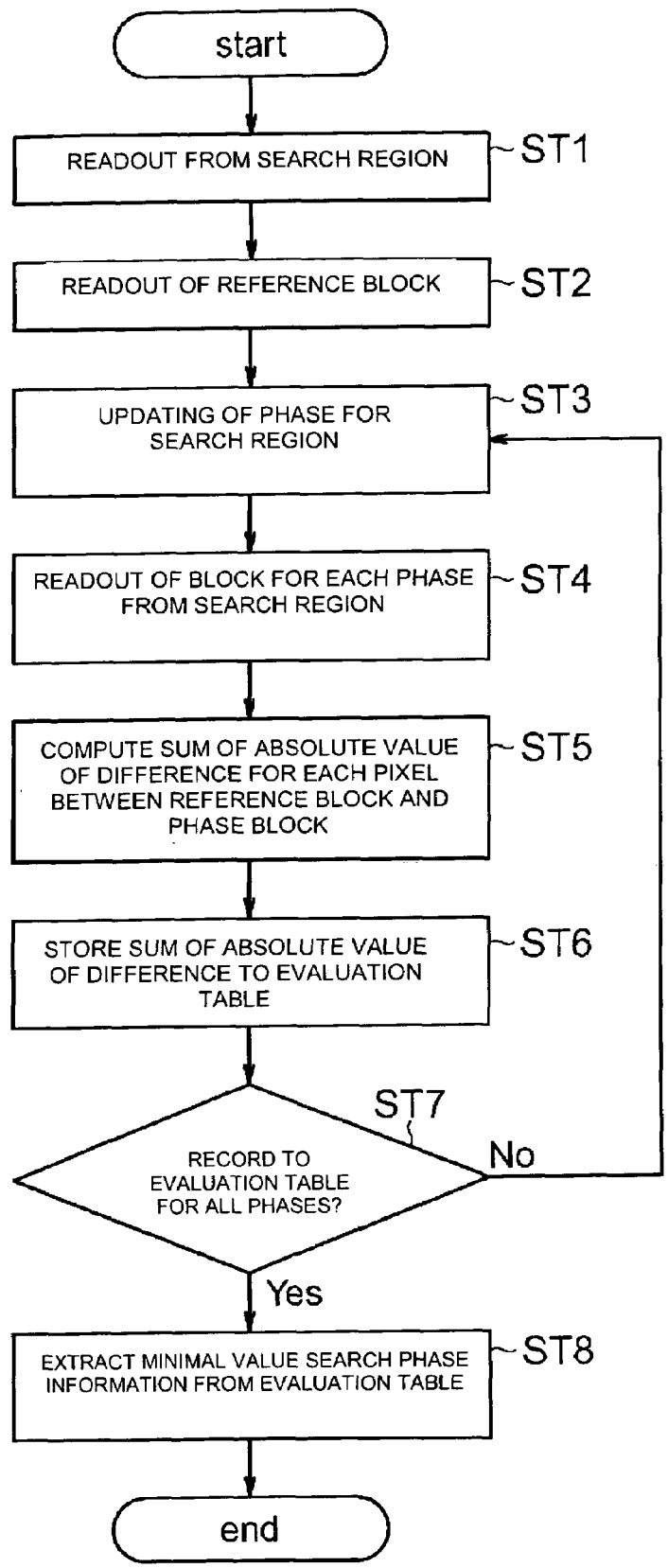

[FIG. 3]
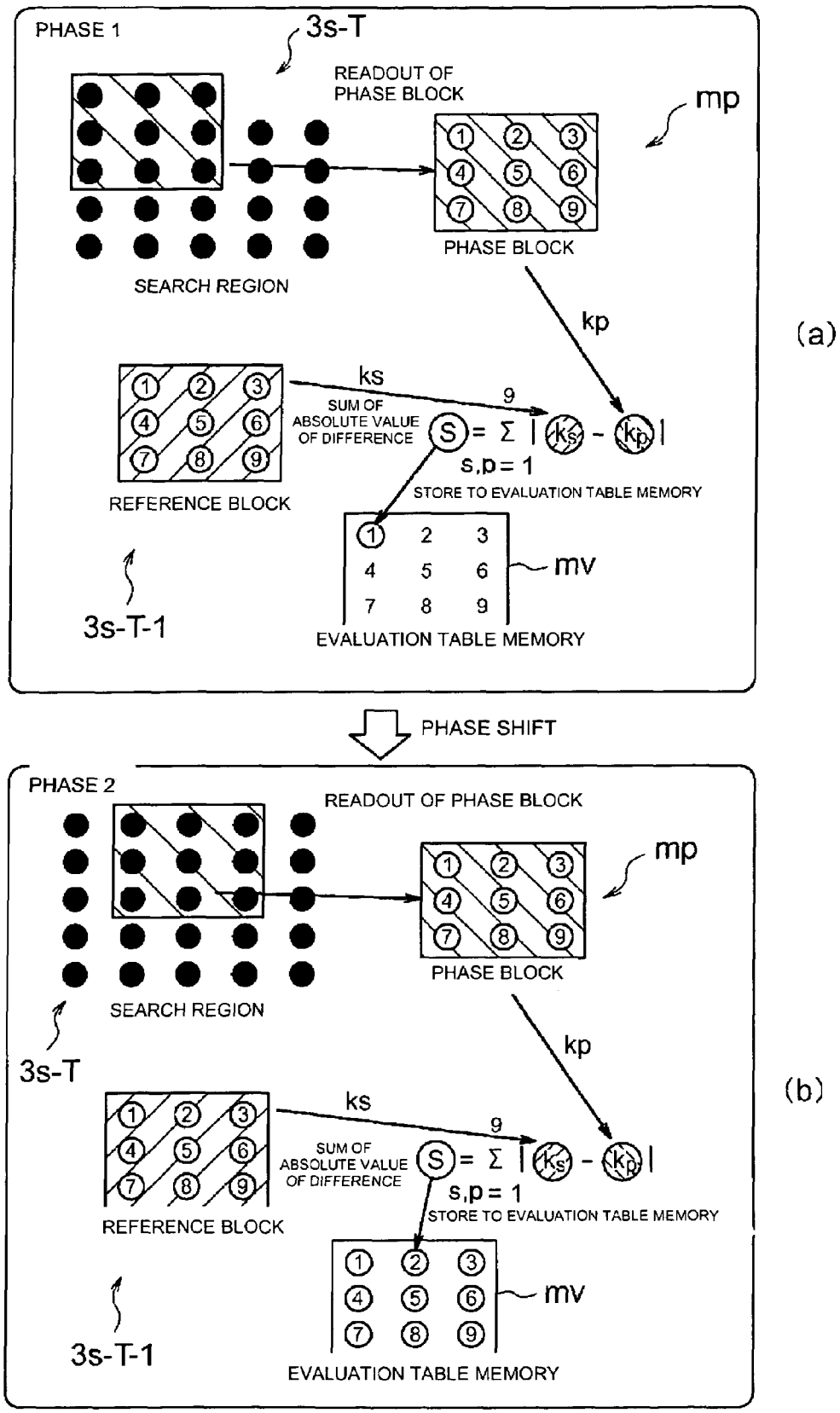

[FIG. 4]
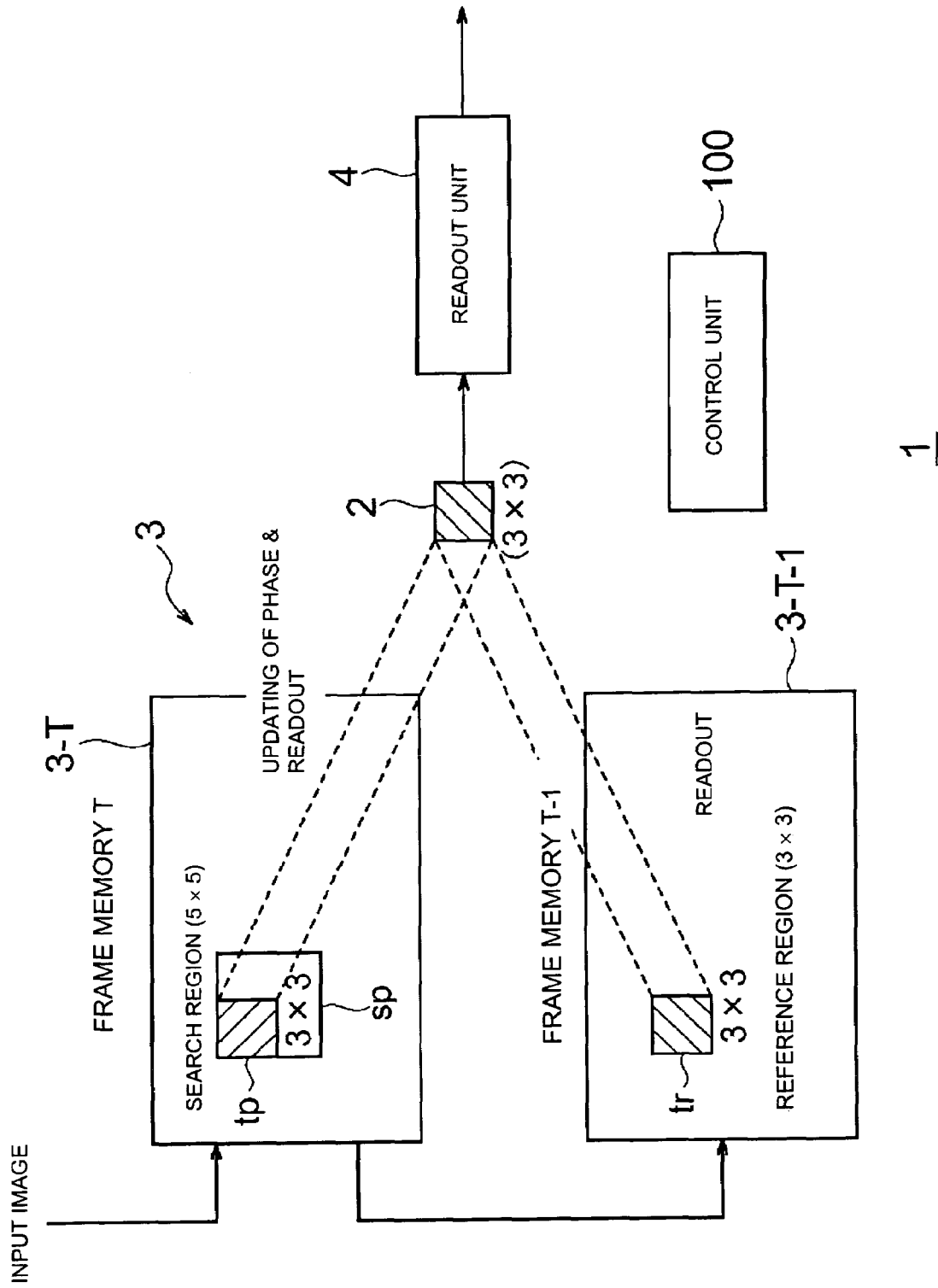

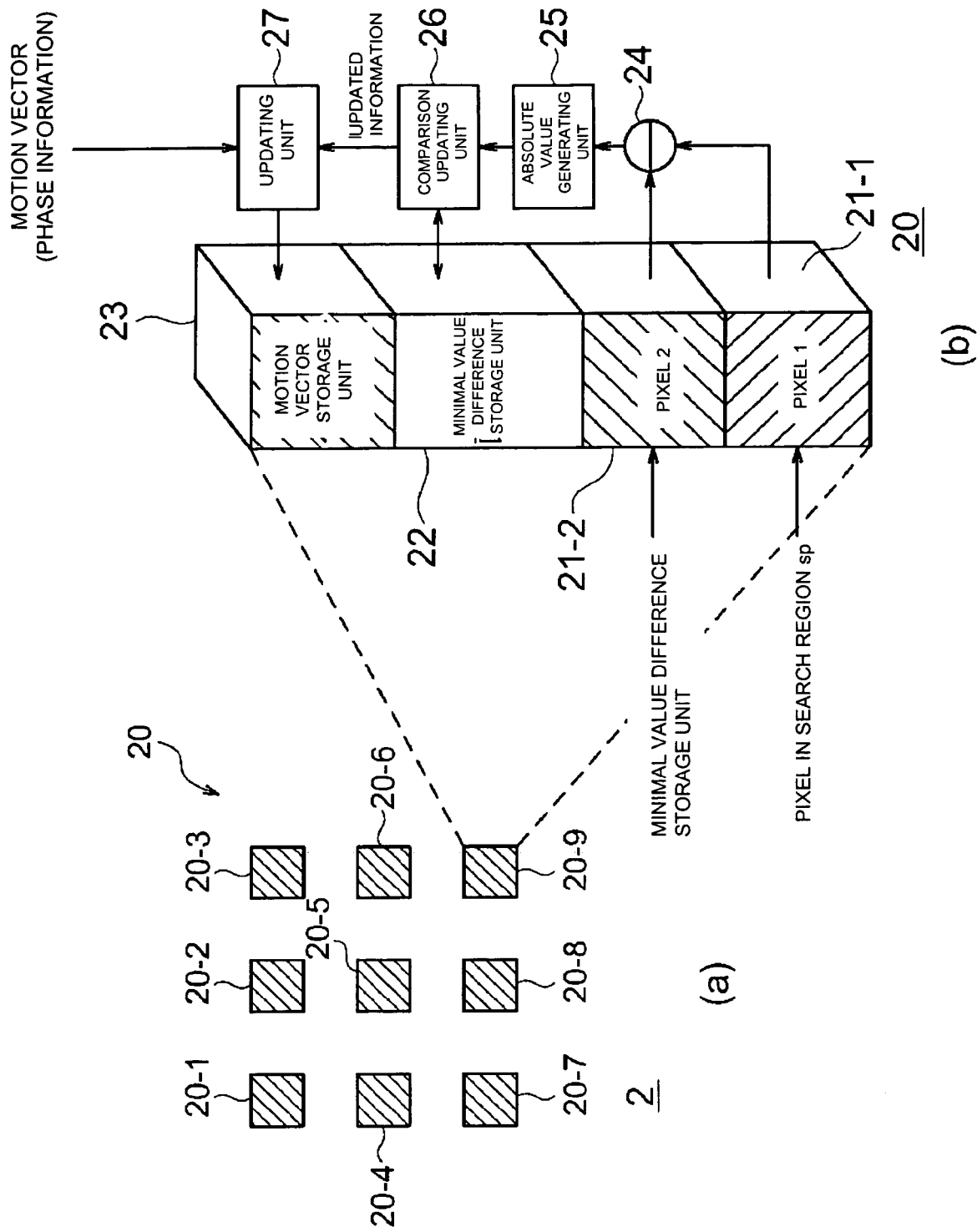
[FIG. 5]

[FIG. 6]
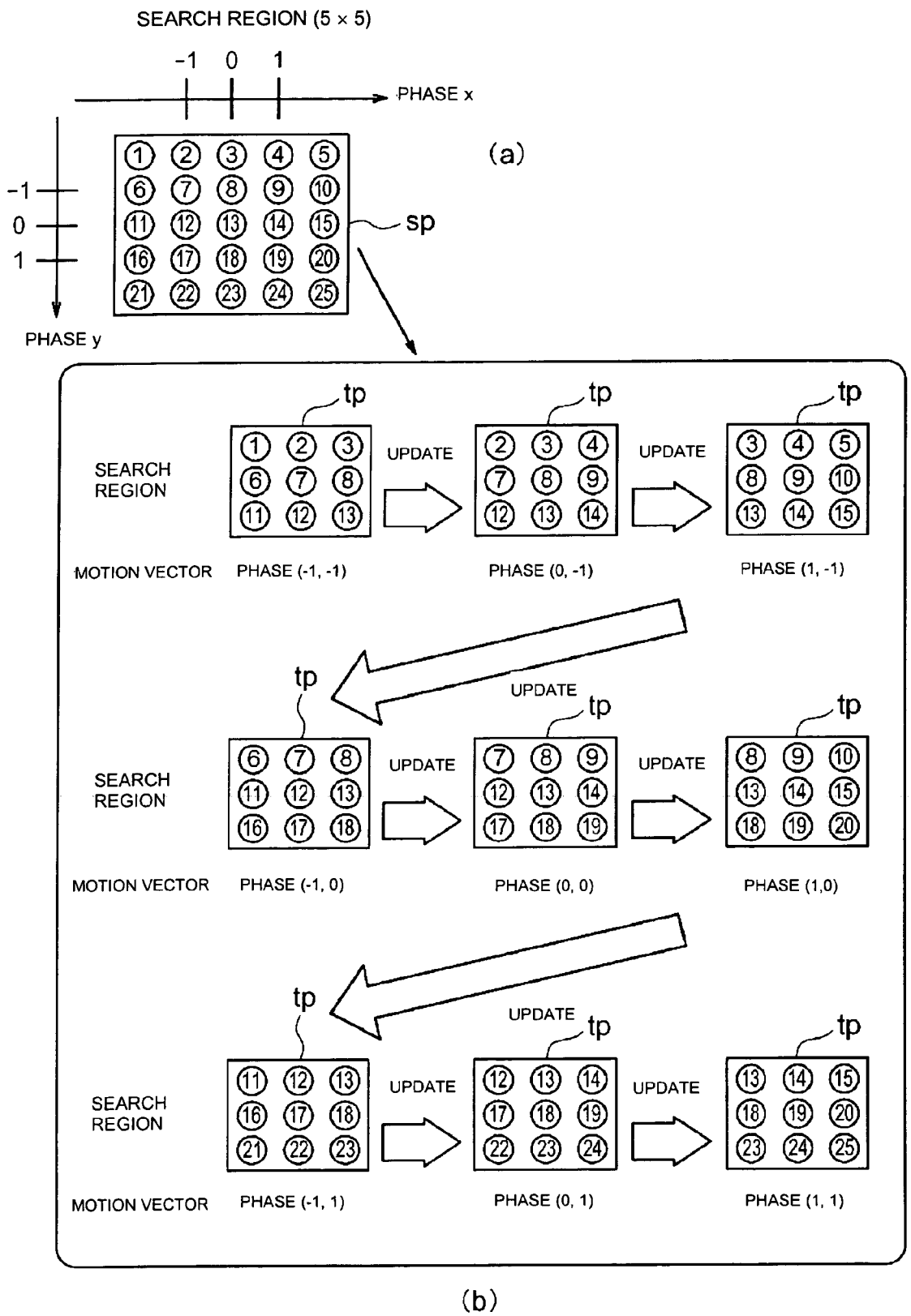

[FIG. 7]
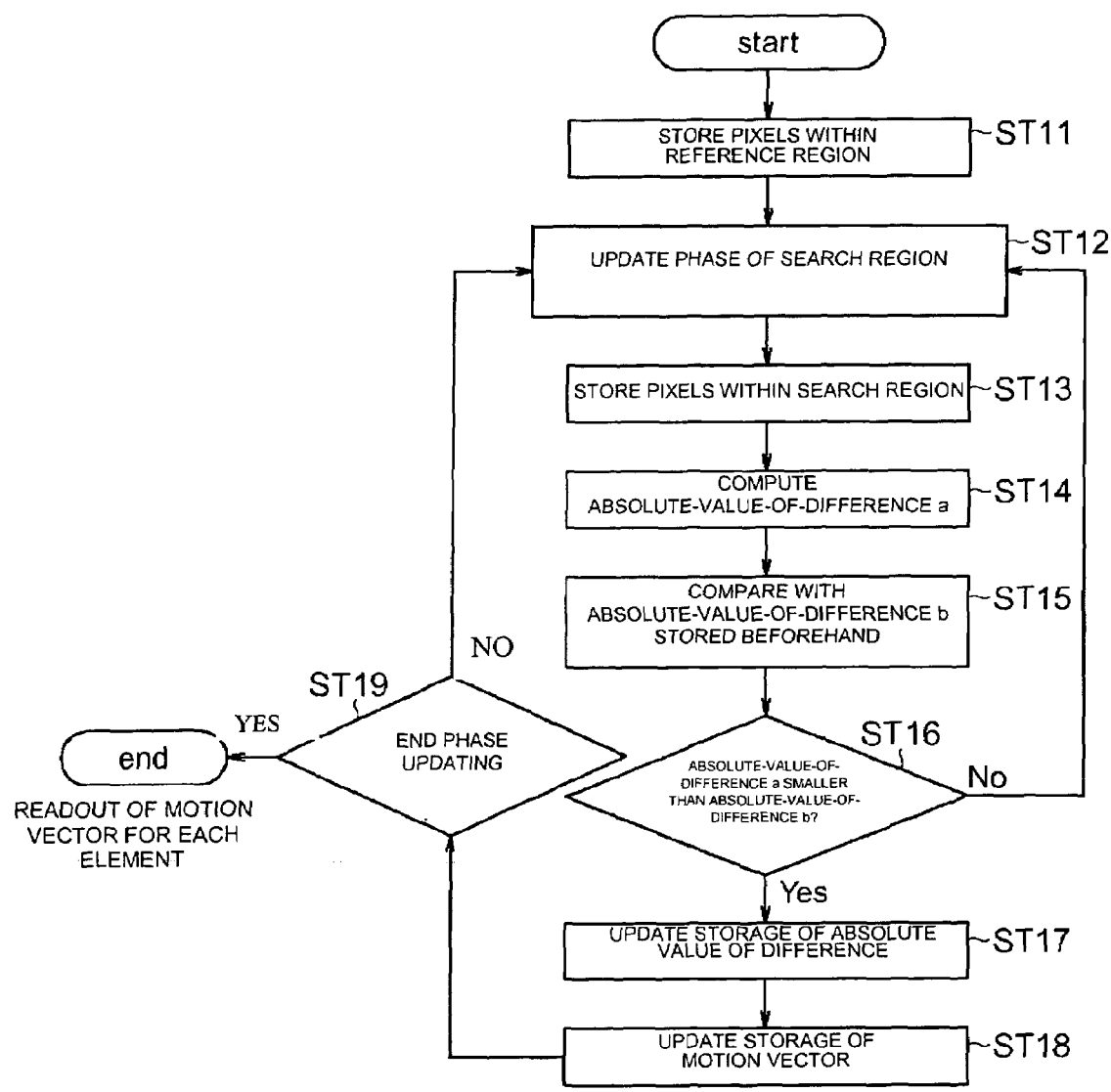

[FIG. 8]
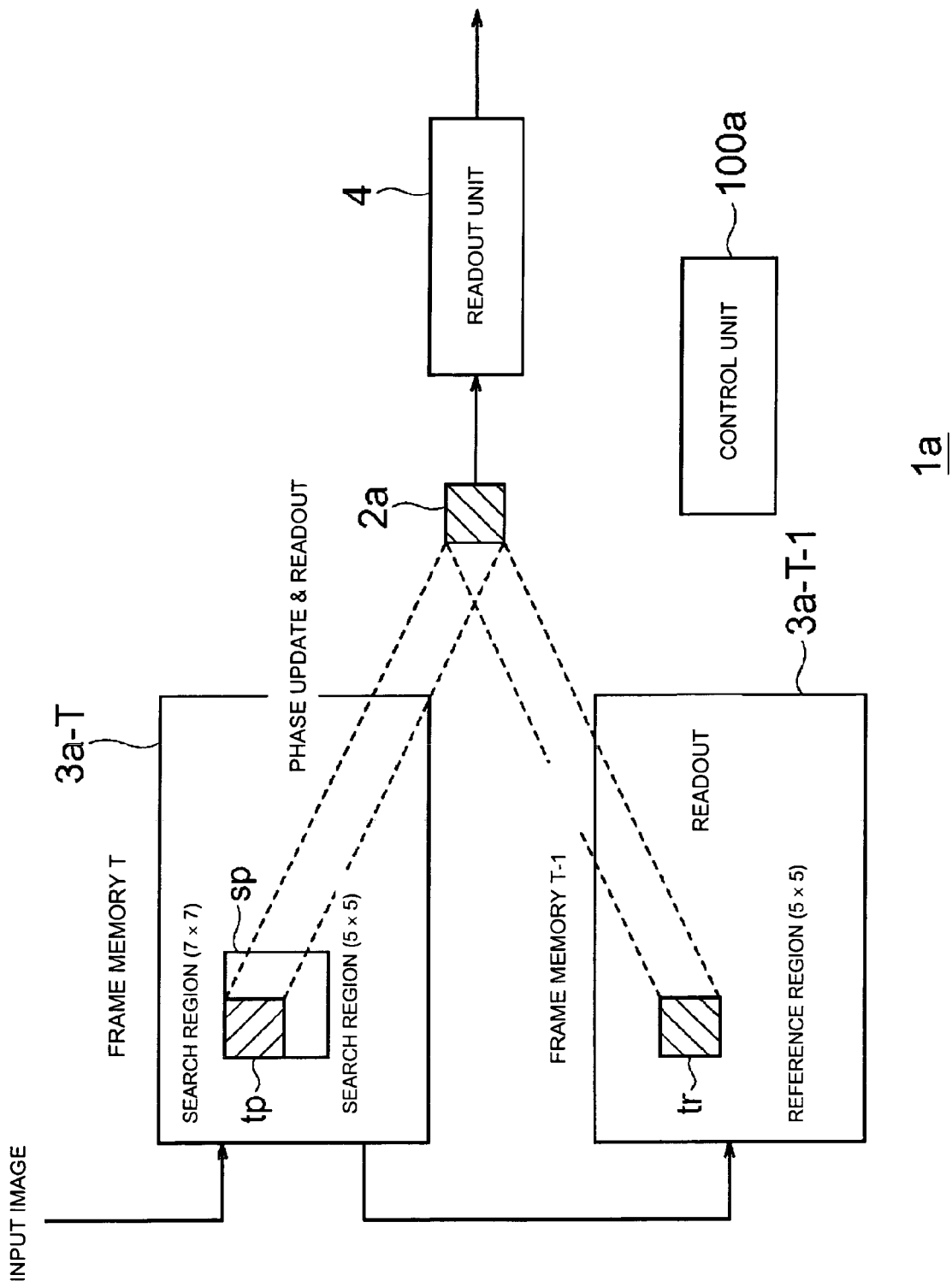

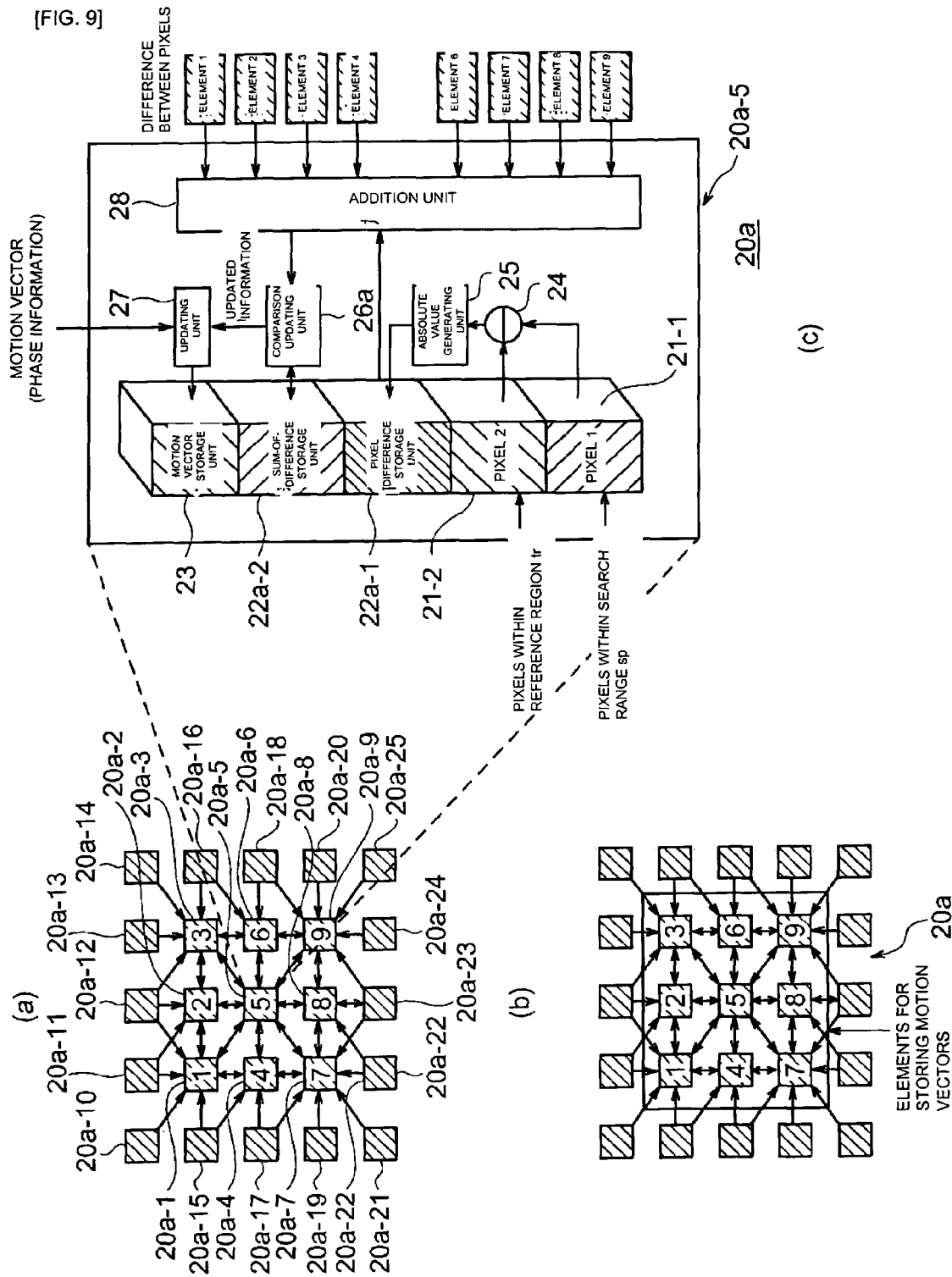

[FIG. 10]
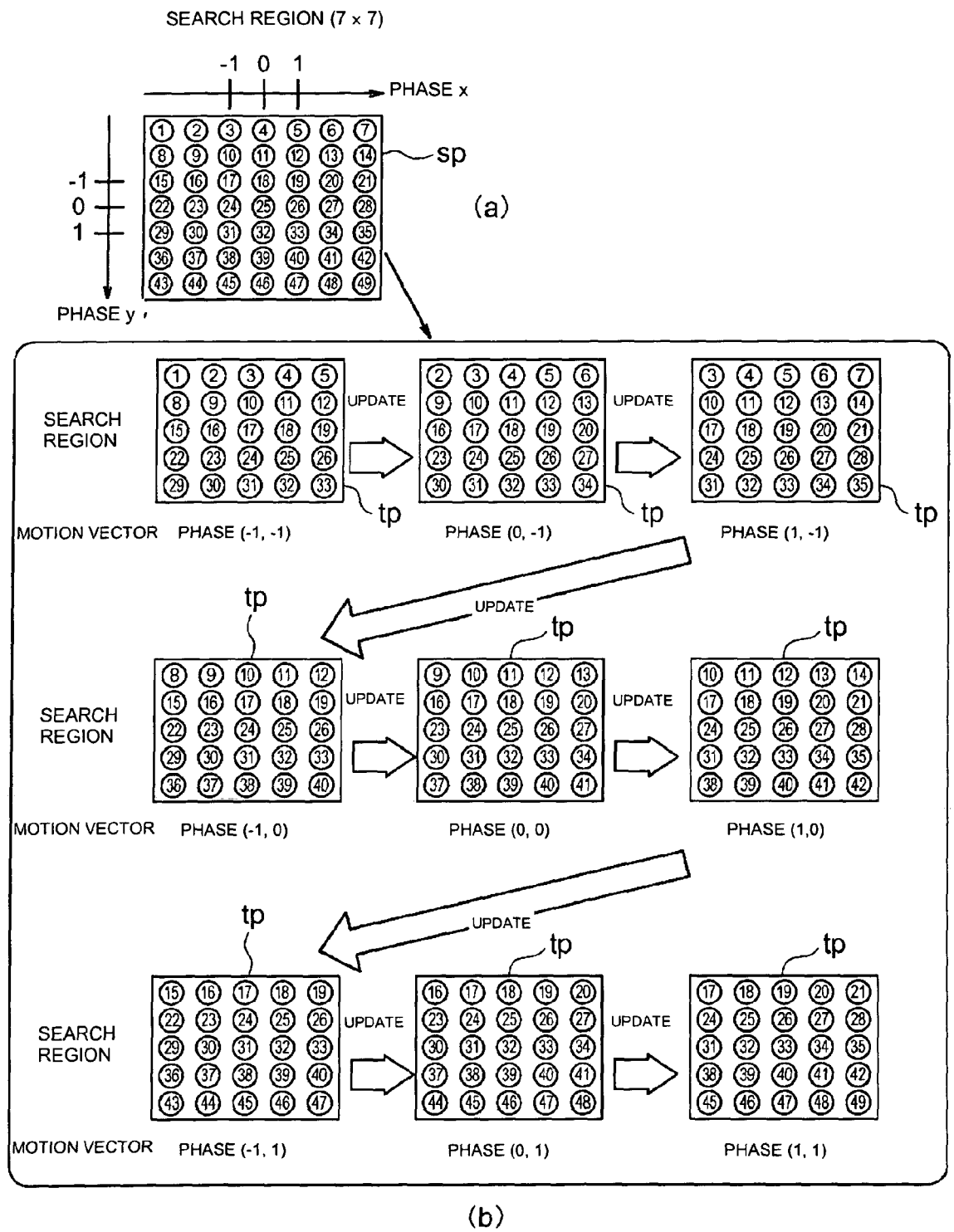

[FIG. 11]
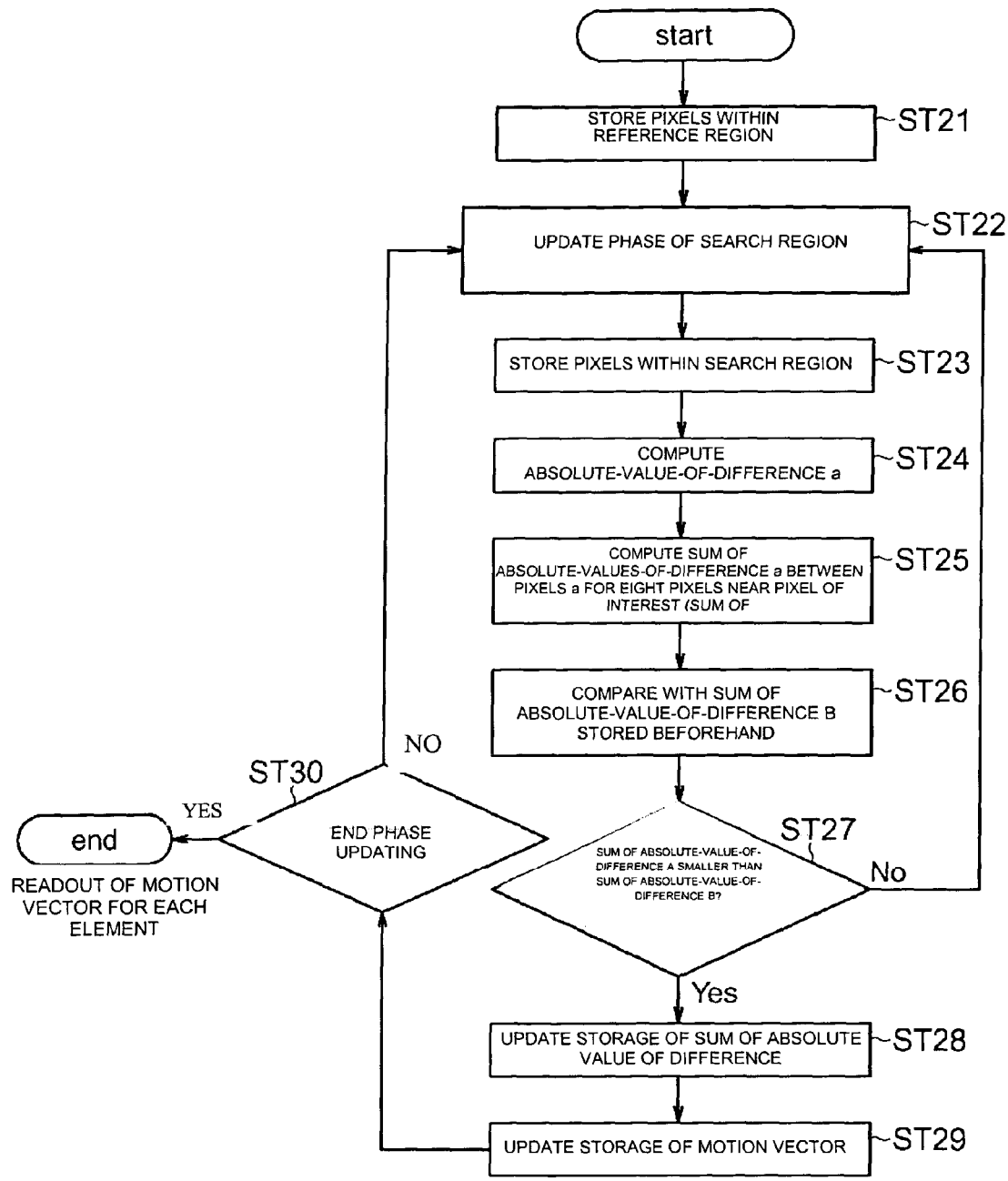

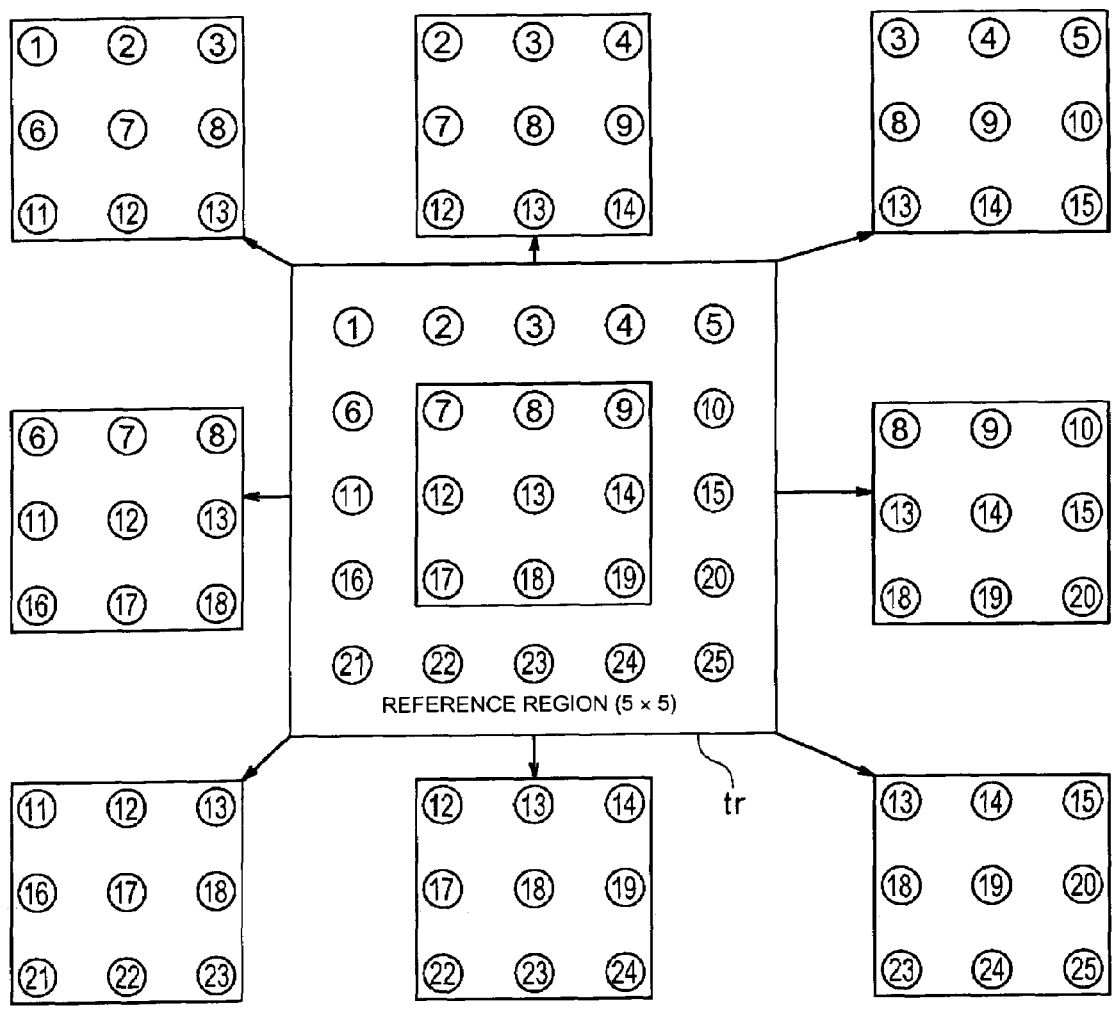
[FIG. 12]

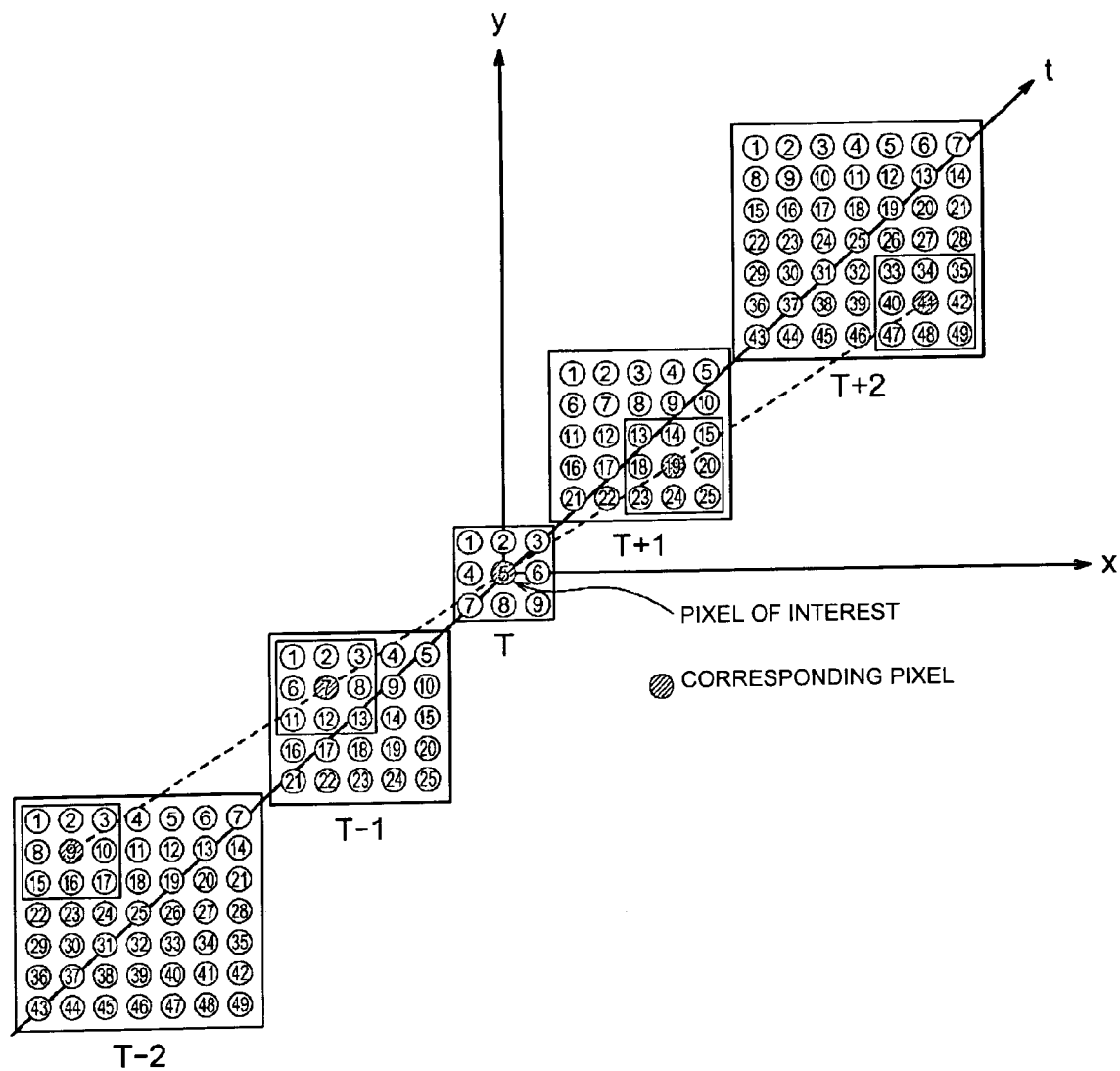
[FIG. 13]

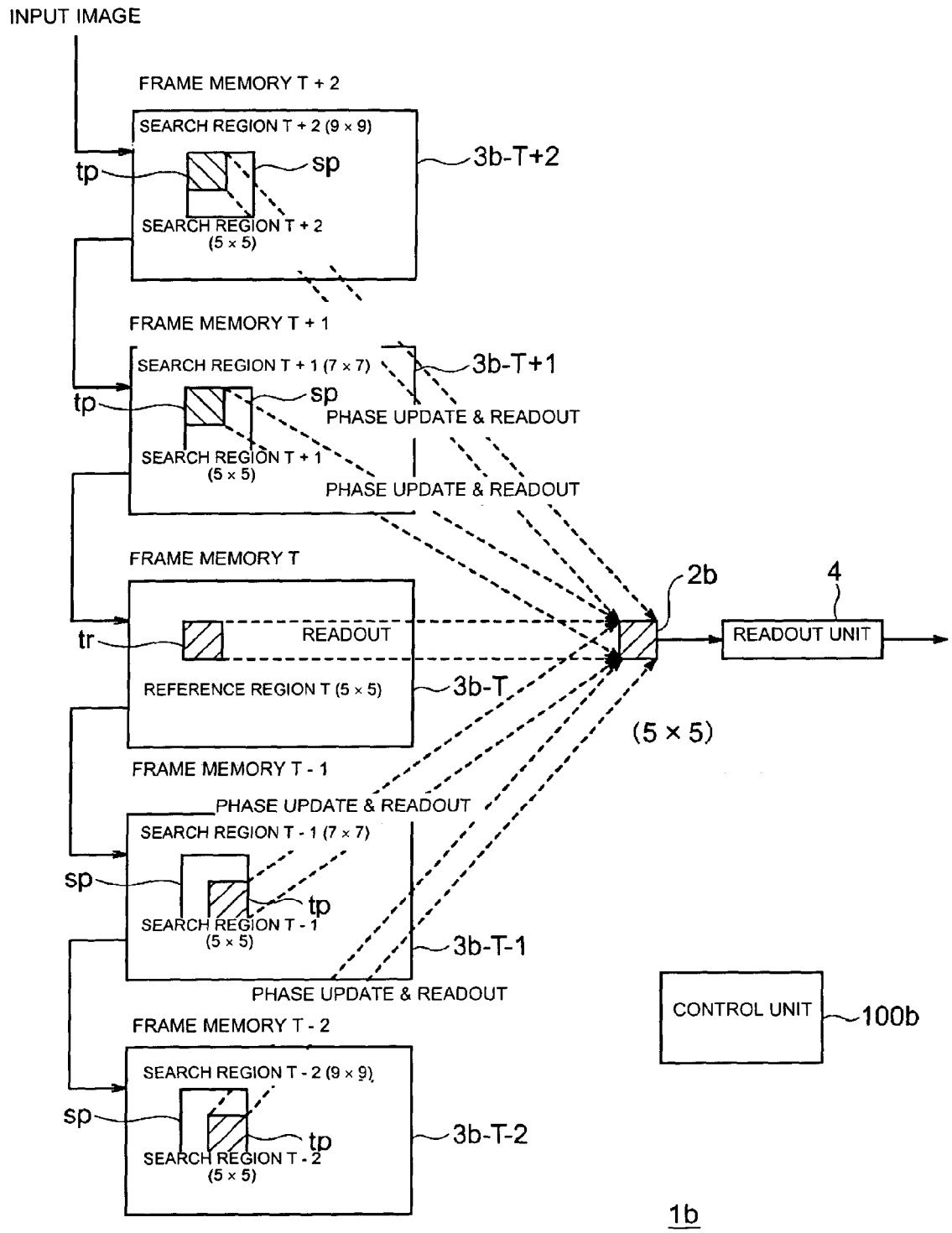
[FIG. 14]

[FIG. 15]
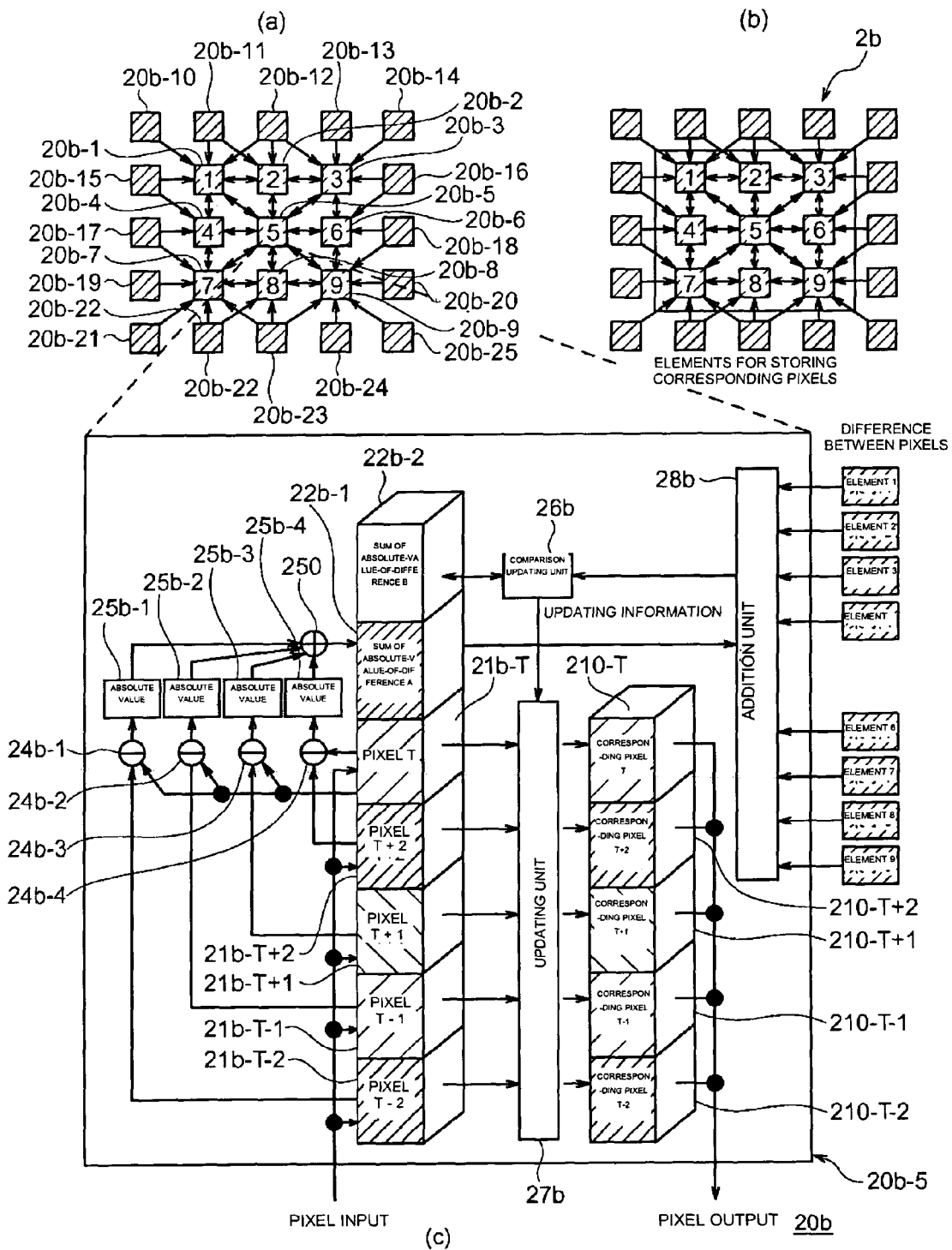

[FIG. 16]
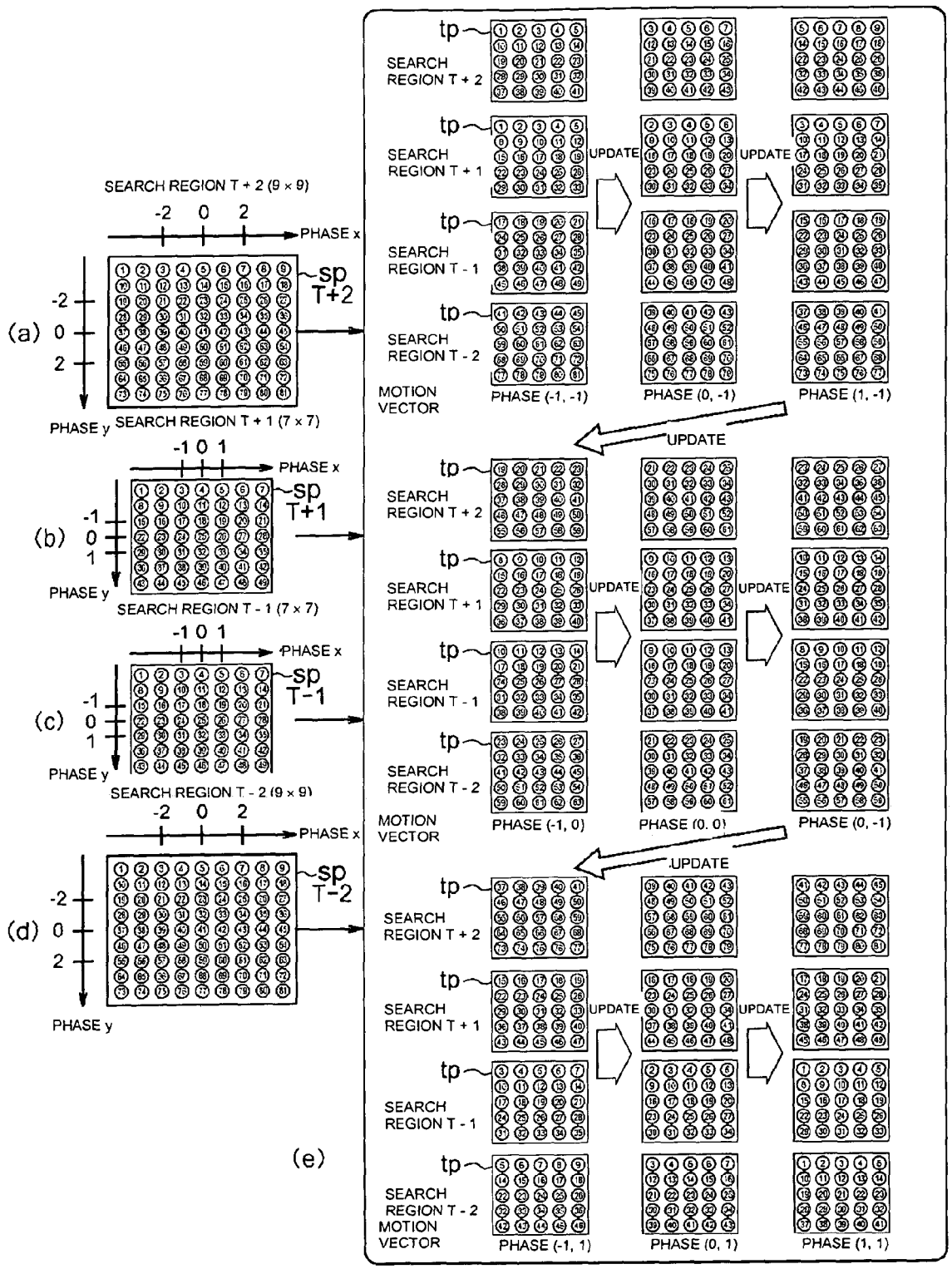

[FIG. 17]
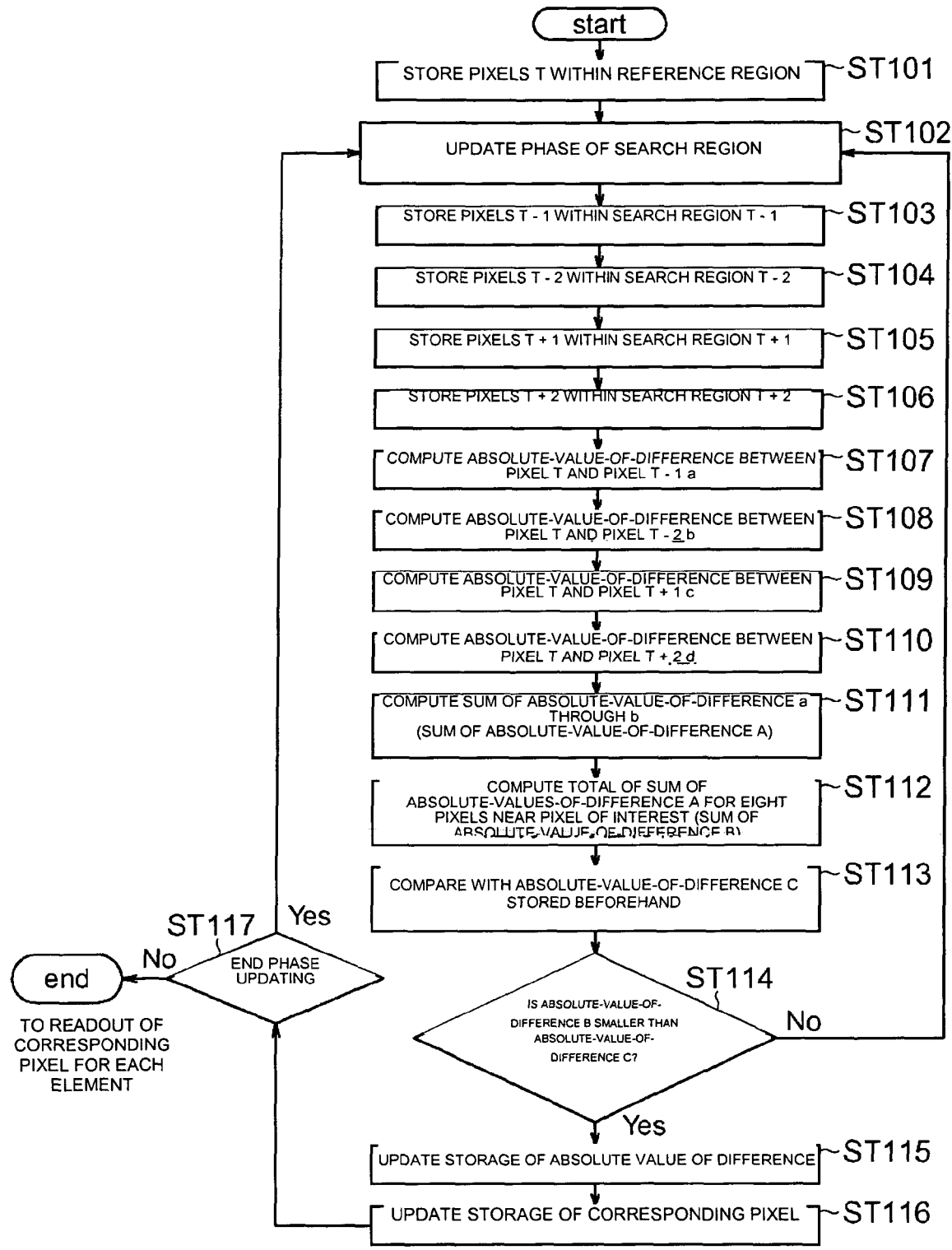

[FIG. 18]
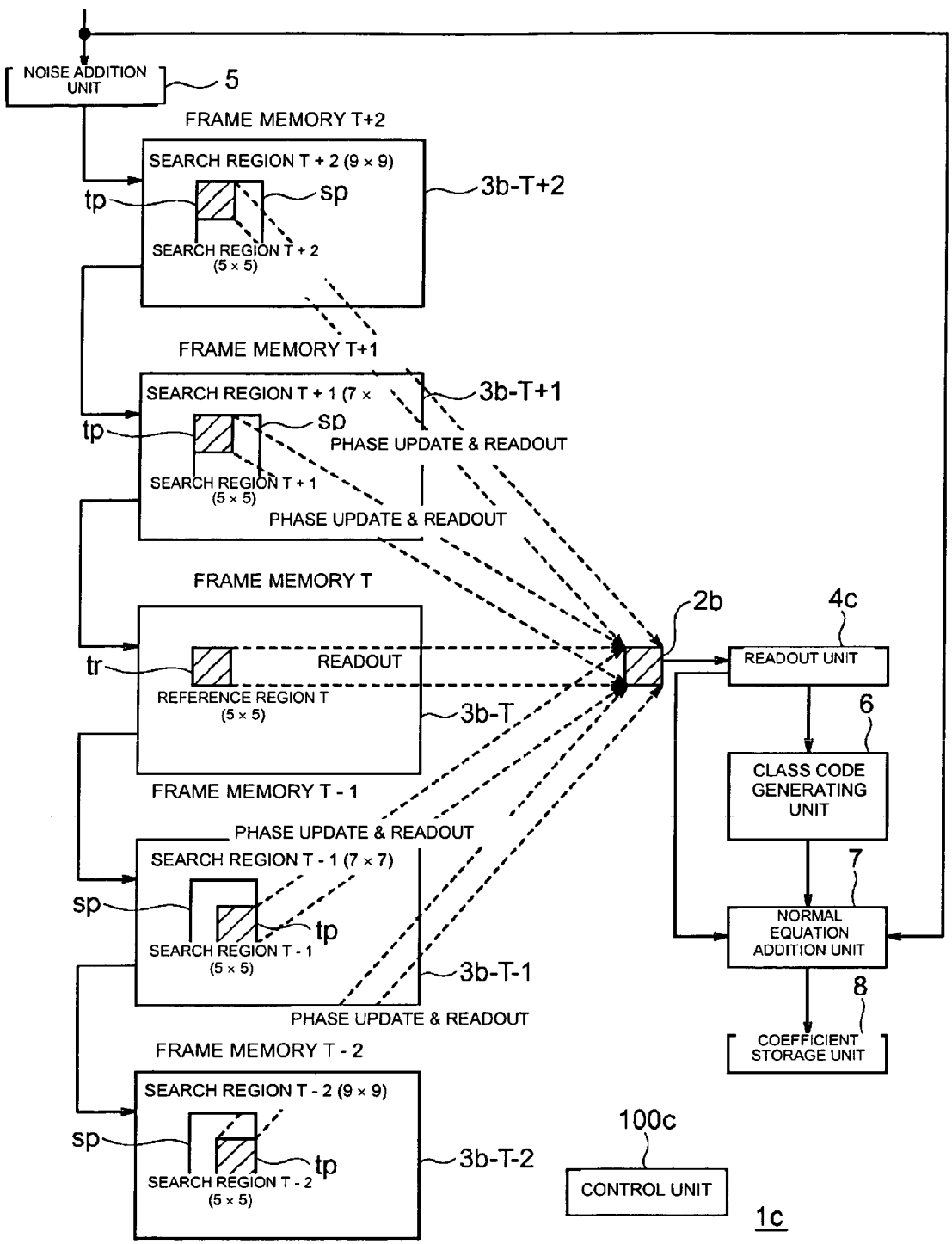

[FIG. 19]
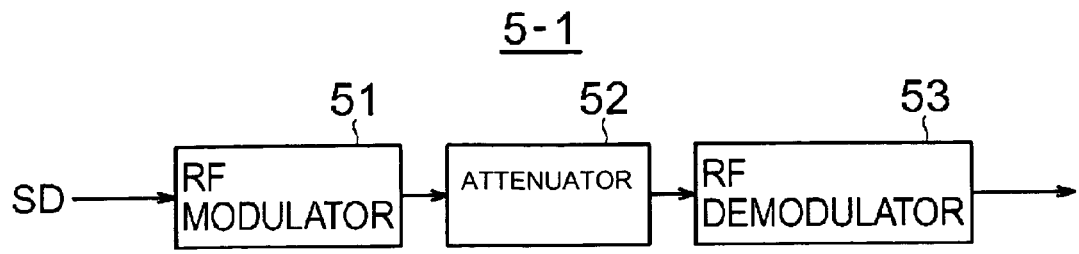
[FIG. 20]
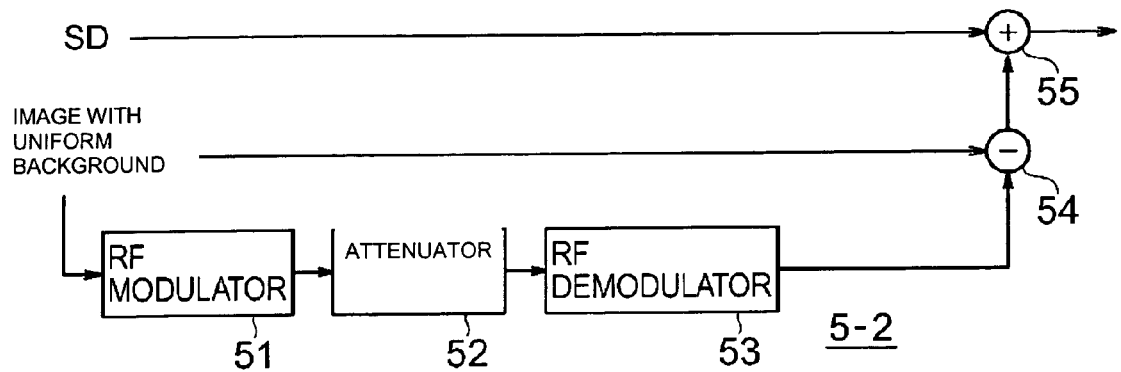
[FIG. 21]
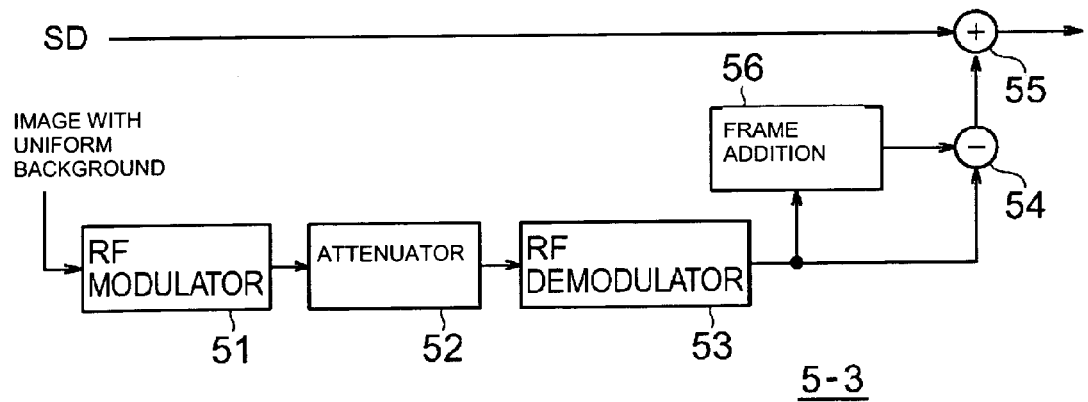

[FIG. 22]
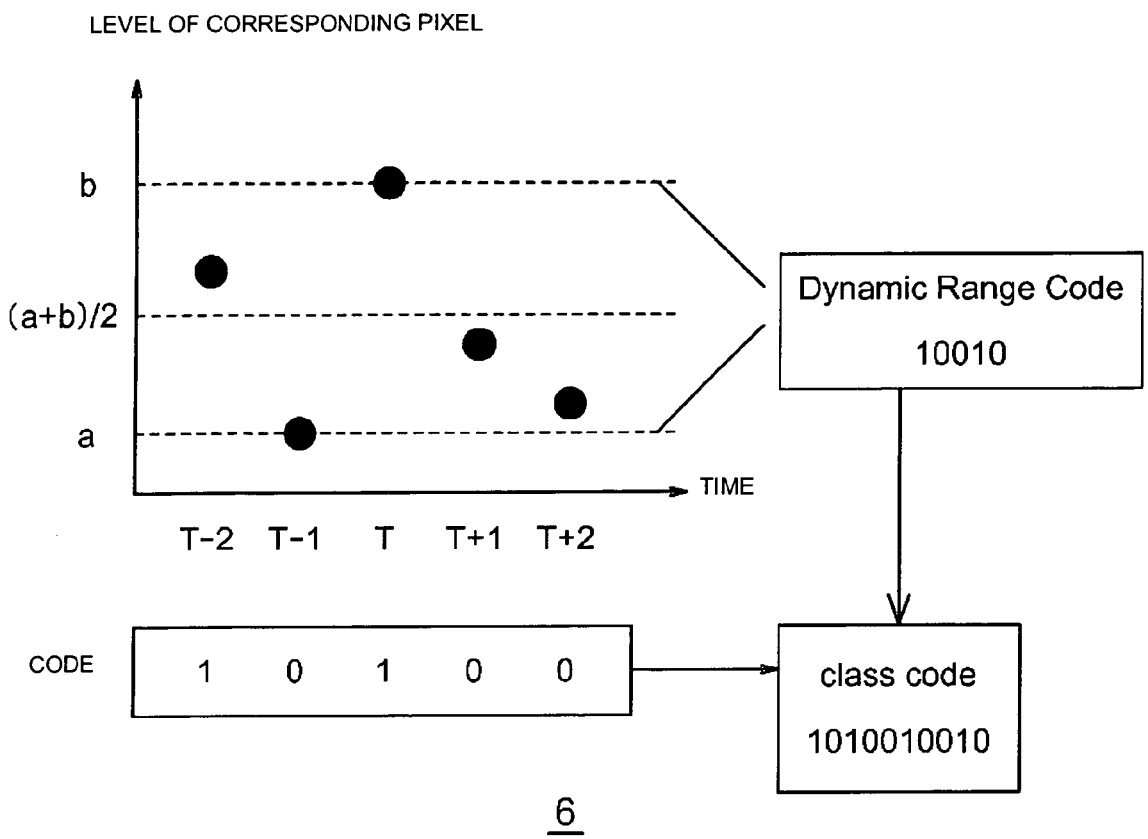

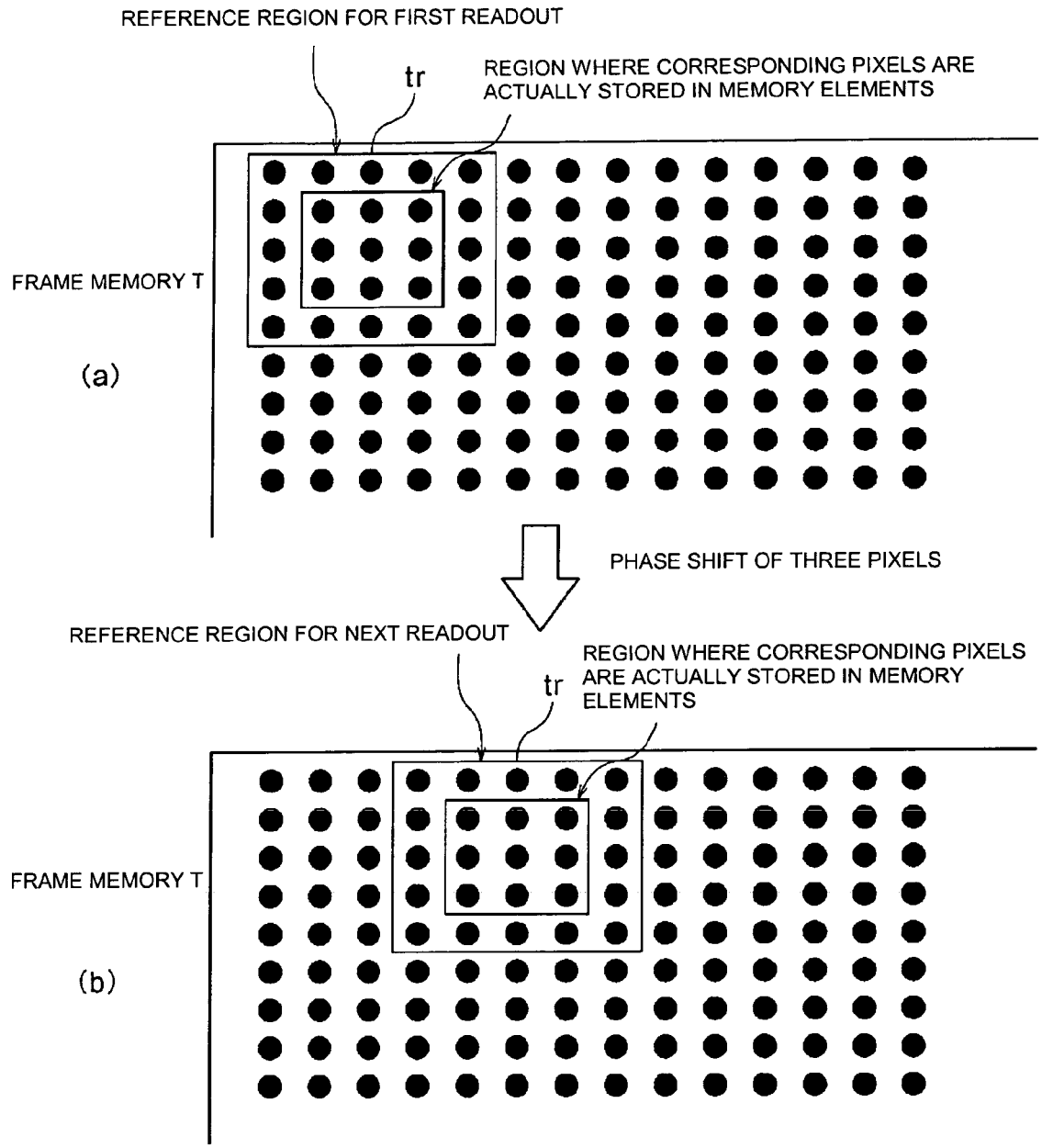
[FIG. 23]

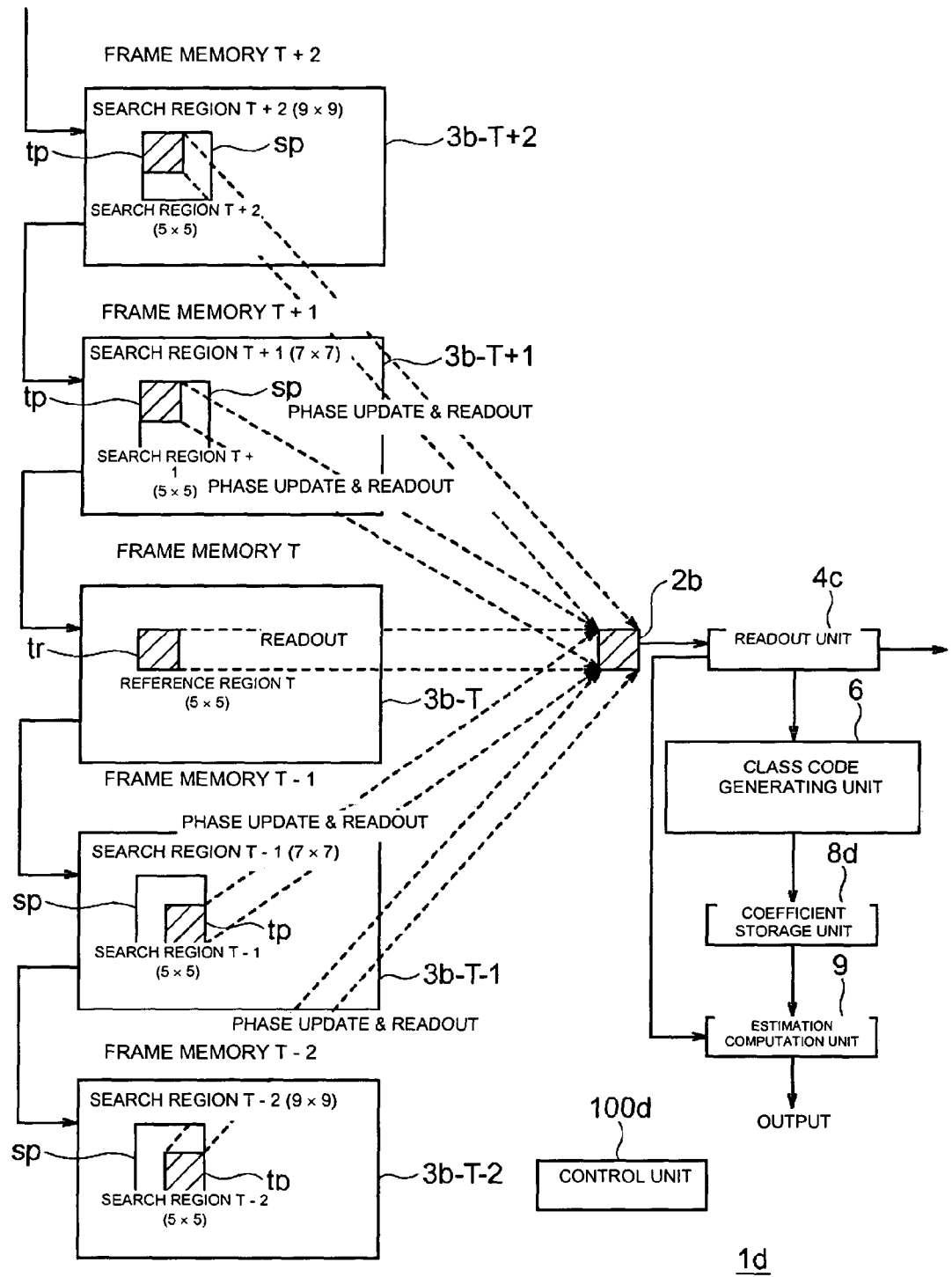
[FIG. 24]

[FIG. 25]
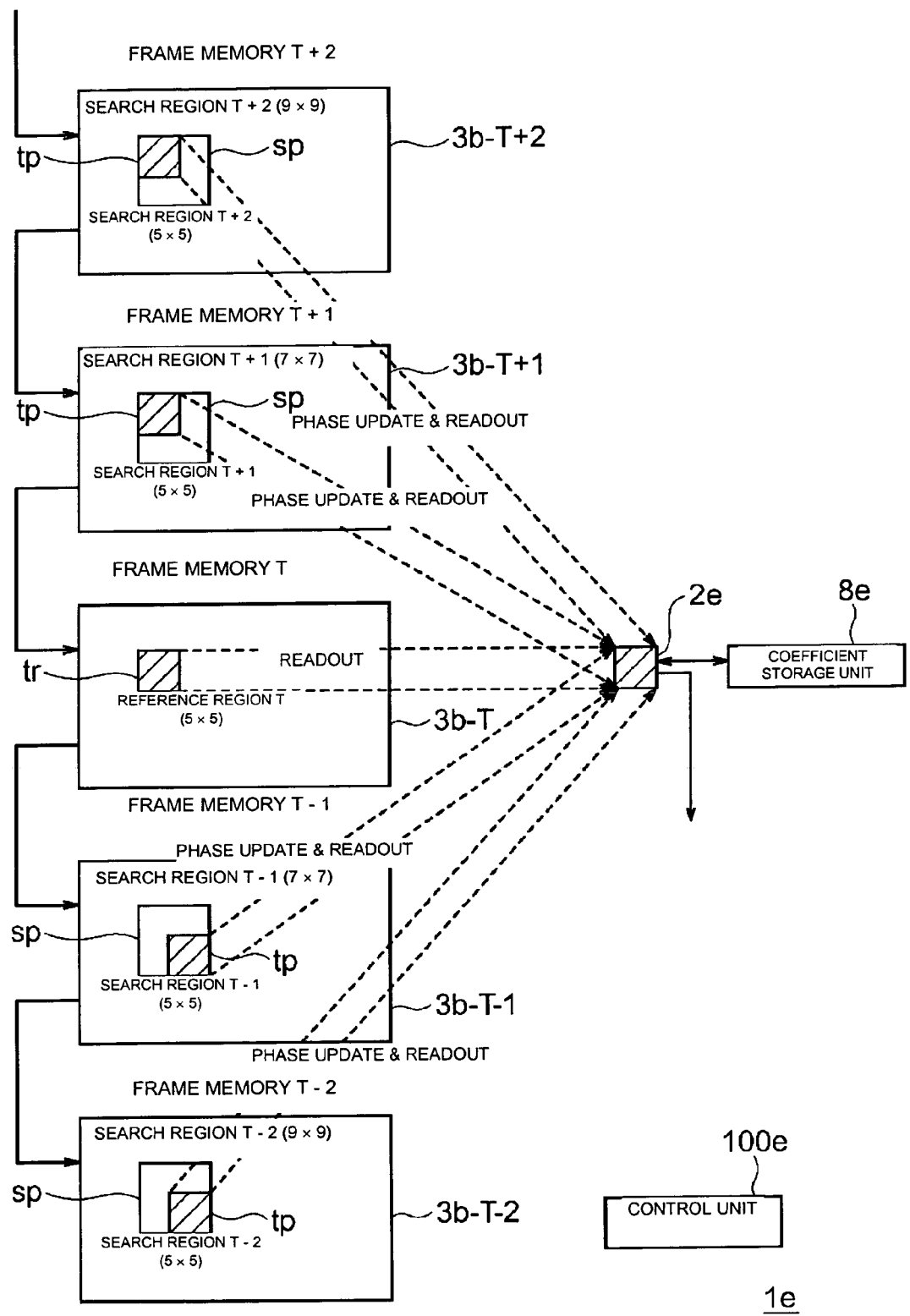

[FIG. 26]
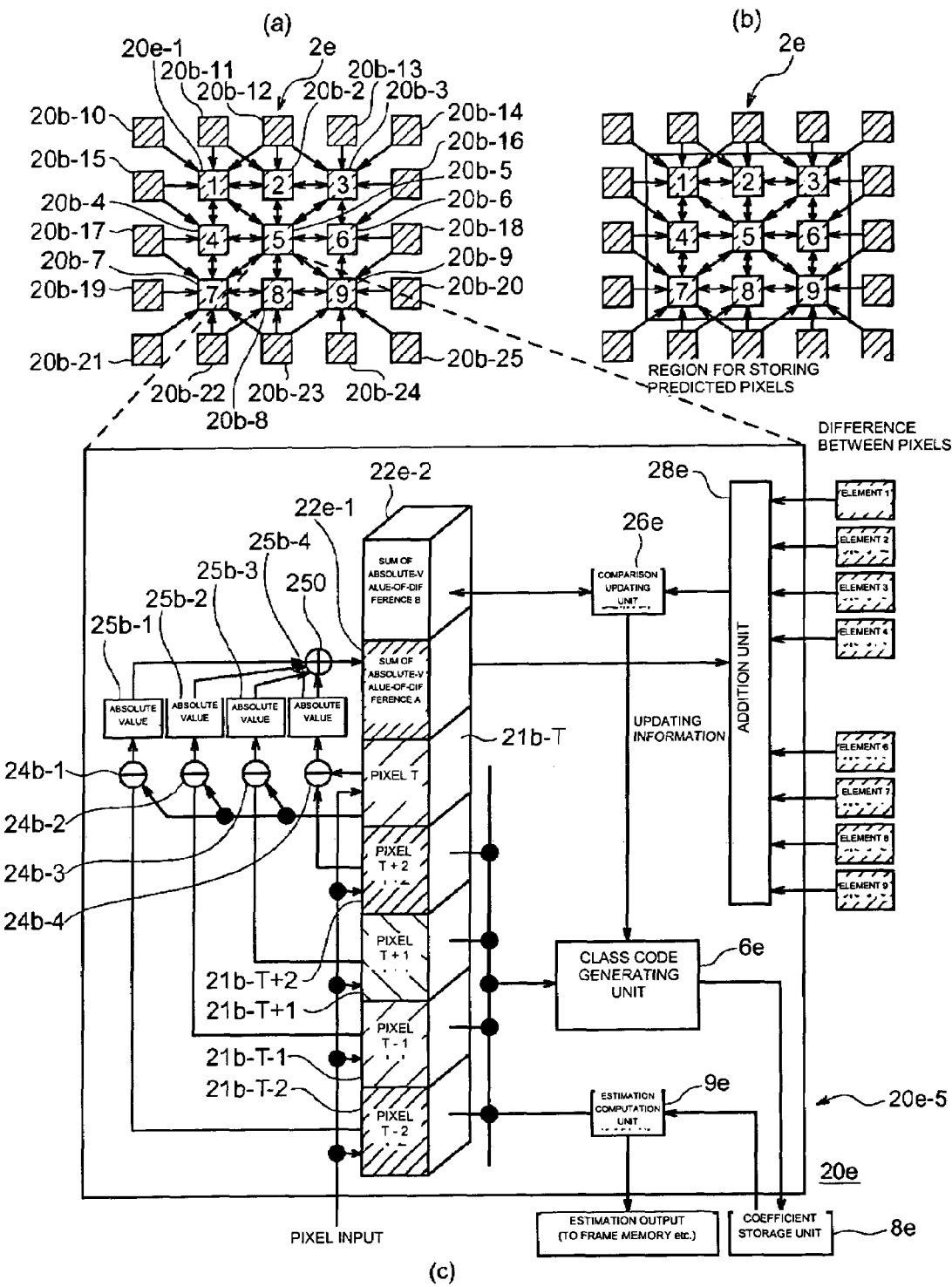

[FIG. 27]
INPUT IMAGE
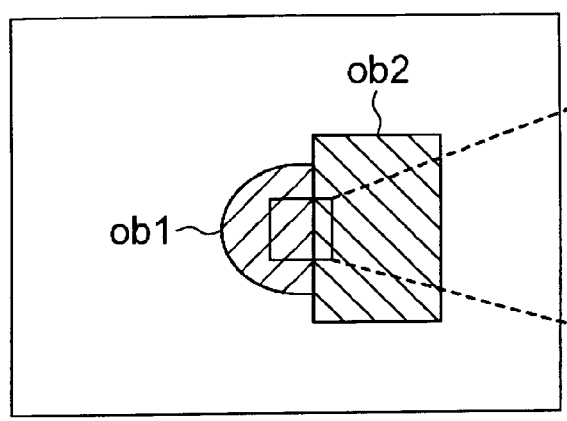
(a)
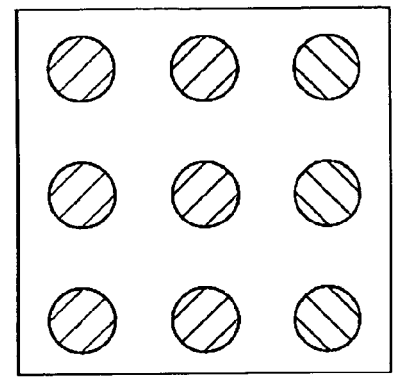
REFERENCE BLOCK FOR BLOCK MATCHING
(b)

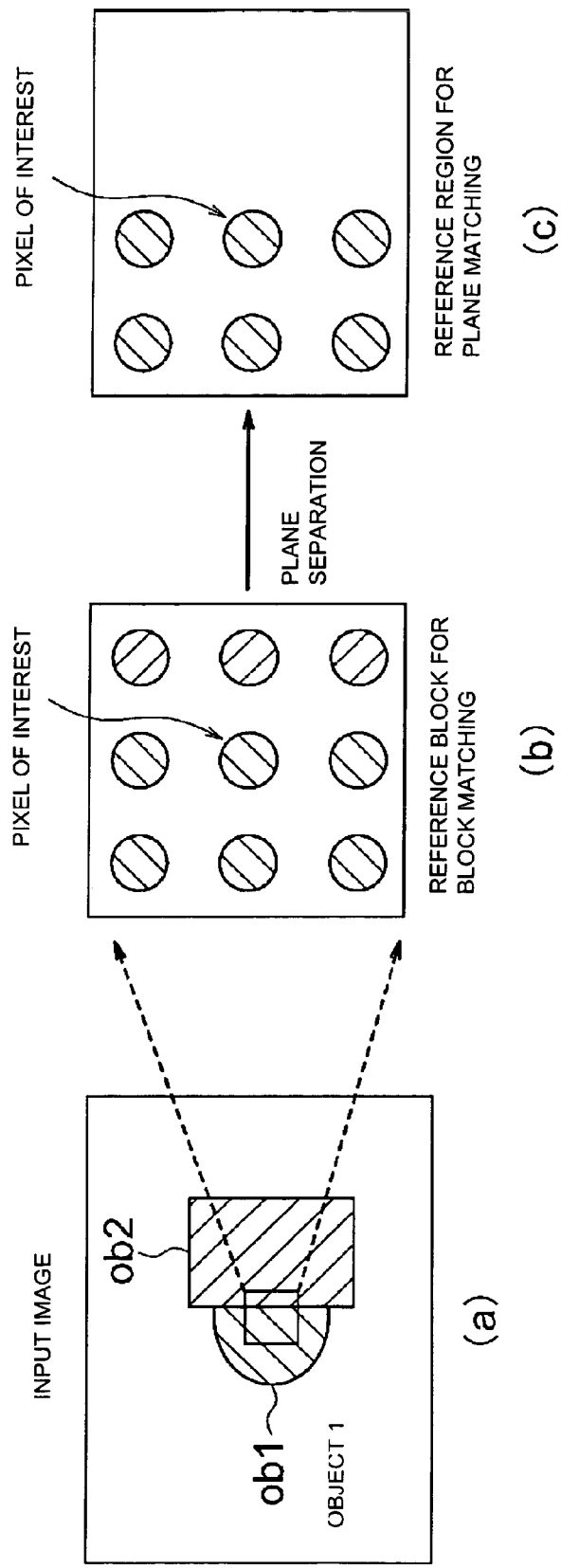
[FIG. 28]

[FIG. 29]
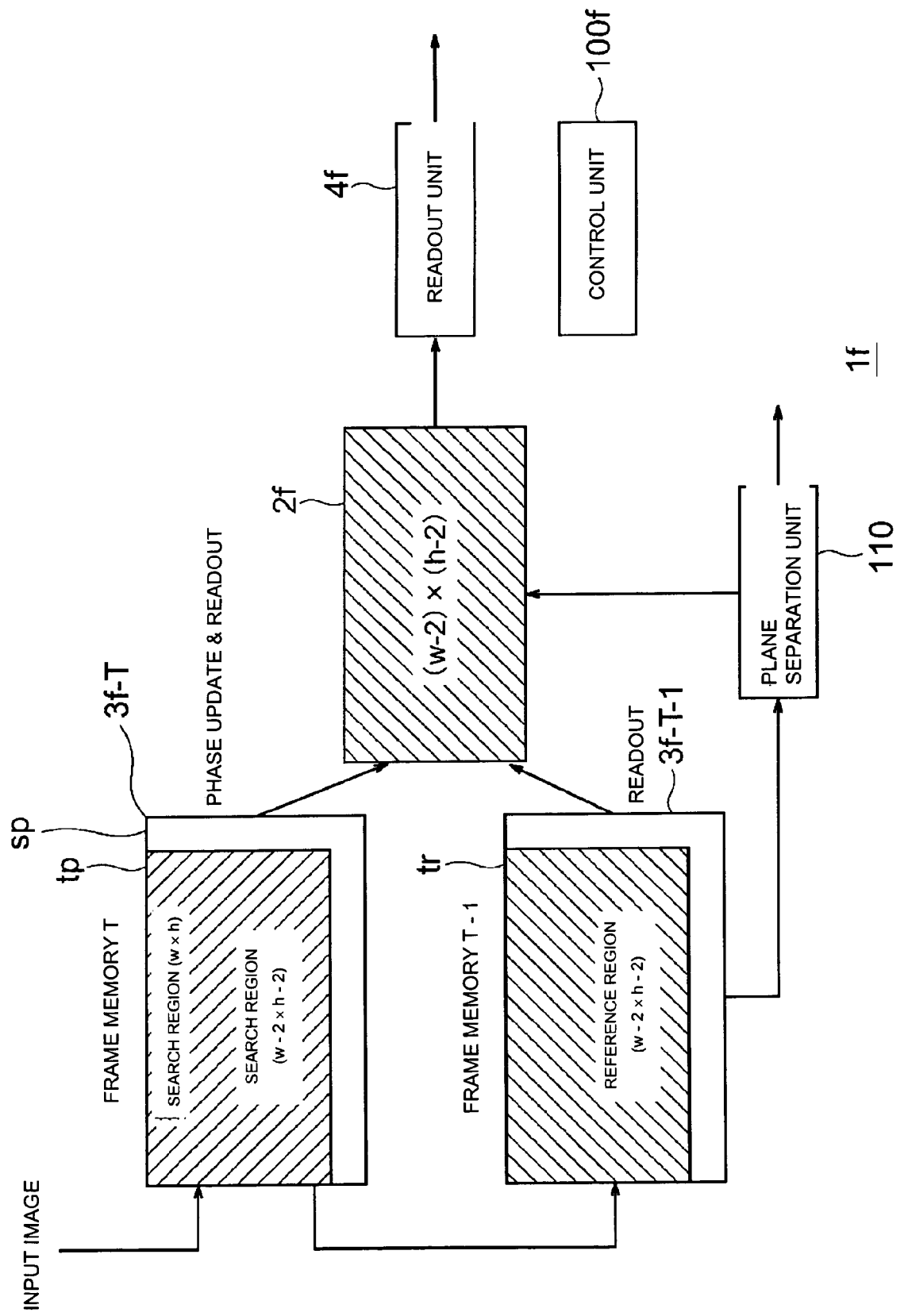

[FIG. 30]
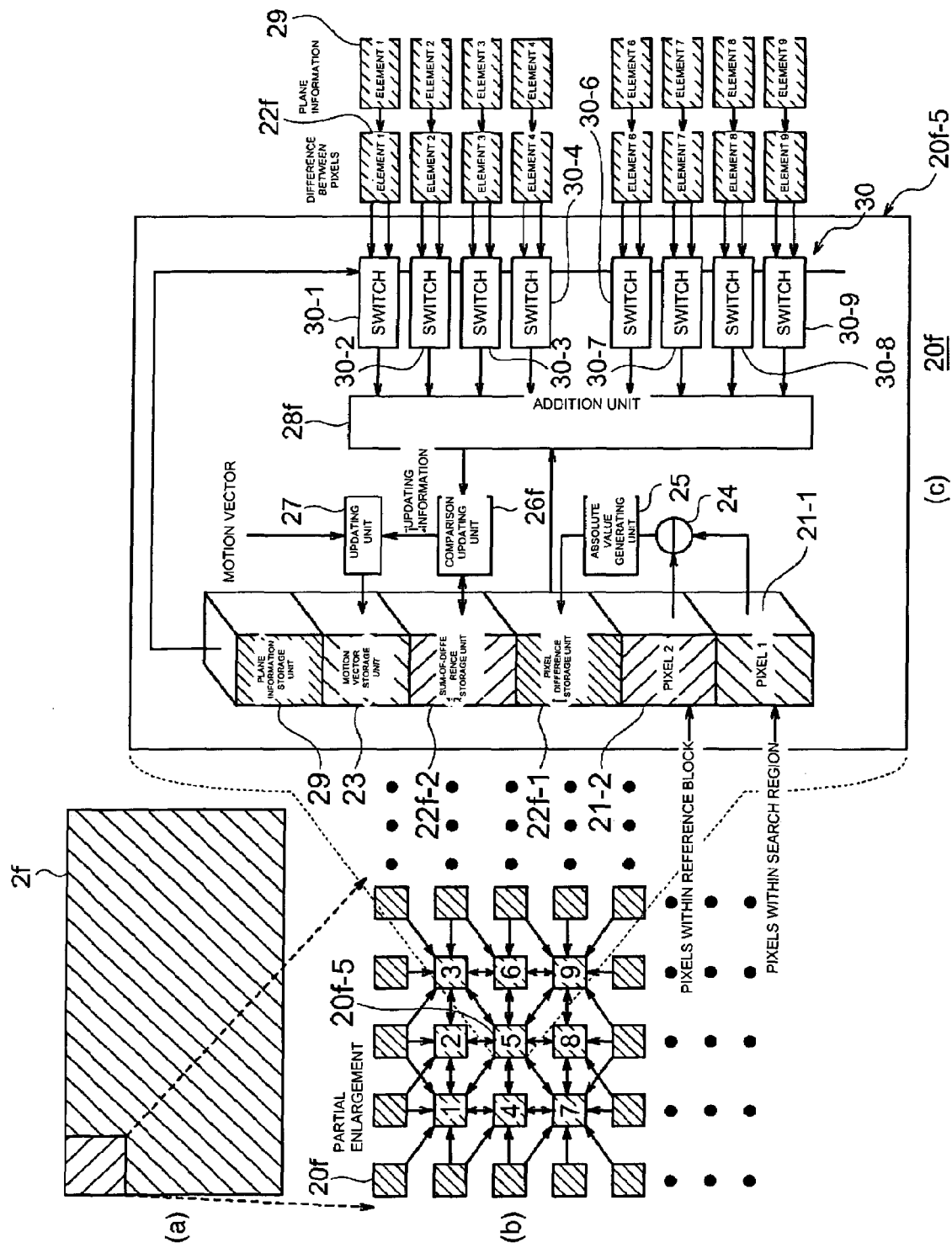

[FIG. 31]
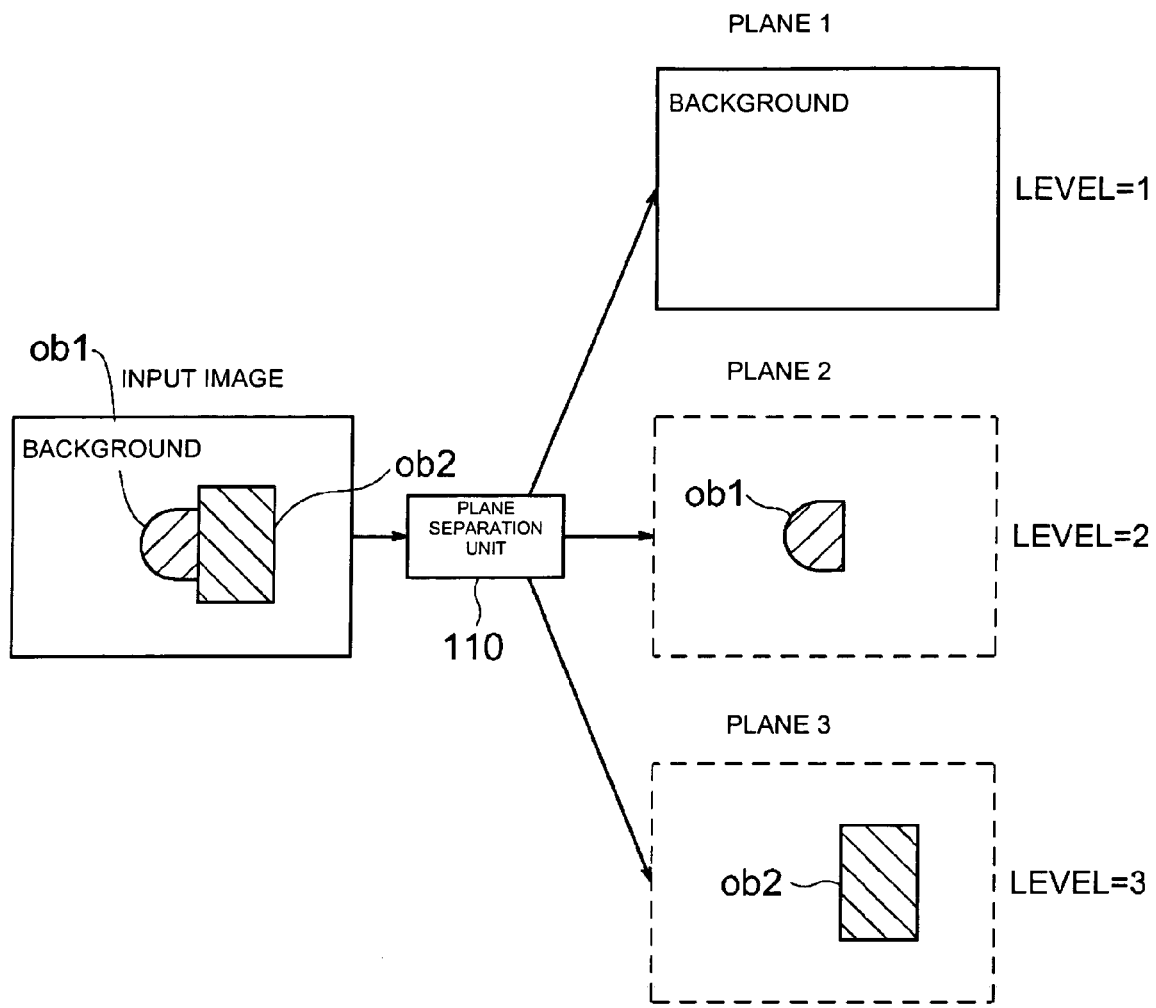

[FIG. 32]
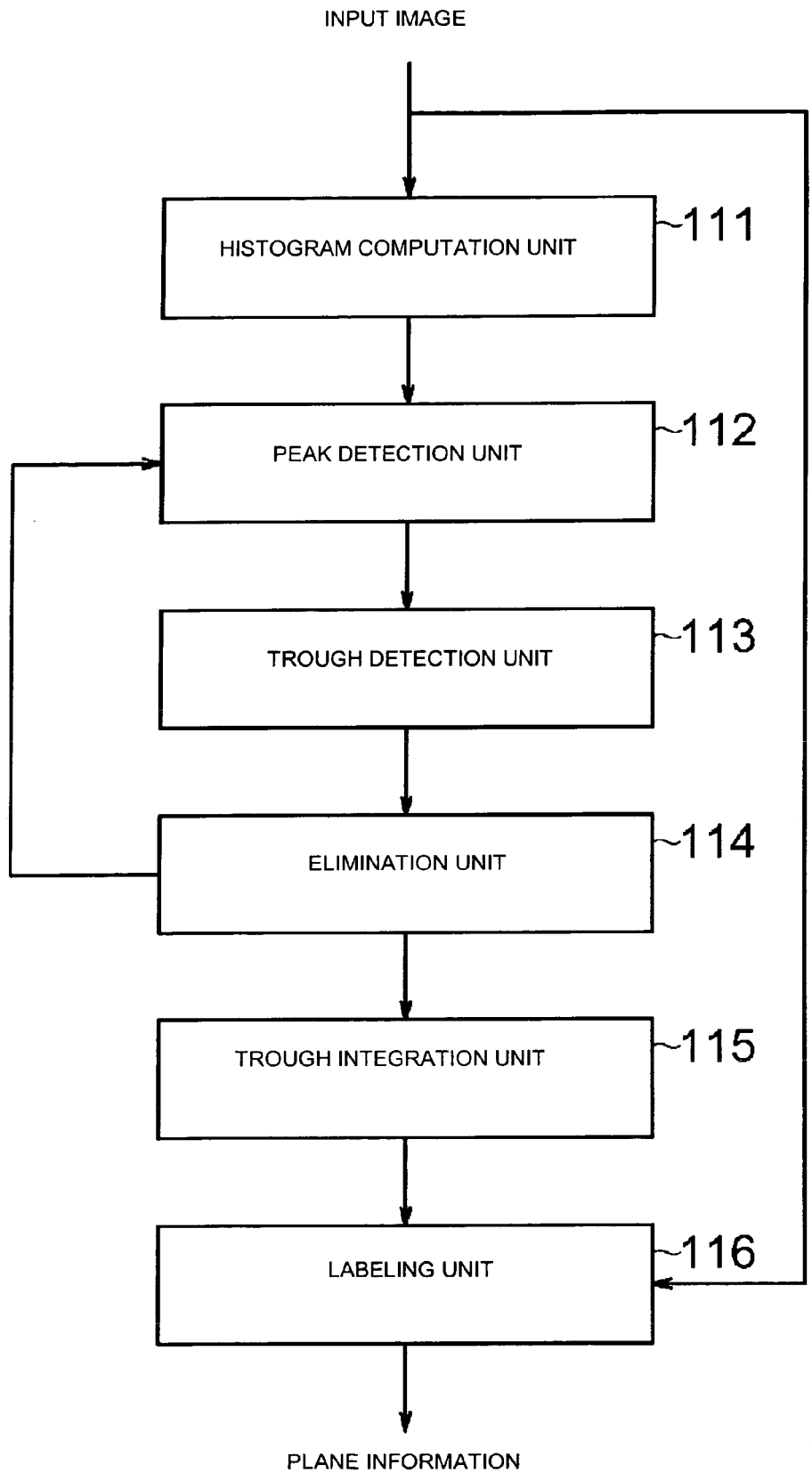

[FIG. 33]
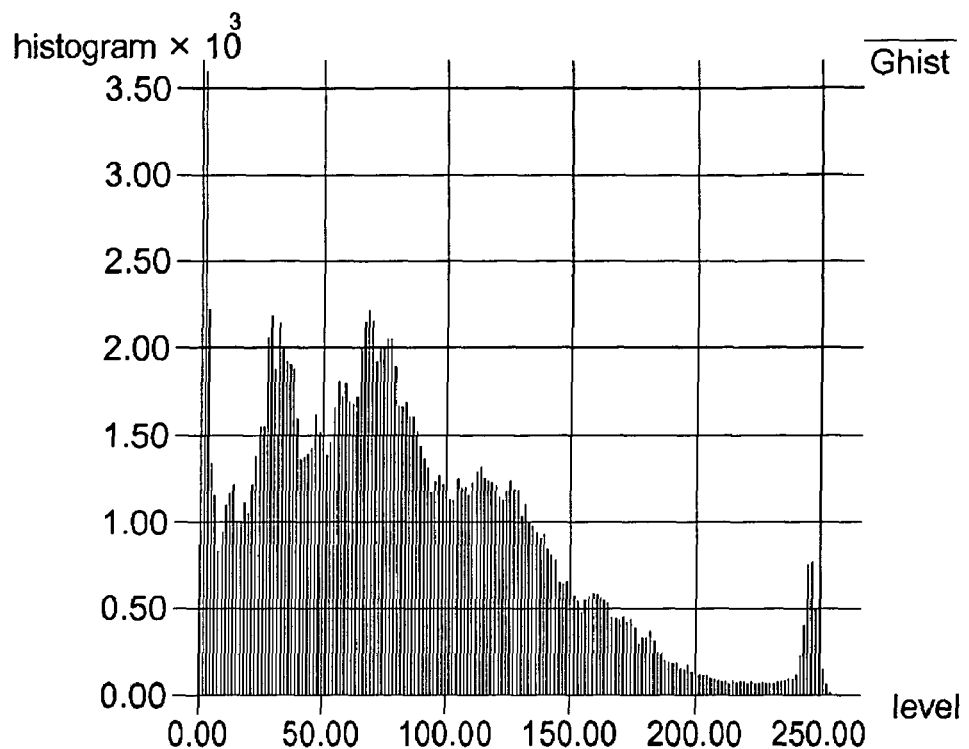
[FIG. 34]
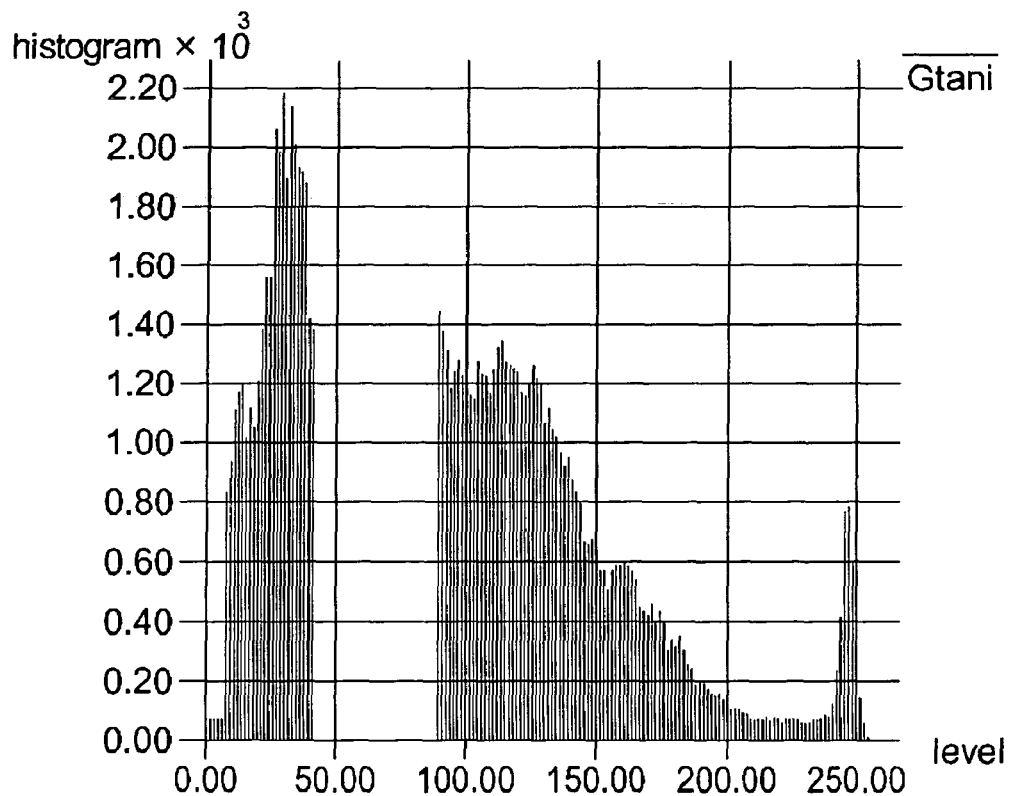

[FIG. 35]
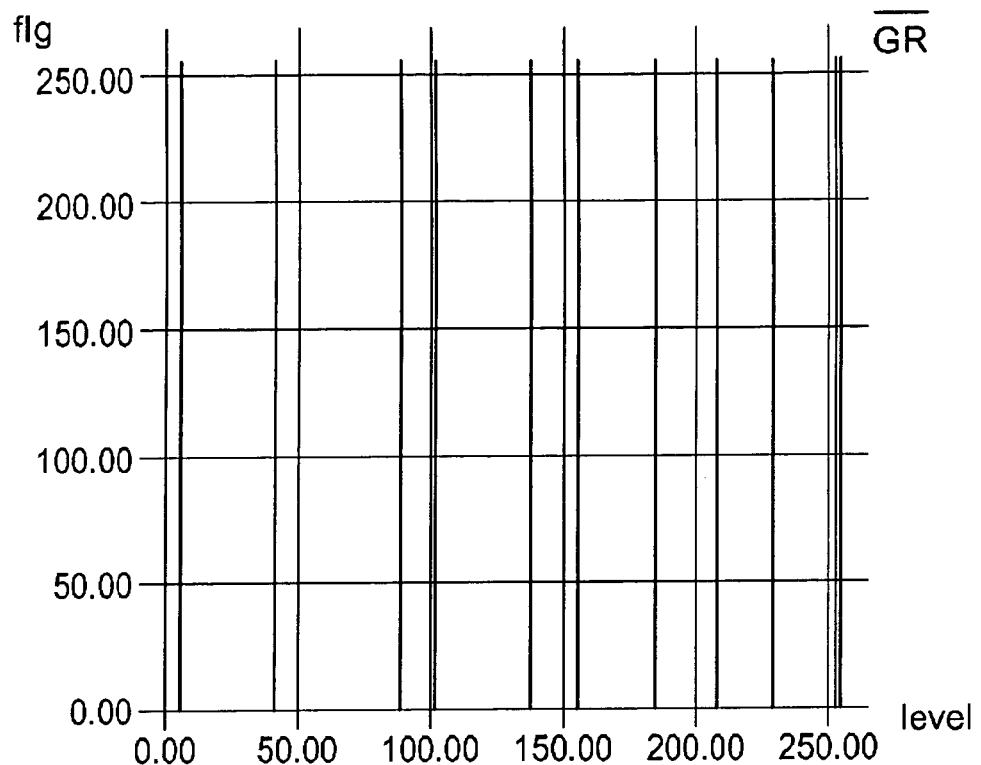
[FIG. 36]
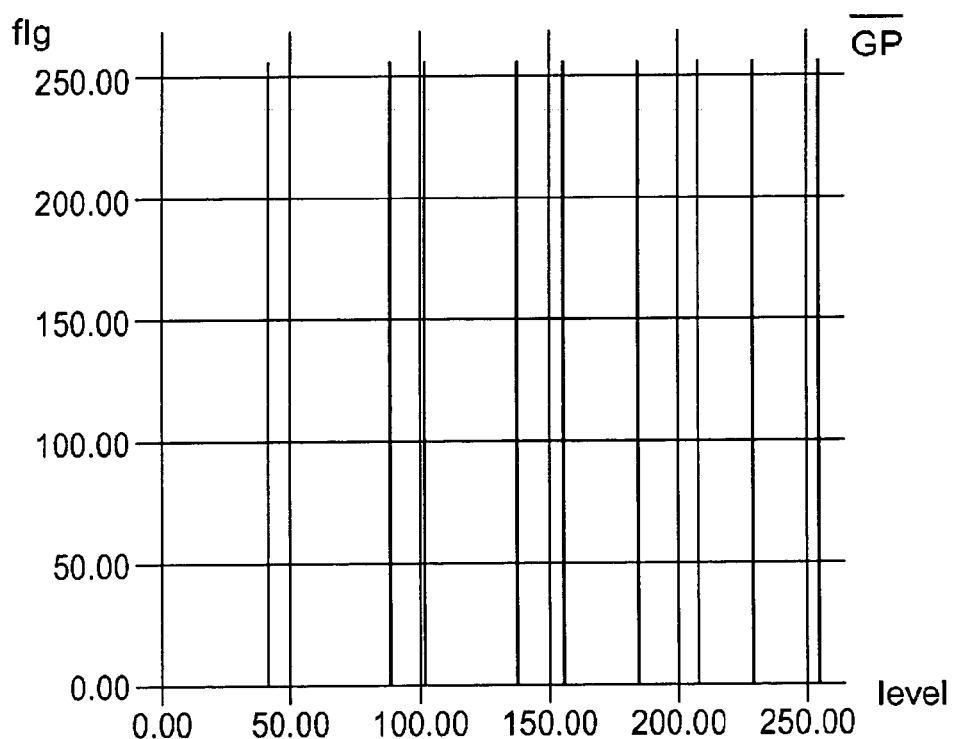

[FIG. 37]
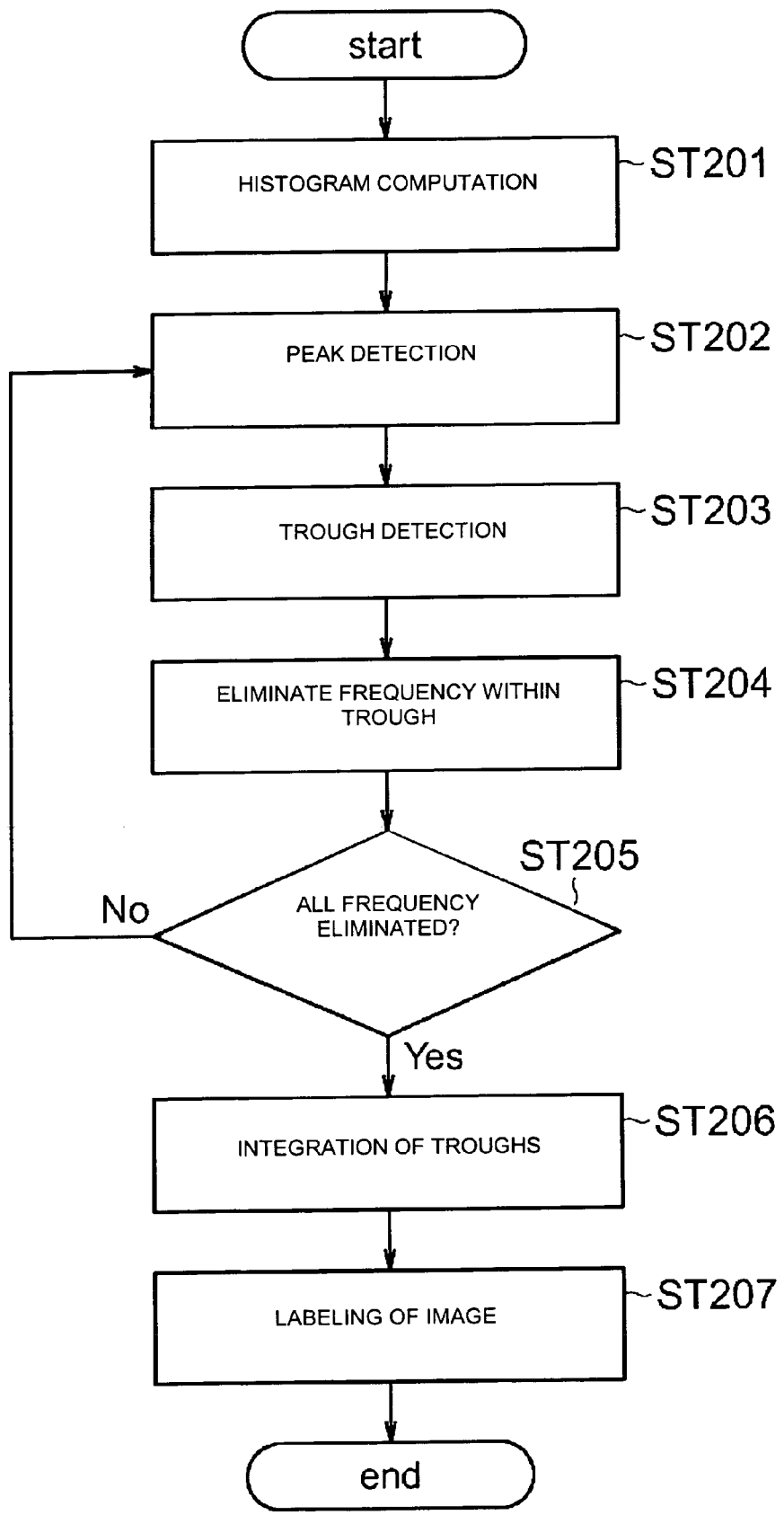

[FIG. 38]
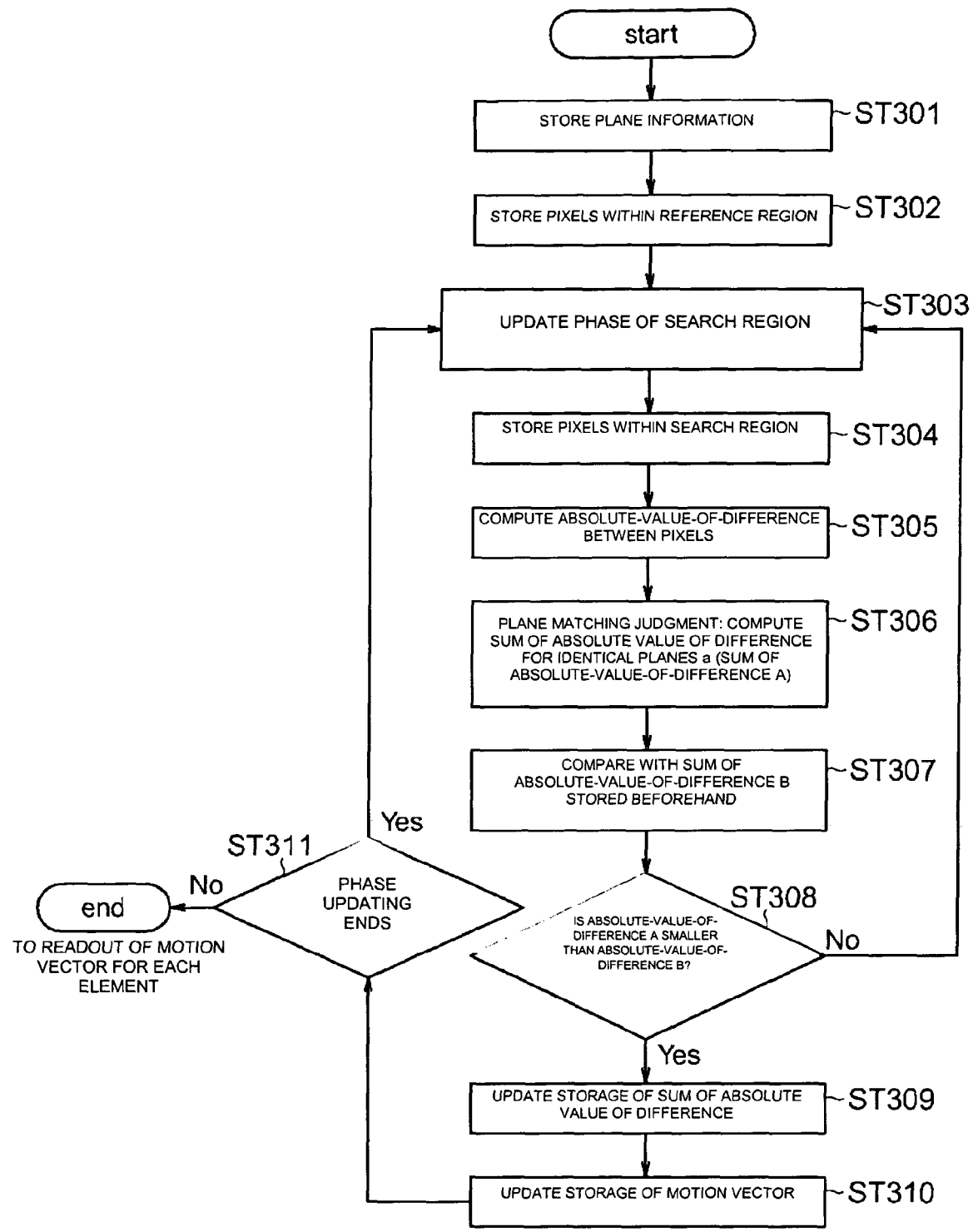

[FIG. 39]
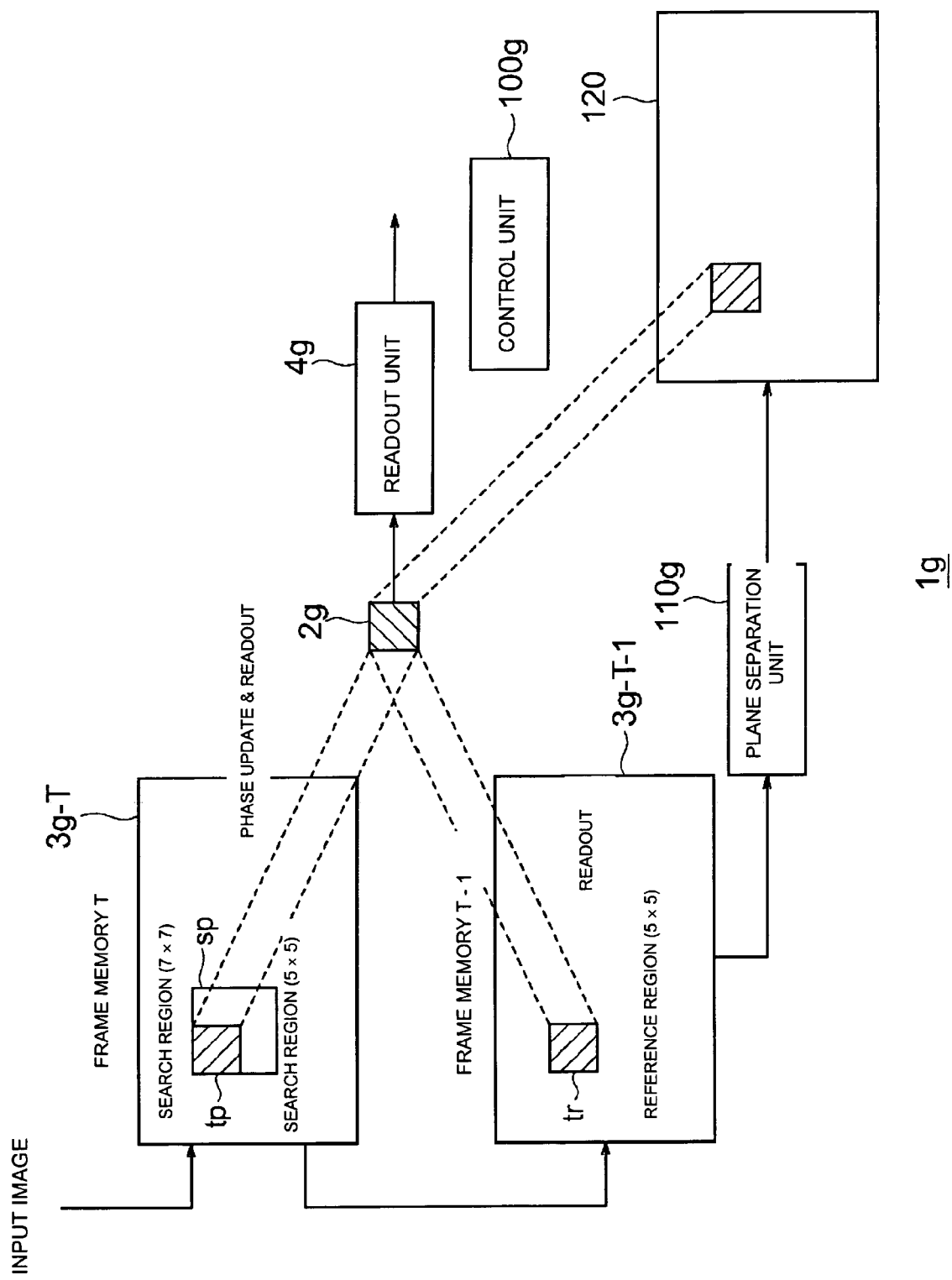

[FIG. 40]
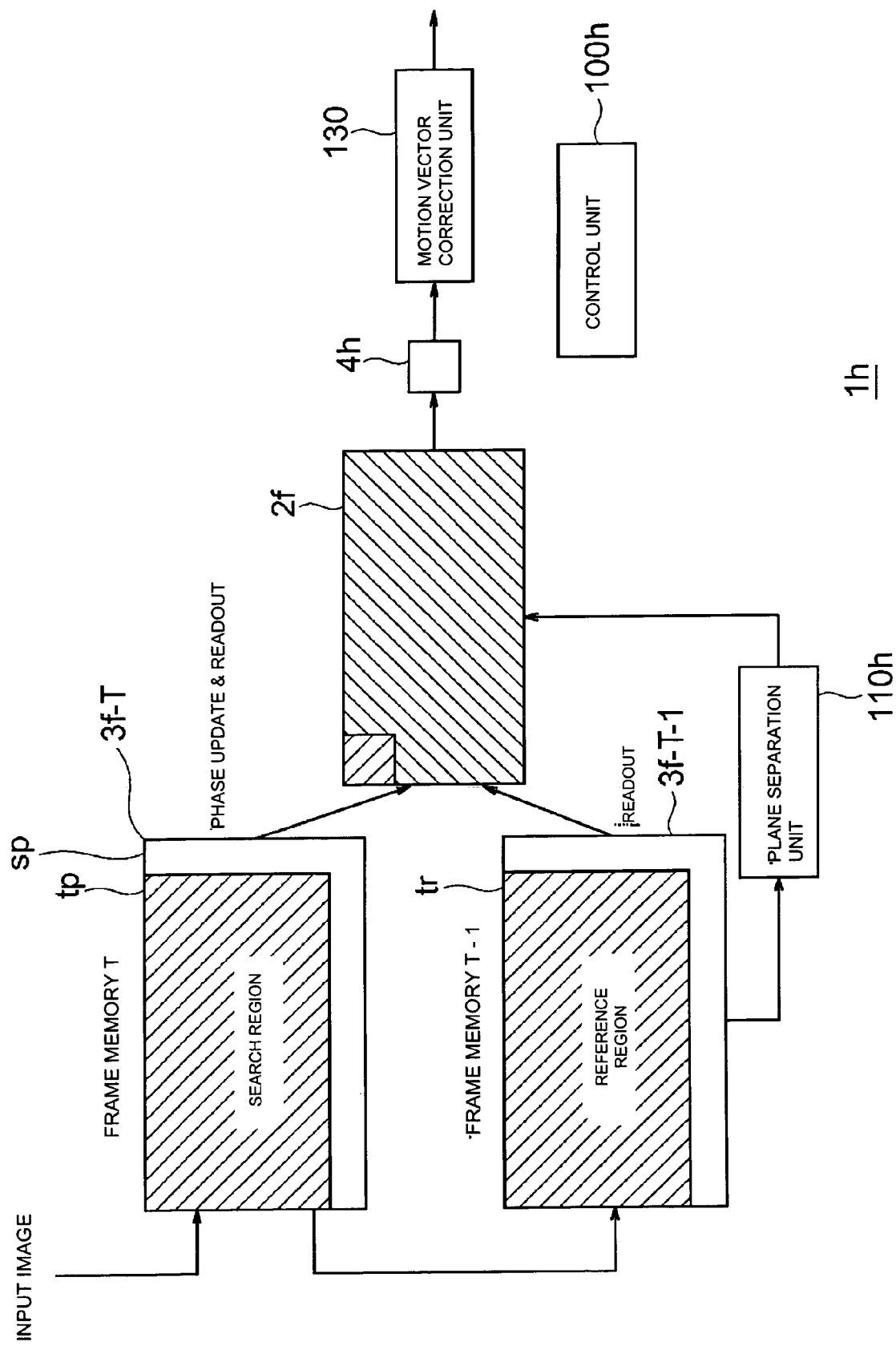

[FIG. 41]
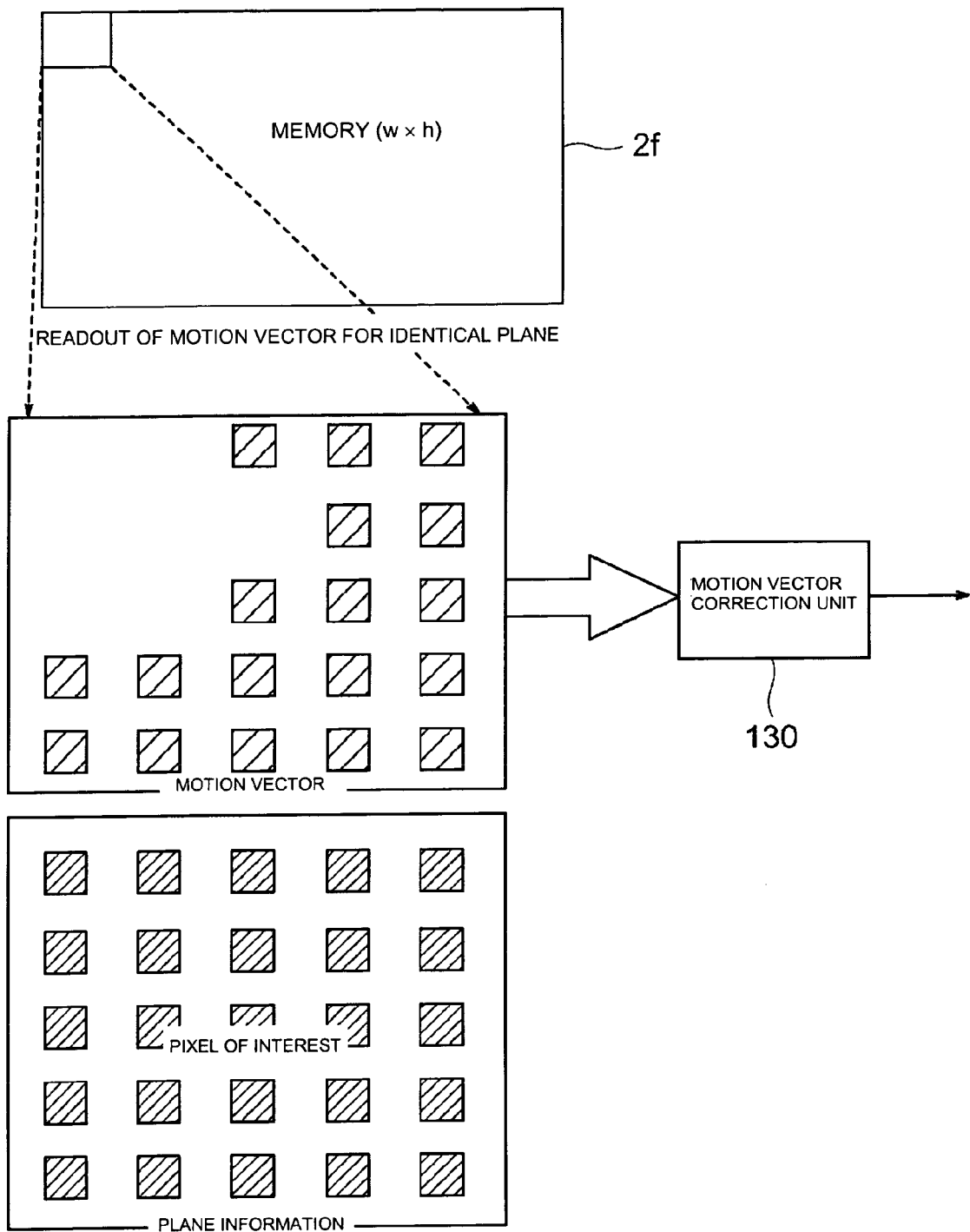

METHOD AND APPARATUS FOR PROCESSING IMAGE DATA AND SEMICONDUCTOR STORAGE DEVICE

CROSS-REFERENCE TO RELATED PATENT APPLICATION

The present application contains subject matter related to co-pending U.S. patent application, Ser. No. 10/640,380, filed Aug. 14, 2003, entitled SEMICONDUCTOR DEVICE, IMAGE DATA PROCESSING APPARATUS AND METHOD, bearing, commonly owned by Sony Corporation, having a common inventor Tetsujiro Kondo, based on Japanese priority document JP 2002-356530, filed in Japan on Dec. 9, 2002, the entire contents of which being incorporated herein by reference. The present application also contain subject matter related to Japanese priority documents JP 2002-274059, filed in the JPO on Aug. 15, 2002, and JP 2002-274058, filed in the JPO on Aug. 15, 2002, the entire contents of each of which being incorporated herein by reference.

BACKGROUND OF THE INVENTION

1. Field of the Invention

The present invention relates to an image processing device, computer program product and an image processing method for generating motion vectors based upon image data, for example.

2. Discussion of the Background

Conventionally, block matching has been known as a method for detecting motion vectors between frames of an image. FIG. 1 is a diagram that illustrates a general image processing device, and FIG. 2 is a flowchart that illustrates the operation of the general image processing device shown in FIG. 1.

In reference to FIGS. 1 and 2, "Block matching" is a process wherein a motion vector is obtained, which indicates what position a certain motion block, in an image at a certain point in time T−1, moves to at a next point in time T.

For example, an image processing device 1s (FIG. 1) comprises frame memory 3s-T, frame memory 3s-T−1, search region memory ms, reference block memory mr, phase block memory mp, computation unit pc, evaluation table memory mv, and minimal value search unit ps.

The image processing device 1s sets a search region at a point in time T so as to perform matching for pixels in a block within the search region with regard to each phase (position) as to a reference block at a point in time T−1, and the phase scoring of the best match is taken as a position of the block at the point in time T. Here, the shift amount of the block between two frames is defined as the motion vector.

Referring to FIG. 2, a flowchart describes the operation of the image processing device 1s. The image data of the search region and the image data of reference block br are each read out from frame memory T and frame memory T−1 wherein continuous input images are stored with regard to time (ST1, ST2). These image data sets are stored in the search region memory ms and the reference block memory mr (ST3).

Next, the block with the same shape and the same size as the reference block br is read out from the search region memory ms for each phase. The block is defined as a phase block bp. The phase is sequentially updated at a point in time when recording to the evaluation table has ended, as described later, and the phase block bp is read out at the phase at the point of time (ST4). The phase block bp read out is stored in the phase block memory mp as shown in FIG. 1, for example.

FIG. 3 (which has two parts—FIG. 3a and FIG. 3b) is a diagram for describing a specific process example beginning with how a readout of the phase block operation is performed with phase shift, up to recording in the evaluation table memory mr. FIG. 3(a) is a diagram which illustrates the state prior to the phase shift, and FIG. 3(b) illustrates the state following the phase shift.

Referring to FIG. 3, the operations up to, and including, recording in the evaluation table memory will be described. Presume that the size of the reference block is 3×3 pixels, and the size of the search region is 5×5 pixels. Here, the phase block bp read out at the point of the phase 1 is shifted in phase 2 to a position offset by one pixel in the horizontal direction. For example, the shift amount of the phase due to updating is one pixel. Next, the absolute value of the difference is computed by the computation unit pc for each pair of corresponding pixels between the reference block br and phase block bp, the sum of absolute value of the difference S is obtained for all the absolute values of difference computed.

$$S = \sum_{s,p=1}^{9} |k_s - k_p| \tag{1}$$

The sum of absolute value of the difference S is calculated with Expression (1), for example, using the pixel values ks in the reference block br and the corresponding pixel values kp in the phase block bp (ST5).

Next, the sum of absolute value of the difference S is stored in the evaluation table (ST6). Specifically, the sum of absolute values of difference S is stored in the evaluation table memory mv, as shown in FIG. 1. The evaluation table stores the sum of absolute values of difference S for each phase corresponding to the phase block read out.

In general, with the image processing device 1s, upon the phase being shifted from the shift 1 to the shift 2, the position at which the data is stored in the evaluation table is shifted corresponding to the shift amount as shown in FIG. 3.

Upon the processing from readout of phase blocks bp up to recording in the evaluation table ending for all the search regions (ST7), the minimal value search unit ps searches the minimal value within the evaluation table (ST8).

On the other hand, in the event that judgment is made that the evaluation table does not store the data for all the phases in Step ST7, the flow returns to processing in Step S3.

Thus, the image processing device 1s searches the block within the search region, of which value is closest to that of the reference block br.

As described above, the evaluation table stores the sum-of-absolute-values-of-difference S for each phase corresponding to the phase block bp read out. Accordingly, the phase of the block within the search region, corresponding to the reference block br, can be found by searching the minimal value within the evaluation table. The information with regard to the phase is output as a motion vector.

SUMMARY OF THE INVENTION

An object of the present invention is to address the above-identified and other limitations with conventional devices, methods and computer program product.

The present invention has been made taking the above-described problems into consideration, and it is an object of the present invention to provide an image processing device and an image processing method, which can calculate motion vectors with small amounts of calculation required.

There are three problems, as described below, with the above-described conventional image processing device, and the present invention is configured to address these problems.

1. Procedures are needed to temporarily store values of the phase block and the evaluation table, and so there is a need to provide memory for storing data within a circuit, leading to circuit layout complexity. Furthermore, in the event that motion vectors are calculated at a number of positions within a frame, for example, there is the need to sequentially search a motion vector for each position, leading to a loss of time.

2. A procedure to search for the minimal value is started at the point of all the values being stored in the evaluation table. Accordingly, there is the need to update the phase in two ways: readout of each phase block, and search of the minimal value.

3. In this case, the output is a motion vector, so when reading out pixels extracted based upon the motion vector, for example, another procedure for extracting the pixels based upon the motion vector is necessary.

In order to address the above-identified and other deficiencies with conventional devices and methods, the image processing device according to a first aspect of the present invention, a semiconductor storage device is provided that includes a memory having a data structure that includes
 a first pixel information portion configured to hold data indicative of a first pixel of an image block,
 a second pixel information portion configured to hold data indicative of a second pixel of a search region of another image block,
 an estimation portion configured to hold data representative of a motion estimation value between the first pixel and the second pixel, and
 a motion vector information portion configured to hold data representative of a motion vector between the first pixel and the second pixel.

According to a second aspect of the invention, a semiconductor storage device is provided that includes a data storage unit having portions, the portions including
 a first storage portion for holding pixel motion information,
 a second storage portion for holding a motion estimation value,
 indicative of a frame-to-frame motion between pixels,
 a third storage portion for holding first pixel information, and
 a fourth storage portion for holding second pixel information,
 wherein
 a first frame that includes the first pixel is different from a second frame that includes the second pixel.

According to a third aspect of the present invention, a method is provided for processing image data for facilitating an estimation of a motion vector, including steps of
 storing a first pixel information in a first pixel portion of a memory element configured to hold data indicative of a first pixel of an image block;
 storing a second pixel information in a second pixel portion of the memory element configured to hold data indicative of a second pixel of a search region of another image block;
 storing an estimation information in an estimation portion of the memory element configured to hold data representative of a motion estimation value between the first pixel and the second pixel, and
 storing motion vector information in a motion vector portion of the memory element configured to hold data representative of a motion vector between the first pixel and the second pixel.

According to a fourth aspect of the present invention, a method is provided for processing image data for facilitating an estimation of a motion vector, including steps of
 storing in a first storage portion pixel motion information;
 storing in a second storage portion a motion estimation value, indicative of a frame-to-frame motion between pixels,
 storing in a third storage portion first pixel information, and
 storing in a fourth storage portion second pixel information, wherein
 a first frame that includes the first pixel is different from a second frame that includes the second pixel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagram, which illustrates a general image processing device.

FIG. 2 is a flowchart, which illustrates the operations of the general image processing device shown in FIG. 1.

FIG. 3 (which includes FIGS. 3a and 3b) is a diagram for describing a specific example of an operation beginning with reading out a phase block with phase shift up through a step of storing in an evaluation table memory.

FIG. 4 is a functional block diagram that illustrates an image processing device of a first embodiment according to the present invention.

FIG. 5(a) is a diagram that illustrates a memory of the image processing device according to the first embodiment, and FIG. 5(b) is a functional block diagram that illustrates an element within the memory of the image processing device shown in FIG. 5(a).

FIG. 6 (which includes FIGS. 6(a) and 6(b)) shows diagrams for describing updating of the phase for pixel matching and readout of a search region tp, performed by the image processing device shown in FIG. 4. FIG. 6(a) is a diagram which illustrates the phase within the search region. FIG. 6(b) is a diagram which illustrates the relation between the phase and the search region tp.

FIG. 7 is a flowchart for describing the operations of the image processing device 1 shown in FIG. 1.

FIG. 8 is a functional block diagram that illustrates an image processing device of a second embodiment according to the present invention.

FIG. 9(a) is a diagram that illustrates a memory of the image processing device 1a shown in FIG. 8. FIG. 9(b) is a diagram that illustrates a specific example of the memory structure shown in FIG. 8. FIG. 9(c) is a diagram that illustrates the memory structure for storing motion vectors of the image processing device 1a shown in FIG. 8.

FIG. 10 (which includes FIGS. 10(a) and 10(b)) shows diagrams for describing the operations of the image processing device shown in FIG. 8, in particular, the operations for performing updating of the phase and readout of the search region tp. FIG. 10(a) is a diagram which illustrates the phase within the search region sp. FIG. 10(b) is a diagram which illustrates the relation between the phase and the search region tp.

FIG. 11 is a flowchart for describing the operations of the image processing device 1a shown in FIG. 8.

FIG. 12 is a diagram which illustrates blocks extracted from a reference region tr of the frame of the image processing device shown in FIG. 8.

FIG. 13 is a conceptual diagram for describing extraction of corresponding pixels for an image processing device according to a third embodiment of the present invention.

FIG. 14 is a functional block diagram of the image processing device of the third embodiment according to the present invention.

FIG. 15(a) is a diagram that illustrates the memory 2b of the image processing device 1b shown in FIG. 14. FIG. 15(b) is a diagram that illustrates memory for storing the corresponding pixels. FIG. 15(c) is a functional block diagram that illustrates an element 20b of the memory 2b shown in FIG. 15(a).

FIG. 16(a) is a diagram which illustrates the phases of the search region spT+2 (9×9) of the frame T+2 and the search region tpT+2. FIG. 16(b) is a diagram which illustrates the phases of the search region spT+1 (7×7) of the frame T+1 and the search region tpT+1. FIG. 16(c) is a diagram which illustrates the phases of the search region spT−1 (7×7) of the frame T−1 and the search region tpT−1. FIG. 16(d) is a diagram which illustrates the phases of the search region spT−2 (9×9) of the frame T−2 and the search region tpT−2. FIG. 16(e) is a diagram for describing updating of the phase and readout processing for the search region tp, performed by the image processing device 1b shown in FIG. 14.

FIG. 17 is a flowchart for describing the operations of the image processing device shown in FIG. 14.

FIG. 18 is a functional block diagram of an image processing device of a fourth embodiment of the present invention.

FIG. 19 is a functional block diagram that illustrates a first specific example of the noise addition unit of the image processing device 1c shown in FIG. 18.

FIG. 20 is a functional block diagram that illustrates a second specific example of the noise addition unit of the image processing device 1c shown in FIG. 18.

FIG. 21 is a functional block diagram that illustrates a third specific example of the noise addition unit of the image processing device 1c shown in FIG. 18.

FIG. 22 is a diagram for describing the principle for generating a class code (detection of noise components) in the class code generating unit of the image processing device 1c shown in FIG. 18.

FIG. 23 shows diagrams for describing the procedures for reading out the reference region tr to the memory for class classification adaptation processing performed by the image processing device 1c shown in FIG. 18. FIG. 23(a) is a diagram that illustrates the state prior to the shift. FIG. 23(b) is a diagram that illustrates the state following the shift.

FIG. 24 is a functional block diagram that illustrates an image processing device of a fifth embodiment according to the present invention.

FIG. 25 is a functional block diagram that illustrates an image processing device of a sixth embodiment according to the present invention.

FIG. 26(a) is a configuration diagram which illustrates the memory of the image processing device shown in FIG. 25, FIG. 26(b) is a diagram which illustrates an element of the memory shown in FIG. 26(a) for storing a prediction pixel, and FIG. 26(c) is a functional block diagram which illustrates the element of the memory shown in FIG. 26(a).

FIG. 27 is a conceptual diagram for describing the operations of an image processing device according to a seventh embodiment of the present invention.

FIG. 28 is a conceptual diagram for describing the operations of plane matching performed by the image processing device of the seventh embodiment according to the present invention.

FIG. 29 is a functional block diagram that illustrates the image processing device of the seventh embodiment according to the present invention.

FIG. 30(a) is a schematic diagram that illustrates the memory of the image processing device shown in FIG. 29. FIG. 30(b) is a partial enlarged diagram of FIG. 30(a). FIG. 30(c) is a functional block diagram that illustrates the element of the memory shown in FIG. 30(b).

FIG. 31 is a diagram for describing the operations of the plane separation unit of the image processing device shown in FIG. 29.

FIG. 32 is a functional block diagram that illustrates a specific example of the plane separation unit of the image processing device 1f.

FIG. 33 is a diagram that illustrates a specific example of a histogram generated by the histogram computation unit of the plane separation unit of the image processing device 1f shown in FIG. 32.

FIG. 34 is a specific example of a histogram for describing the operations of the elimination unit of the plane separation unit of the image processing device shown in FIG. 32.

FIG. 35 is a diagram for describing troughs of a histogram prior to integration by the trough integration unit of the image processing device shown in FIG. 32.

FIG. 36 is a diagram for describing troughs of the histogram following integration by the trough integration unit of the image processing device shown in FIG. 32.

FIG. 37 is a flowchart for describing the operations of the plane separation unit of the image processing device shown in FIG. 32.

FIG. 38 is a flowchart for describing the operations of the image processing device shown in FIG. 29.

FIG. 39 is a functional block diagram that illustrates an image processing device of an eighth embodiment according to the present invention.

FIG. 40 is a functional block diagram of an image processing device of a ninth embodiment according to the present invention.

FIG. 41 is a diagram for describing the operations of the motion vector correction unit of the image processing device shown in FIG. 40.

DETAILED DESCRIPTION OF THE INVENTION

First Embodiment

An image processing device 1 according to the present embodiment detects a motion vector between frames of a moving image having multiple frames. One aspect of detecting the motion vector is by pixel matching, as discussed below.

Pixel Matching

FIG. 4 is a functional block diagram that illustrates a first embodiment of an image processing device according to the present invention. FIG. 5(a) is a diagram that illustrates a memory structure, or data structure, of the image processing device according to the first embodiment. FIG. 5(b) is a functional block diagram that illustrates an element within the memory of the image processing device shown in FIG. 5(a).

As shown in FIG. 4, the image processing device 1 according to the present embodiment includes memory 2, multiple frame memory 3 (shown as 3-T and 3-T−1), readout unit 4, and a control unit 100. The memory 2 generates and stores a motion vector based on predetermined data from the frame memory 3, e.g., pixel values of pixels, and phases (which are also referred to as phase information), as described later. The frame memory 3-T stores the image data (which is also simply referred to as image) input at the point in time T. The frame memory 3-T−1 stores the image data at the point in time T−1. Furthermore, after a predetermined time period, the image data stored in the frame memory 3-T is stored in the frame memory 3-T−1, and the frame memory 3-T stores next image data.

The readout unit 4 reads out a motion vector stored in the memory 2 for each element 20 (FIG. 5(a)). The control unit 100 controls the memory 2, the frame memory 3, and the readout unit 4 according to a computer-implemented process. The control unit 100 controls the frame memory 3 to store an image, for example. The control unit 100 controls the frame memory 3 to output the pixels within a predetermined search region sp and reference region, and the phases of a search region tp of the search region sp and the reference region tr, to the memory 2, for example.

A more detailed description is now made regarding each component. The memory 2 of the image processing device 1 according to the present embodiment has multiple elements 20 in a grid shape, as shown in FIG. 5(a), for example. For simplification, presume that 3×3 elements (pixels) 20-1 through 20-9, are provided in the memory 2. The elements 20 are each connected.

A description is now made regarding a case where matching is performed for each element (pixel) 20 at a time. The element 20 has multiple pixels 21, e.g., pixels 21-1 and 21-2, a minimal pixel difference storage unit 22, motion vector storage unit 23, a subtracter 24, an absolute value generating unit 25, a comparison updating unit 26, and updating unit 27, as shown in FIG. 5(b).

Specifically, the element 20 not only memorizes (also referred to as "stores") one pixel, but also stores pixel values for two pixels, for example. Furthermore, the memory structure also computes the absolute value of the difference of the two pixels, and stores the obtained absolute value of the difference. "Matching data" is data with regard to a predetermined matching processing, such as pixel values, absolute values of difference, data indicating results of predetermined computation, and the like, for example.

The pixel 21 has multiple pixels, e.g., the pixel 21-1 and pixel 21-2. The pixel value of a pixel within the search region sp within the frame memory 3-T is input to the pixel 21-1, for example. To the pixel 21-2, the pixel value of a pixel within the reference region tr within the frame memory 3-T−1 is input, for example. The minimal pixel difference storage unit 22 stores the absolute value of the difference. With the minimal pixel difference storage unit 22, updating of the stored absolute value of the difference is performed by the comparison updating unit 26. The motion vector storage unit 23 stores a motion vector as described later. With the motion vector storage unit 23, updating of the motion vector is performed by the updating unit 27. The subtracter 24 outputs the difference value between the pixel value stored in the pixel 21-1 and the pixel value stored in the pixel 21-2, to the absolute value generating unit 25.

The absolute value generating unit 25 outputs the absolute value of the difference (which is also referred to as "absolute-value-of-difference") to the comparison updating unit 26 based upon the difference value between the pixel value of the pixel 21-1 and the pixel value of the pixel 21-2, output from the subtracter 24. The comparison updating unit 26 compares the absolute value of the difference output from the absolute value generating unit 25 with the absolute value of the difference stored in the minimal value difference storage unit 22.

As a result of the comparison, in the event that the absolute value of the difference output from the absolute value generating unit 25 is a smaller value, the comparison updating unit 26 stores the smaller value in the minimal pixel storage unit 22, thereby updating the absolute value of the difference. In the event the absolute value of the difference stored in the minimal pixel difference storage unit 22 according to the above-described comparison results is updated, the comparison updating unit 26 outputs updating information, indicating that the absolute value of the difference has been updated, to the updating unit 27. The updating unit 27 then updates the motion vector stored in the motion vector storage unit 23 based on the updating information output from the comparison updating unit 26 and the phase information. Specifically, in the event the comparison updating unit 26 outputs the updating information indicating that the absolute value of the difference has been updated, the updating unit 27 controls the motion vector storage unit 23 to store the phase information (phase) with regard to the search region tp and the reference region tr at the point in time, as a motion vector, thereby updating the motion vector. As described above, the memory 2 stores the information other than pixel values, such as the motion vectors and absolute values of difference, as addition information.

The subtracter 24, absolute value generating unit 25, comparison updating unit 26, updating unit 27 are all implemented via circuitry hosted on the memory chip. This circuitry may be programmable, programmed logic, fixed circuits, or any combination thereof.

FIG. 6 shows diagrams for describing updating of the phase and readout of the search region tp, with regard to pixel matching for the image processing device shown in FIG. 4. FIG. 6(a) is a diagram that illustrates the phase within the search region. FIG. 6(b) illustrates the relation between the phases and the search region tp. The phase (phase information) is an offset between the centers of the search region sp and the search region tp, for example. For example, the phase is defined as shown in FIG. 6(a). Specifically, as shown in FIG. 6(a), in the event that the center of the search region sp (5×5) matches the center of the search region tp (3×3), the phase is (0, 0). In the event that the center of the search region sp (5×5) is offset from the center of the search region tp (3×3) by one pixel toward the right side in the drawing, the phase is (1, 0). With the phases other than the above-described examples, the offset of the center of the search region sp from the center of the search region tp is defined as phase coordinates in the same way.

FIG. 6(b) is a diagram that illustrates updating of the phase and readout of the search region tp. For example, the control unit 100 updates phases, (−1, −1), (0, −1), (1, −1), (−1, 0), (0, 0), (1, 0), (−1, 1), (0, 1), (1, 1), in that order, reads out the pixels within the search region tp corresponding to the updated phase, and outputs the pixels to the corresponding elements 20 within the memory 2. As described later, the phase where the absolute value of the difference is the minimal value is taken as the true motion vector.

Note that the order for readout of pixels, and the order for updating of phases, for the control unit 100, is not restricted to this arrangement. All the pixels should be read out, and the order of readout is not restricted to the above-described arrangement. Here, in FIG. 5, the pixel 21-1 included in each element stores one pixel within the search region tp.

FIG. 7 is a flowchart for describing operations of the image processing device 1 shown in FIG. 1. Description will be made regarding the operations of the image processing device 1, particularly, the operations for generating a motion vector, with reference to FIG. 7. As an example, the control unit 100 stores each pixel of an arbitrary 3×3 reference region tr from the frame memory 3-T-1 in the corresponding element 20 within the memory 20 (ST11). Specifically, as shown in FIG. 4, one pixel of the reference region tr is stored in the pixel 21-2 of each element 20. The control unit 100 reads out the pixels within the search region tp (3×3) in the frame memory 3-T while updating (shifting) the phase within the search region sp (ST12), and stores each pixel in the corresponding element 20 within the memory 2 (ST13). Specifically, as shown in FIG. 4, the control unit 100 stores a corresponding pixel in the pixel 21-1 of each element 20. With the control unit 100, updating of the phases of the search region tp, and the readout of the pixels within the search region tp are performed nine times in total while shifting the phase by one pixel in the range between (−1, −1) and (1, 1) as shown in FIG. 6, for example, and following performing the processing nine times, the processing ends.

The absolute value of the difference between the pixels stored in the pixel 21-1 and pixel 21-2 is computed by the subtracter 24 and the absolute value generating unit 25 of each element 20. The obtained value is defined as the absolute-value-of-difference "a" (ST14). The comparison updating unit 26 compares the absolute-value-of-difference "a" with the absolute value of the difference (which will be referred to as "absolute-value-of-difference b", for example) stored in the minimal value difference storage unit 22 of the element 20 within the memory 2 (ST15). As a result of the comparison in Step ST15, in the event that the absolute-value-of-difference "a" is smaller, the comparison updating unit 26 stores the absolute-value-of-difference "a" in the minimal value difference storage unit 22, thereby updating the absolute value of the difference (ST16, ST17). Conversely, in the event that the absolute-value-of-difference "a" is greater, the comparison updating unit 26 does not perform updating (ST16), the flow proceeds to the processing for updating of the phase of the next search region tp, and for readout of the pixels within the search region tp.

Note that, in the initial stage, the minimal value difference storage unit 22 of the element 20 does not store the absolute value of the difference. In this case, the minimal value difference storage unit 22 stores the initial absolute values of difference without restriction.

In Step ST17, the comparison updating unit 26 outputs updating information indicating that the absolute value of the difference has been updated only in the case where the absolute value of the difference is updated, via the updating unit 27.

In the event that the comparison updating unit 26 outputs the updating information indicating that the absolute value of the difference has been updated, to the updating unit 27, the updating unit 27 causes the motion vector storage unit 23 to store the phase of the search region tp at this point in time, thereby updating the motion vector (ST18).

At the point that updating of all the phases ends (ST19), with each element 20, the minimal pixel difference storage unit 21-2 stores the minimal value of the absolute value of the difference between the pixels for the search region sp, and the phase (motion vector) wherein the minimal value has been updated is stored in the motion vector storage unit 23. On the other hand, in Step ST19, in the event that updating of all the phases does not end, the flow returns to the processing in Step ST12.

Each motion vector is obtained based upon the absolute value of the difference between the pixels 20, which indicates what position within the search region sp each pixel 20 within the reference region tr moves to at the time T. Finally, the readout unit 4 reads out each motion vector from the corresponding element 20, and outputs the motion vector.

As described above, the multiple frame memory 3 for storing image data, the memory 2 for generating and storing motion vectors based upon the data from the frame memory 3, the readout unit 4 for reading out a motion vector for each element from the memory, and the control unit 100 for controlling these units, are provided. Furthermore, the multiple grid-shaped elements 20 are provided to the memory 2.

The element 20 comprises pixels 21-1-1 and 21-1-2 for storing pixel values of the predetermined pixels of different frame memory, the subtracter 24 for outputting the difference value between the pixel 21-1-1 and the pixel 21-1-2, the absolute generating unit 25 for outputting the absolute value of the difference (absolute-value-of-difference) output from the subtracter 24, the minimal pixel difference storage unit 22 for storing the absolute value of the difference, the comparison updating unit 26 for comparing the obtained absolute value of the difference and the absolute value of the difference stored in the minimal pixel storage unit 22, updating the absolute value of the difference stored in the minimal pixel difference storage unit 22 according to the result of comparison, and outputting updating information indicating that updating has been performed, and the updating unit 27 for making the motion vector storage unit 23 store the phase coordinates at that point as the motion vector so as to update the motion vector in the event that the updating information indicating that the absolute value of the difference has been updated is output from the comparison updating unit 26, thereby enabling the motion vector to be calculated with a relatively small amount of calculation, and to be done so in a timely manner.

Furthermore, two procedures of phase updating for computation of the evaluation table and search of the minimal value for all the phases within the search region sp can be performed at a same time.

Furthermore, with the present embodiment, only the minimal value of the absolute value of the difference is updated, and accordingly, there is no need to generate an evaluation table on another memory for searching the minimal value, for example, thereby enabling the size of memory to be reduced.

Note that while the description of the image processing device 1 according to the present invention has been made with reference to the memory 2 with the size of 3×3, the size of memory is not restricted to the example. For example, in the event of providing the memory 2 having elements 20 for all the pixels of one frame, the motion vectors for all the pixels of one frame can be obtained at a time at the point that updating of the phase ends.

Second Embodiment

An image processing device 1 according to the present embodiment detects a motion vector between frames of a moving image having multiple frames. One aspect of detecting the motion vector is by block matching, as discussed below.

Block Matching

FIG. 8 is a functional block diagram that illustrates an image processing device 1a of the second embodiment according to the present invention.

FIG. 9(a) is a diagram that illustrates a memory structure of the image processing device 1a shown in FIG. 8. FIG. 9(b) is a diagram that illustrates a specific example of the memory structure shown in FIG. 8. FIG. 9(c) is a diagram that illustrates the memory structure for storing a motion vector, of the image processing device 1a shown in FIG. 8.

The image processing device 1a according to the present embodiment comprises a memory 2a, multiple frame memory 3a, e.g., frame memory 3a-T, T−1, the readout unit 4, and a control unit 100a, as shown in FIG. 8. With the image processing device 1 of the first embodiment according to the present invention, a motion vector for a certain pixel of interest is obtained with 3×3 block matching using 3×3 elements, for example.

With the image processing device 1a of the second embodiment, the motion vectors for the 3×3 pixels neighboring one to another are obtained at a same time. The memory 2a does not only store one pixel but also stores two pixels in the same way as with the memory 2 of the image processing device 1 according to the first embodiment, and calculates the absolute value of the difference therebetween. Furthermore, the memory 2a stores the obtained absolute value of the difference.

A description is now made regarding a specific example of block matching wherein pixel matching is applied.

The major difference between the image processing device 1a and the image processing device 1 according to the first embodiment is the difference in the memory structure. Accordingly, a description will now be made regarding only the differences.

The memory 2a of the image processing device 1a according to the present embodiment has multiple elements 20a in a grid shape as shown in FIG. 9, for example.

For simplification, 5×5 elements 20a-1 through 20a-25 are provided within the memory 2a. The elements 20 are each connected as shown.

A description is now made regarding a case of performing matching for each element 20 at a same time. Here, in the event of not specifying the elements 20a-1 through 20a-25, the element will be simply referred to as element (pixel) 20a. A description will be made taking the search region sp as the phase (−1, −1) through (1, 1) in increments of one pixel.

The memory 2a can transmit the absolute values of difference stored in the eight elements (e.g., elements 20a-1 through 20a-4, and elements 20a-6 through 20a-9) near the element of interest (e.g., element 20a-5), to the element of interest with the wiring between the elements 20a, as shown in FIG. 9(a). Each element 20a has a mechanism for receiving the nine absolute values of difference, and a mechanism for adding the absolute values of the difference. Thus, the elements of interest 20a obtain the sum of absolute values of the differences, and store the obtained sum. Note that each element 20a compares the obtained sum of the absolute value of the difference with the sum of absolute value of the difference stored beforehand, and in the event that the obtained value is smaller, the stored value is updated. In the event that the sum of absolute value of the difference is updated, the stored motion vector is updated with the motion vector corresponding to the obtained sum of the absolute value of the difference, as well.

A more detailed description now follows. The element 20a comprises multiple pixels 21a, e.g., pixels 21a-1 and 21a-2, a pixel difference storage unit 22a-1, a sum-of-difference storage unit 22a-2, the motion vector storage unit 23, the subtracter 24, a absolute value generating unit 25a, a comparison updating unit 26a, the updating unit 27, and the addition unit 28, as shown in FIG. 9(c). The difference between the element 20a and the element 20 according to the first embodiment includes the pixel difference storage unit 22a-1, the sum-of-difference storage unit 22a-2, the absolute value generating unit 25a, the comparison updating unit 26a, and the addition unit 28.

The pixel difference storage unit 22a-1 stores the absolute value of the difference between the pixel 21a-1 and the pixel 21a-2 output from the absolute value generating unit 25a. The pixel difference storage unit 22a-1 outputs the stored absolute value of the difference to the addition unit 28. The sum-of-difference storage unit 22a-2 stores the sum of absolute value of the difference. The sum of absolute value of the difference is updated by the comparison updating unit 26a in the event of predetermined conditions, as described later. The absolute value generating unit 25a outputs the absolute value of the difference between the pixel values of the pixel 21-1 and the pixel 21-2 (which will be also referred to as absolute-value-of-difference) output from the subtracter 24, to the pixel difference storage unit 22a-1.

The comparison updating unit 26a compares the sum-of-absolute-value-of-difference A output from the addition unit 28, with the sum of the absolute value of the difference stored in the sum-of-difference storage unit 22a-2 (which will be also referred to as sum-of-absolute-value-of-difference B), and in the event that the sum-of-absolute-value-of-difference A is shown to be smaller as a result of comparison, the sum-of-absolute-value-of-difference A is stored in the sum-of-difference storage unit 22a-2, thereby updating the sum of the absolute value of the difference.

In the event that the comparison updating unit 26a performs the above-described updating, the comparison updating unit 26a outputs the updating information indicating that updating has been performed, to the updating unit 27. In the event that the sum-of-absolute-value-of-difference A is shown to be greater as a result of comparison, the comparison upgrade unit 26a does not update the sum-of-absolute-value-of-difference B stored in the sum-of-difference storage unit 22a-2. The addition unit 28 adds the absolute-value-of-differences, each of which have been output from the eight elements 20a near the pixel (which will be also referred to as eight-adjacent-elements 20a), and the absolute-value-of-difference a output from the pixel difference storage unit 22a-1 so as to generate the sum-of-absolute-value-of-difference A, and outputs to the comparison updating unit 26a.

FIG. 10 shows diagrams for describing operations of the image processing device shown in FIG. 8, and particularly, the operations for performing updating of the phase and readout of the search region tp. FIG. 10(a) is a diagram that illustrates the phase within the search region sp. FIG. 10(b) is a diagram that illustrates the relation between the phase and the search region tp.

As shown in FIG. 10(a), the phase indicates the offset between the center of the search region sp and the center of the search region tp, for example. For example, let us say that the coordinates of the phase are defined as shown in FIG. 10(a).

Specifically, as shown in FIG. 10(a), in the event that the center of the search region sp (7×7) matches the center of the search region tp (5×5), the phase is (0, 0). For example, in the event that the center of the search region sp (5×5) is offset from the center of the search region tp (7×7) by one pixel toward the right side in the drawing, the phase is (1, 0). With the phases other than the above-described examples, the offset of the center of the search region tp from the center of the search region sp is defined as phase coordinates in the same way.

For example, the control unit 100a updates phases, (−1, −1), (0, −1), (1, −1), (−1, 0), (0, 0), (1, 0), (−1, 1), (0, 1), (1, 1), in that order, reads out the pixels within the search region tp corresponding to the updated phase, and outputs the pixels to the corresponding elements 20a within the memory 2a, as shown in FIG. 10(b). Note that the order for the control unit 100a reading out is not restricted to this arrangement. All the pixels should be read out, and the order for readout is not restricted to the above-described arrangement.

FIG. 11 is a flowchart for describing the operations of the image processing device 1a shown in FIG. 8. The operations of the image processing device 1, and in particular, the operations for detection of a motion vector will be described with reference to FIG. 11. In this case, the element of interest is taken as one of the elements 20a where the motion vector is actually stored, in FIG. 9. Here, the element of interest is not an element at the end of the memory 2a. For example, the control unit 100a stores each pixel within the arbitrary 5×5 reference region tr from the frame memory 3a-T−1 in the corresponding element 20a within the memory 2a (ST21). Here, in FIG. 8, one pixel within the reference region tr is stored in the pixel 21-2 included in each pixel 20a.

The control unit 100a reads out the region while updating the phase within the search region sp (ST22), each pixel within the region is stored in the corresponding element 20a within the memory 20a (ST23). The 5×5 region will be referred to as "search region tp". Here, in FIG. 8, each pixel within the search region tp is stored in the pixel 21a-1 included in the corresponding element 20a. Updating of the phases of the search region tp, and the readout of the pixels within the search region tp are performed nine times at the phase in the range between (−1, −1) and (1, 1) as shown in FIG. 10, for example, and following performing the processing nine times, the processing ends.

Next, the absolute-value-of-difference "a" is computed within each element 20a with regard to the value stored in the pixel 21a-1 and the value stored in the pixel 21a-2 (ST24). The result is stored in the pixel difference storage unit 22a-1 within each element 20a. Subsequently, with each element of interest, the addition unit 28 reads out the absolute-value-of-difference "a" from the eight elements 20a near the element of interest, and adds the eight absolute-value-of-difference "a" and the absolute-value-of-difference "a" stored in the pixel difference storage unit 22a-1 so as to obtain the sum-of-absolute-value-of-difference A (ST25).

Next, with each element of interest, the comparison updating unit 26a compares the sum of absolute value of the difference stored in the sum-of-difference storage unit 22a-2 beforehand (sum-of-absolute-value-of-difference B) with the sum-of-absolute-value-of-difference A output from the addition unit 28 (ST26, ST27), and in the event that the sum-of-absolute-value-of-difference A is smaller, the value stored in the sum-of-difference storage unit 22a-2 is updated from the sum-of-absolute-value-of-difference B to the sum-of-absolute-value-of-difference A (ST28).

On the other hand, in Step ST27, in the event that the sum-of-absolute-value-of-difference A is greater, the comparison updating unit 26a does not update. With the control unit 100a, the flow proceeds to updating for the next phase and readout of the search region tp. The flow returns to Step ST22. Note that, in the initial stage, the element of interest does not store the sum of absolute value of the difference. In this case, the initial sum of absolute value of the difference is stored unconditionally.

In Step ST29, only in the event that the sum of absolute value of the difference with regard to the element of interest is updated, the comparison updating unit 27 updates the motion vector stored in the motion vector storage unit 23 of the element of interest beforehand with the corresponding phase as the true motion vector. Thus, at the point of the phase updating ending (ST30), nine pixels of interest 20a each store the minimal value of the sum of absolute value of the difference between pixels in the search region sp, and corresponding motion vectors. On the other hand, in Step ST30, in the event that judgment is made that updating of all the phases has not ended, the flow returns to the processing in Step ST22.

FIG. 12 is a diagram that illustrates blocks extracted from the reference region tr stored in the frame memory of the image processing device shown in FIG. 8.

The corresponding motion vectors are obtained based upon the sum of absolute value of the difference between 3×3 blocks, which indicate what positions in the search region sp nine 3×3 blocks, extracted from the reference region tr as shown in FIG. 12, move to at a next point in time T. Finally, the readout unit 4 reads out these motion vectors from each element of interest, and outputs the motion vectors.

As described above, the image processing device 1a can generate motion vectors for 3×3 pixels at a time based upon the sum of difference wherein the absolute values of difference stored in the element of interest and the elements adjacent thereto (elements of 3×3).

With the present embodiment, while a description has been made regarding the memory which realizes block matching with the block size of 3×3, and the search region sp in the range between (−1, −1) and (1, 1) in increments of one pixel, the present invention is not restricted to this arrangement. For example, a modification may be made wherein, with wiring between elements 20a, each pixel of element is connected to peripheral 5×5 elements 20a, thereby enabling matching with a greater block size of 5×5 to be performed.

While a description has been made in a case of the total number of elements of 5×5 within the memory 2a, in the event that the elements for the entire pixels of one frame are provided to the memory 2a, for example, the motion vectors for the entire pixels can be obtained at a same time following updating of the phases.

Furthermore, the memory 2a is made up of a great number of elements 20a, each of which have a function of detecting a motion vector, thereby enabling motion vectors for adjacent multiple pixels to be obtained at a time.

Third Embodiment

Corresponding Pixel Detection

With the pixel matching by the image processing device 1a according to the above-described second embodiment, motion vectors are stored within the memory 2a as final results of the block matching.

An image processing device 1b according to the third embodiment directly stores and outputs "corresponding pixels" of the frame of interest, and the preceding and following frames.

Here, the corresponding pixels indicate pixels including a certain pixel of interest, wherein the pixel of interest can be correspond to the pixels of the preceding and following frames by correcting with motion vectors even in the event of moving images. The stored corresponding pixels can be used in class classification adaptation processing described later.

FIG. 13 is a conceptual diagram for describing extraction of corresponding pixels for the image processing device according to the third embodiment of the present invention. The horizontal axis indicates the X axis, the vertical axis indicates the Y axis, and the oblique axis indicates the time axis. With the present embodiment, presume a case of extraction of five corresponding pixels to the memory, which are related to the pixel of interest, and the pixels corresponding to the pixel of interest, of the frames in the range between the frame two frames preceding the frame of interest and the frame two frames following the frame of interest.

For simplification, a description is now made with the block size of 3×3 pixels, and the search region sp in the range between (−1, −1) and (1, 1) in increments of one pixel, for detecting corresponding pixels. Furthermore, constraining conditions are applied wherein the velocity of the corresponding pixels is constant in the range between the frame two frames preceding the frame of interest and the frame two frames following the frame of interest. Moreover, in the event that the corresponding pixel is positioned at the position of (−1, −1) of the frame T−1 (pixel 7 in FIG. 13), for example, the corresponding pixel is at (−2, −2) of the frame T−2 (pixel 9 in FIG. 13), the corresponding pixel is at (1, 1) of the frame T+1 (pixel 19 in FIG. 13), and the corresponding pixel is at (2, 2) of the frame T+2 (pixel 41 in FIG. 13), at all times. Note that the position of the pixel of interest has been taken as (0, 0) (pixel 5 in FIG. 13).

The image processing device 1*b* according to the present embodiment computes the absolute values of difference with regard to the 3×3 block centered on the pixel of interest of the frame of interest T and each of 3×3 blocks of the frames other than the frame of interest, and generates the motion vector such that the sum of the obtained absolute values of difference is minimal.

With the phases wherein the sum of the absolute values of difference is minimal, the pixels each of which are centers of the 3×3 blocks as shown in FIG. 13 are stored in the memory 2*b* within the image processing device 1*b*, and are output, as the corresponding pixels.

FIG. 14 is a functional block diagram that illustrates the image processing device of the third embodiment according to the present invention. The image processing device 1*b* according to the present embodiment comprises memory 2*b*, multiple frame memory 3*b*, e.g., frame memory 3*b*-T−2, 3*b*-T−1, 3*b*-T, 3*b*-T+1, and 3*b*-T+2, the readout unit 4, and a control unit 100*b*, as shown in FIG. 14. The major difference between the image processing device 1*b* and the image processing device 1*a* according to the second embodiment is the difference in the memory structure.

Furthermore, the operations of the control unit are different due to the image processing device 1*b* having the five frame memory 3*b*-T−2, 3*b*-T−1, 3*b*-T, 3*b*-T+1, and 3*b*-T+2. A description will be made regarding only the differences.

The control unit 100*b* controls the frame memory 3*b*-T+2 to store the input image, for example, and to output the image to the frame memory 3*b*-T+1 at a predetermined timing. The control unit 100*b* controls the frame memory 3*b*-T+1 to store the image output from the frame memory 3*b*-T+2, and to output the image to the frame memory 3*b*-T at a predetermined timing. The control unit 100*b* controls the frame memory 3*b*-T to store the image output from the frame memory 3*b*-T+1, and to output the image to the frame memory 3*b*-T−1 at a predetermined timing. The control unit 100*b* controls the frame memory 3*b*-T−1 to store the image output from the frame memory 3*b*-T, and to output the image to the frame memory 3*b*-T−2 at a predetermined timing. The control unit 100*b* controls the frame memory 3*b*-T−2 to store the image output from the frame memory 3*b*-T−1. The control unit 100*b* outputs the pixel values of the pixels within a predetermined reference region (5×5) from the frame memory 3*b*-T to the memory 2*b*. The control unit 100*b* outputs the pixels within the search region tpT−2 (5×5) within the predetermined search region spT−2 (9×9) and the corresponding phase information from the frame memory 3*b*-T−2 to the memory 2*b*. The control unit 100*b* outputs the pixels within the search region tpT−1 (5×5) within the predetermined search region spT−1 (7×7) and the corresponding phase information from the frame memory 3*b*-T−1 to the memory 2*b*. The control unit 100*b* outputs the pixels within the search region tpT+1 (5×5) within the predetermined search region spT+1 (7×7) and the corresponding phase information from the frame memory 3*b*-T+1 to the memory 2*b*. The control unit 100*b* outputs the pixels within the search region tpT+2 (5×5) within the predetermined search region spT+2 (9×9) and the corresponding phase information from the frame memory 3*b*-T+2 to the memory 2*b*.

In the event that the pixels within the above-described search region tp (5×5) are read out, the control unit 100*b* sets the pixels within the search region tp of the frame memory 3*b*-T−2, 3*b*-T−1, 3*b*-T, 3*b*-T+1, and 3*b*-T+2, so as to be linear as shown in FIG. 14, for example.

FIG. 15(*a*) is a diagram that illustrates the memory 2*b* of the image processing device 1*b* shown in FIG. 14. FIG. 15(*b*) is a diagram that illustrates the memory for storing the corresponding pixels. FIG. 15(*c*) is a functional block diagram that illustrates the element 20*b* of the memory 2*b* shown in FIG. 15(*a*).

The memory 2*b* of the image processing device 1*b* according to the present embodiment has 5×5 elements 20*b*-1 through 20*b*-25, and the elements 20*b* are each connected, as shown in FIG. 15, for example.

While in a case of 3×3 block matching, 3×3 elements are sufficient for obtaining the corresponding pixels for a certain pixel of interest, with the image processing device 1*b* according to the present embodiment, the motion vectors for adjacent 3×3 pixels are obtained at a same time, as shown in FIG. 14(*b*).

The memory 2*b* has multiple elements 20*b*, e.g., the elements 20*b*-1 through 20*b*-25 formed in a grid shape, as shown in FIG. 15(*a*), for example. The element 20*b* comprises multiple pixels 21*b*, e.g., a pixel 21*b*-T, 21*b*-T+2, 21*b*-T+1, 21*b*-T−1, and 21*b*-T−2, a sum-of-absolute-value-difference-A storage unit 22*b*-1, a sum-of-absolute-value-difference-B storage unit 22*b*-2, multiple subtracters 24*b*, e.g., subtracters 24*b*-1 through 24*b*-4, multiple absolute value generating units 25*b*, e.g., absolute value generating units 25*b*-1 through 25*b*-4, an adder 250, a comparison updating unit 26*b*, an updating unit 27*b*, an addition unit 28*b*, and multiple corresponding pixels 210*b*, e.g., corresponding pixels 210*b*-T, 210*b*-T+2, 210*b*-T+1, 210*b*-T−1, and 210*b*-T−2.

The pixel 21*b*-T stores the pixel value of the pixel of interest of the frame T (which will be also referred to as "pixel of interest"). The pixels 21*b*-T+2, 21*b*-T+1, 21*b*-T−1, and 21*b*-T−2, each store the four pixel values of the pixels which exist in a straight line including the pixel of interest in the space-time on the frames in the range between the frame two frames before the frame of interest and the frame two frames after the frame of interest, besides the frame of interest, as shown in FIG. 13.

The sum-of-absolute-value-difference-A storage unit 22*b*-1 stores the sum of the absolute value of the differences obtained from the pixel of interest and each of the four pixels, which have been stored, (which will be also referred to as "sum-of-absolute-value-difference A). The sum-of-absolute-value-difference-B storage unit 22*b*-2 stores the sum of the sum-of-absolute-value-differences A (which will be also referred to as "sum-of-absolute-value-difference B) stored in the eight elements near the element of interest (which will be also referred to as eight-adjacent elements).

The subtracter 24b-1 performs subtraction for the pixel value output from the pixel 3b-T−2 and the pixel value output from the pixel 3b-T, and outputs to the absolute value generating unit 25b-1. The subtracter 24b-2 performs subtraction for the pixel value output from the pixel 3b-T−1 and the pixel value output from the pixel 3b-T, and outputs to the absolute value generating unit 25b-2. The subtracter 24b-3 performs subtraction for the pixel value output from the pixel 3b-T+1 and the pixel value output from the pixel 3b-T, and outputs to the absolute value generating unit 25b-3. The subtracter 24b-4 performs subtraction for the pixel value output from the pixel 3b-T+2 and the pixel value output from the pixel 3b-T, and outputs to the absolute value generating unit 25b-4.

The absolute generating unit 25-1 outputs the absolute value of the difference value output from the subtracter 24b-1 (absolute value of the difference) to the addition unit 250. The absolute generating unit 25-2 outputs the absolute value of the difference value output from the subtracter 24b-2 to the addition unit 250. The absolute generating unit 25-3 outputs the absolute value of the difference value output from the subtracter 24b-3 to the addition unit 250. The absolute generating unit 25-4 outputs the absolute value of the difference value output from the subtracter 24b-4 to the addition unit 250.

The adder 250 adds the absolute values of difference output from the absolute value generating unit 25-1 through 25-4, and outputs to the sum-of-absolute-value-of-difference-A storage unit 22b-1.

The comparison updating unit 26b compares the absolute-value-of-difference B output from the addition unit 28b with the sum-of-absolute-value-of-difference B stored in the sum-of-absolute-value-of-difference-B storage unit 22b-2, and in the event that the sum-of-absolute-value-of-difference B output from the addition unit 28 is smaller as a result of comparison, the sum-of-absolute-value-of-difference B, which is a smaller value, is stored in the sum-of-absolute-value-of-difference-B storage unit 22b-2, thereby performing updating. In the event that the comparison updating unit 26b performs the above-described updating operation, the comparison updating unit 26b outputs the updating information to the updating unit 27b, which indicates that the sum-of-absolute-value-of-difference B stored in the sum-of-absolute-value-of-difference-B storage unit 22b-2 has been updated.

In the event that the comparison updating unit 26b outputs the updating information indicating that the sum-of-absolute-value-of-difference B has been updated, the updating unit 27b controls the corresponding pixels 210T−2, 210T−1, 210T+1, and 210T+2, to store the pixel values output from the pixels 21b-T−2, 21b-T−1, 21b-T, 21b-T+1, and 21b-T+2, thereby performing updating.

The addition unit 28b adds the sum-of-absolute-value-of-difference A output from the sum-of-absolute-value-of-difference-A storage unit 22b-1 and the sum-of-absolute-value-of-differences A output from the adjacent eight elements 20b, and outputs to the comparison updating unit 26b.

As described above, the element 2b can compute the absolute value of the difference for the pixel of interest 21b-T and each of other four stored pixels (pixels 21b-T+2, 21b-T+1, 21b-T−1, and 21b-T−2). Furthermore, the element 2b can perform computation for obtaining the sum of these absolute values of difference.

With block matching performed by the image processing device 1b according to the present embodiment, as shown in FIG. 15(a), the sum-of-absolute-value-of-differences A stored in the eight elements (elements 20b-1 through 20b-4, and 20b-6 through 20b-9 in FIG. 15(a)) near the element of interest (element 20b-5 in FIG. 15(a), for example) can be transmitted to the element of interest 20b-5 through wiring between the elements.

Each element 20b has features for receiving these nine sum-of-absolute-value-of-differences A, and adding all the received values. Accordingly, the element of interest can obtain the sum of the sum-of-absolute-value-of-differences A (the sum-of-absolute-value-of-difference B), and store the obtained value.

Note that the element 20b compares the obtained sum-of-absolute-value-of-difference B with the sum of the absolute value of the difference stored beforehand, and in the event that the obtained value is smaller, the stored value is updated.

In the event that the sum of absolute value of the difference is updated, all the pixels stored in the corresponding pixels 210b-T, 210b-T+2, 210b-T+1, 210b-T−1, and 210b-T−2, beforehand, are updated with the five pixels stored at the time (pixels stored in pixels 21b-T, 21b-T+2, 21b-T+1, 21b-T−1, and 21b-T−2).

FIG. 16(a) is a diagram which illustrates the phases of the search region spT+2 (9×9) and the search region tpT+2 on the frame T+2. FIG. 16(b) is a diagram which illustrates the phases of the search region spT+1 (7×7) and the search region tpT+1 on the frame T+1. FIG. 16(c) is a diagram which illustrates the phases of the search region spT−1 (7×7) and the search region tpT−1 on the frame T−1. FIG. 16(d) is a diagram which illustrates the phases of the search region spT−2 (9×9) and the search region tpT−2 on the frame T−2. FIG. 16(e) is a diagram for describing the processing for updating of the phase and readout of the search region tp by the image processing device 1b shown in FIG. 14.

The control unit 100b sets the coordinates of the phases as shown in FIG. 16(a) through FIG. 16(d). The horizontal axis indicates the x axis, and the vertical axis indicates the y axis. The control unit 100b sequentially updates the phase with (−1, −1), (0, −1), (1, −1), (−1, 0), (0, 0), (1, 0), (−1, 1), (0, 1), and (1, 1), in that order, with the phase of the search region tpT+1 as the standard, as shown in FIG. 16(e), for example, and updates the search region tp within the search region sp of each frame according to the updating of the phase. In this case, the motion vectors are (−1, −1), (0, −1), (1, −1), (−1, 0), (0, 0), (1, 0), (−1, 1), (0, 1), and (1, 1), according to each phase. Furthermore, the control unit 100b controls each element 20b to store one pixel of the search region tpT+2 in the pixel 21b-T+2, controls each element 20b to store one pixel of the search region tpT+1 in the pixel 21b-T+1, controls each element 20b to store one pixel of the search region tpT−1 in the pixel 21b-T−1, and controls each element 20b to store one pixel of the search region tpT−2 in the pixel 21b-T−2.

FIG. 17 is a flowchart for describing the operation of the image processing device shown in FIG. 14. In this case, the element of interest is defined as one of pixels wherein the corresponding pixels are actually stored, in FIG. 15(a). The element of interest is not an element positioned at the end of the memory. First of all, each pixel of the arbitrary 5×5 reference region tr is stored in the element 20b within the memory 2b from the frame memory T which is assumed to store the frame containing the pixel of interest. Here, in FIG. 15(c), the pixel 20b-T of each element 20b stores one pixel within the reference region tr (ST101).

Next, as shown in FIG. 14, the 5×5 region is read out from the frame memory 3b-T+2, 3b-T+1, 3b-T−1, and 3b-T−2, preceding or following the frame of interest with regard to time while updating the phase within the search region sp, and each pixel within the region is stored in the corresponding element 20*b* within the memory 2*b* (ST102).

The 5×5 region will be referred to as "search region tp". Note that, as described above, the phase of the search region tp read out from each frame memory is always on a straight line in the space-time as shown in FIG. 13, for example. Accordingly, updating of the phase is not performed for each frame, but rather, upon updating one frame as the standard, other phases are automatically decided.

For example, taking the phase of the search region tpT+1 as the standard, in the event that the spatial phase of the search region tpT+1 is (1, 1), the spatial phase of the search region tpT+2 read out from the frame memory T+2 is (2, 2), the spatial phase of the search region tpT−1 read out from the frame memory T−1 is (−1, −1), and the spatial phase of the search region tpT−2 read out from the frame memory T−2 is (−2, −2).

The control unit 100*b* performs updating of the phase of the search region tp, and the readout of the pixels within the search region tp, nine times with the phase of the search region tpT+1 as the standard in the range between (−1, −1) and (1, 1), as shown in FIG. 16, for example, and following performing the processing nine times, the processing ends.

The pixel 21*b*-T−1 of each element 20*b* stores one pixel of the search region tpT−1 (ST103). The pixel 21*b*-T−2 included in each element 20*b* stores one pixel of the search region tpT−2 (ST104). The pixel 21*b*-T+1 included in each element 20*b* stores one pixel of the search region tpT+1 (ST105). The pixel 21*b*-T+2 of each element 20*b* stores one pixel of the search region tpT+2 (ST106). The order for the above-described Steps ST103 through ST106 is not restricted to the aforementioned order.

Next, the subtracter 24*b*-2 and the absolute value generating unit 25*b*-2 within each element 20*b* compute the absolute-value-of-difference a for the value stored in the difference pixel 21*b*-T and the value stored in the pixel 21*b*-T−1 (ST107). In the same way, the subtracter 24*b*-1 and the absolute value generating unit 25*b*-1 within each element 20*b* compute the absolute-value-of-difference b for the value stored in the pixel 21*b*-T and the value stored in the pixel 21*b*-T−2 (ST108). In the same way, the subtracter 24*b*-3 and the absolute value generating unit 25*b*-3 within each element 20*b* compute the absolute-value-of-difference c for the value stored in the pixel 21*b*-T and the value stored in the pixel 21*b*-T+1 (ST109). In the same way, the subtracter 24*b*-4 and the absolute value generating unit 25*b*-4 within each element 20*b* compute the absolute-value-of-difference d for the value stored in the pixel T and the value stored in the pixel T+2 (ST110). The order for the above-described Steps ST107 through ST110 is not restricted to the aforementioned order.

Next, the adder 25*b* generates the sum-of-absolute-value-of-difference A by adding the absolute-value-of-differences a, b, c, and d, and stores in the sum-of-absolute-value-of-difference-A storage unit 22*b*-1 (ST111). Subsequently, the element of interest 20*b*-5 reads out the sum-of-absolute-value-of-differences A stored in the eight elements near the element of interest, which are connected with wiring, e.g., the eight elements 20*b*-1 through 20*b*-9 near the element 20*b*-5, taking the element 20*b*-5 as the element of interest as shown in FIG. 15, for example.

For example, with the element of interest 20*b*-5, the addition unit 28*b* thereof adds these values and the sum-of-absolute-value-of-difference A output from the adder 25*b* so as to obtain the sum-of-absolute-value-of-difference B (ST112), and outputs to the comparison updating unit 26*b*. Next, with each element of interest 20*b*, the comparison updating unit 26*b* compares the obtained sum-of-absolute-value-of-difference B with the sum-of-absolute-value-of-difference stored in the sum-of-absolute-value-of-difference-B storage unit 22*b*-2 beforehand (sum-of-absolute-value-of-difference C) (ST113), and in the event that the sum-of-absolute-value-of-difference B is smaller, the stored value is updated from the sum-of-absolute-value-of-difference C to the sum-of-absolute-value-of-difference B (ST114, ST115). Conversely, in the event that the sum-of-absolute-value-of-difference C is greater, updating is not performed, and the flow proceeds to the updating of the next phase and readout of the search region tp. The flow returns to Step ST102.

In the initial stage, the element of interest 20*b* does not store the sum-of-absolute-value-of-difference C. In this case, the initial sum-of-absolute-value-of-difference B is stored unconditionally. Next, with the updating unit 27*b* of the element of interest 20*b*, only in the event that the sum of the absolute value of the difference stored in the sum-of-absolute-value-of-difference-B storage unit 22*b*-2 is updated, the pixel values stored in the pixels 21*b*-T, 21*b*-T+2, 21*b*-T+1, 21*b*-T−1, and 21*b*-T−2, are stored in the corresponding pixels 210*b*-T, 210*b*-T+2, 210*b*-T+1, 210*b*-T−1, and 210*b*-T−2, respectively. That is to say, the corresponding pixels of the element of interest are updated with the true corresponding pixels (ST116).

Thus, at the point of updating of the phase ending, nine elements of interest 20*b* each store the minimal values of the sum-of-absolute-value-of-difference B for the search region sp and the corresponding pixels which have been updated at the point of the minimal value having been stored (ST117). On the other hand, in the event that judgment is made that updating of all the phases does not end in Step S17, the flow returns to the processing in Step ST102.

With the computation, the value which indicates what position within the search region sp the nine 3×3 blocks extracted from the reference region tr moves to at the point in time T, is obtained based upon the sum-of-absolute-value-of-differences between the 3×3 blocks, as shown in FIG. 12. In this state, while the block matching of the present embodiment is the same as with the block matching of the image processing device 1*a* according to the second embodiment from the point, with the image processing device 1*b* according to the third embodiment, the pixels at the centers of the blocks at the time are directly stored and output as the corresponding pixels for the pixel of interest.

Furthermore, with the present embodiment, block matching is performed not by computation using two frames, but is performed by computation using five frames with an assumption that the velocity within the frames is constant, and thus, detection precision for the corresponding pixels is improved even if the image contains noise, and also the computation is suitable for noise removal with the class classification adaptation processing described later.

Finally, the readout unit 4 reads out the corresponding pixels on the five frames from each element of interest, and outputs, for example. For example, the output results are used for the class classification adaptation processing described later.

The present invention is not restricted to the above-described arrangement. For example, while, with the present embodiment, description has been made regarding the memory performing extraction and output of the corresponding pixels with the 3×3 block size and the phase of the block in the range (−1, −1) and (1, 1) in increments of one pixel, the present invention is not restricted to this arrangement.

For example, a modification may be made wherein each element of interest is connected to the peripheral 5×5 elements with wiring so that processing can be made with a 5×5 block which is greater than that of the present embodiment. Furthermore, while a description has been made in a case of the total number of elements of 5×5 within the memory 2b, in the event that the elements for the entire pixels of one frame are provided to the memory 2a, for example, the corresponding pixels for the entire pixels can be obtained at a time following updating of the phases.

Fourth Embodiment

Class Classification Adaptation Processing Using Detection of Corresponding Pixels FIG. 18 is a functional block diagram that illustrates an image processing device 1c of a fourth embodiment according to the present invention. The image processing device 1c according to the fourth embodiment performs noise removal with the class classification adaptation processing using the memory 2b of the image processing device 1b according to the third embodiment.

The class classification adaptation processing is a process wherein a low-resolution image (which will be also referred to as "student image") is formed from a high-resolution original image (which will be also referred to as "tutor image") by reducing resolution of the original image, learning is performed using the tutor image and the student image in a statistical manner, and an input image is converted into a high-resolution image using the data from the learning even in the event that the input image is a low-resolution image.

While the class classification adaptation processing and noise removal therewith is disclosed in detail in Japanese Patent Application No. H10-304058, the entire contents of which is incorporated herein by reference, the image processing device 1c according to the present embodiment specifically performs the above-described processing using the memory. While assumption will be made in a case of an input image with the SD (standard) format, for example, the same processing can be performed for images with other formats.

Learning

The image processing device 1c according to the fourth embodiment comprises the memory 2b, the multiple frame memory 3b, e.g., the frame memory 3b-T+2, 3b-T+1, 3b-T, 3b-T−1, and 3b-T−2, a readout unit 4c, a noise addition unit 5, a class code generating unit 6, a normal equation addition unit 7, a coefficient storage unit (RAM) 8, and a control unit 100c, as shown in FIG. 18. The major difference between the image processing device 1c and the image processing device 1b according to the third embodiment is that the image processing device 1c further comprises the noise addition unit 5, the class code generating unit 6, the normal equation addition unit 7, and the coefficient storage unit (RAM) 8. A description will be made regarding only the differences.

The noise addition unit 5 adds a noise component to an input image. For example, the noise addition unit 5 generates random noise with a computer simulation so as to add the input image.

FIG. 19 is a functional block diagram that illustrates a first specific example of the noise addition unit of the image processing device 1c shown in FIG. 18. The noise addition unit 5-1 according to the first specific example comprises an RF modulator 51, an attenuator 52, and an RF demodulator 53, as shown in FIG. 19. With the noise addition unit 5-1, the RF modulator 51 performs RF modulation processing for an input image, e.g., an SD image, the attenuator 52 performs attenuation processing, and the RF demodulator 53 performs RF demodulation processing, thereby adding noise to the image. FIG. 20 is a functional block diagram that illustrates a second specific example of the noise addition unit of the image processing device 1c shown in FIG. 18.

The noise addition unit 5-2 according to the second specific example comprises the RF modulator 51, the attenuator 52, the RF demodulator 53, the subtracter 54, and the adder 55, as shown in FIG. 20.

With the noise addition unit 5-2, the RF modulator 51 performs RF modulation processing for an image with the uniform background (with the same level), the attenuator 52 performs attenuation processing, and the RF demodulator 53 performs RF demodulation processing, the subtracter 54 performs subtraction processing for the image subjected to the aforementioned processing and the original image with the uniform background so as to output only noise components to the adder 55, and the adder 55 adds the noise components to the input image (SD image), and outputs the image.

FIG. 21 is a functional block diagram that illustrates a third specific example of the noise addition unit of the image processing device 1c shown in FIG. 18. The noise addition unit 5-3 according to the third specific example comprises the RF modulator 51, the attenuator 52, the RF demodulator 53, the subtracter 54, the adder 55, and a frame adder 56, as shown in FIG. 21.

With the noise addition unit 5-3, the RF modulator 51 performs RF modulation processing for an image with the uniform background (with the same level), the attenuator 52 performs attenuation processing, and the RF demodulator 53 performs RF demodulation processing, the frame adder 56 and the subtracter 54 obtain the difference between the image subjected to noise removal and the original image so as to extract noise components, and the adder 55 adds the noise components to the input image (SD image), thereby outputting the image.

The readout unit 4c reads out the corresponding pixels for each element, and outputs to the class code generating unit 6 and the normal equation addition unit 7. The class code generating unit 6 detects the noise components, generates the class code, and outputs to the normal equation addition unit 7, based upon the values of the corresponding pixels for each element output from the readout unit 4c.

FIG. 22 is a diagram for describing the principle for the class code generating unit of the image processing device 1c shown in FIG. 18 generating the class code (detection of noise components). The class code generating unit 6 detects the noise components for the corresponding pixels which are sequentially output from the memory 2b, and converts the noise components into the class code, thereby generating the class code, as shown in FIG. 22, for example. The one set of corresponding pixels extracted by the memory 2b is basically assumed to be the same pixel over five frames in the time between T−2 and T+2, and accordingly, the one set of corresponding pixels basically hardly changes over time while deterioration such as blurring could be observed in a case of a high-speed moving image.

Accordingly, in the event that the change in the values of the output corresponding pixels is observed, the change can be regarded as noise. Accordingly, the change in the noise is converted into the class code, thereby enabling prediction computation corresponding to the change in noise described later to be performed.

The class code generating unit 6 obtains the maximal value b and the minimal value a in the five corresponding pixels, and generates the code corresponding to the maximal value b and the minimal value, e.g., specifically, the average code wherein, with each corresponding pixel, in the event that the level of the corresponding pixel is greater than the (the minimal value a+the maximal value b)/2, the bit of the code is set to 1, and conversely, in the event that the level of the corresponding pixel is smaller, the bit of the code is set to 0. For example, in a case as shown in FIG. 22, the average code is "10100".

Furthermore, the class code generating unit 6 obtains the dynamic range (the maximal value b–the minimal value a) within the corresponding pixels, and converts the value into the binary data, thereby generating the dynamic range code. For example, in the event that the dynamic range is 18, the dynamic range code is "10010". The class code generating unit 6 synthesizes the average code and the dynamic range code, thereby generating the class code. For example, in the above-described case, the average code "10100" and the dynamic range code "10010" are synthesized into the class code "1010010010". Here, the average code represents the change in noise over time, and the dynamic range code represents the magnitude of the noise level.

The image processing device 1c classifies the corresponding pixels according to the code, thereby enabling processing appropriately adjusted to the change in noise and the level of the image to be performed. Specifically, the normal equation addition unit 7 generates the normal equation for each class code output from the class code generating unit 6 based upon the corresponding pixels and pixels of the tutor image output from the readout unit 4, and generates the prediction coefficients for each class code. Specifically, the normal equation addition unit 7 generates the normal equation as shown in Expression (2) with the corresponding pixels as $x_{T+2}$, $x_{T+1}$, $x_T$, $x_{T-1}$, and $x_{T-2}$, and the pixel of the tutor image, which has not been subjected to noise addition, at the same position as the corresponding pixel $x_T$ of the frame memory T, as y.

$$y = a_{T+2} \times x_{T+2} + a_{T+1} \times x_{T+1} + a_T \times x_T + a_{T-1} \times x_{T-1} + a_{T-2} \times x_{T-2} \qquad (2)$$

Here, $a_{T+2}$, $a_{T+1}$, $a_T$, $a_{T-1}$, and $a_{T-2}$ are prediction coefficients to be estimated.

The normal equation addition unit 7 generates the normal equation by substituting the corresponding pixels and the pixel of the tutor image for each class into the Expression (2), and upon the required number of normal equations being obtained, the prediction coefficients are estimated with the least square estimation.

The normal equation addition unit 7 determines the prediction coefficients for each class code, and outputs the obtained coefficients to the coefficient storage unit (RAM) 8. The coefficient storage unit (RAM) 8 stores the prediction coefficients for each class code, output from the normal equation addition unit 7.

The control unit 100c reads out the reference regions tr from the images stored in the frame memory T−2, T−1, T, T+1, and T+2, and stores the reference regions tr in the memory 2c. Furthermore, the control unit 100c sets the search region sp corresponding to the reference region tr read out on another frame memory, and the search regions tp are read out and stored in the memory 2c while updating the phase.

The control unit 100c sequentially reads out the reference region tr while shifting the phase within the frame memory T in an appropriate manner, e.g., in order such as raster scan, so that the memory 2c can output the corresponding pixels for all pixels within the frame memory.

FIG. 23 shows diagrams for describing the procedures for the image processing device 1c shown in FIG. 18 reading out the reference region tr from the memory for the class classification adaptation processing. FIG. 23(a) is a diagram that illustrates the state prior to shift of the phase. FIG. 23(b) is a diagram that illustrates the state following shift of the phase.

For example, in the event that the size of the memory 2b is 5×5, the control unit 100c extracts the reference region tr while shifting the phase in increments of 3×3 pixels as shown in FIG. 23(a) and FIG. 23(b), and accordingly, the corresponding pixels are obtained for the entire pixel positions within the frame memory T. Accordingly, the entire pixels of the frame memory T can be subjected to processing. In this case, the memory 2c obtains nine corresponding pixels with the phases different one from another so as to readout of one reference region tr, and sequentially outputs the nine corresponding pixels.

The operations of the image processing device having the above-described configuration will be described in brief, regarding only the differences.

The noise addition unit 5 adds the noise components to the input image. The input image subjected to noise addition is sequentially stored in the frame memory T−2, T−1, T, T+1, and T+2. The control unit 100c reads out the pixel values of the pixels in the search region tp within the predetermined search region sp and phase information from each frame memory, and outputs to the memory 2b. The readout unit 4c reads out the corresponding pixels for each element 20b of the memory 2b, and outputs to the class code generating unit 6 and the normal equation addition unit 7.

The class code generating unit 6 detects the noise components based upon the values of the corresponding pixels for each element output from the readout unit 4c, generates the class code with the above-described predetermined processing as shown in FIG. 22, and outputs to the normal equation addition unit 7. The normal equation addition unit 7 generates the normal equation with the above-described predetermined processing based upon the corresponding pixels and the pixel of the tutor image output from the readout unit 4 for each class code, generates the prediction coefficients for each class code, and the prediction coefficients are stored in the coefficient storage unit (RAM) 8.

As described above, the image processing device 1c according to the present embodiment comprises the noise addition unit 5 for adding the noise components to the input image, the frame memory 3b-T−2, 3b-T−1, 3b-T, 3b-T+1, and 3b-T+2, the memory 2b, the readout unit 4c for reading out the corresponding pixels for each element within the memory 2b, the class code generating unit 6 for generating the class code based upon the corresponding pixels, the normal equation addition unit 7 for generating the normal equation based upon the class code and the corresponding pixels and the input pixel, and generating the prediction coefficients, the coefficient storage unit (RAM) 8 for storing the prediction coefficients, and the control unit 100c for performing the predetermined processing, and thus the predetermined input image is subjected to noise addition, and the class code can be generated based upon the input image and the image subjected to the noise addition, thereby enabling learning to be performed.

The information with regard to the results of the learning is used for generating a high-resolution original image from an image subjected to noise addition by an image processing device according to a fifth embodiment, for example.

Fifth Embodiment

Prediction

FIG. 24 is a functional block diagram that illustrates an image processing device of a fifth embodiment according to the present invention. An image processing device 1d according to the present embodiment estimates the noise components of an input image using the class code described in the description of the image processing device 1c according to the fourth embodiment, for example, and generates the high-resolution original image.

As shown in FIG. 24, the image processing device 1d comprises memory 2d, the multiple frame memory 3b, e.g., the frame memory 3b-T+2, 3b-T+1, 3b-T, 3b-T−1, and 3b-T−2, the readout unit 4c, the class code generating unit 6, a coefficient storage unit 8d, the estimation computation unit 9, and a control unit 100d. The major difference between the image processing device 1d according to the present embodiment and the image processing device 1c according to the fourth embodiment is that the image processing device 1d according to the present embodiment further comprises the coefficient storage unit 8d and the estimation computation unit 9.

In the event of performing noise prediction processing, the control unit 100d of the image processing device 1d stores the five frames (frames in the range between the frame two frames before the present frame and the frame two frames after the present frame, including the present frame) of the input image in the frame memory 3b-t+2 through 3bt−2. The control unit 100d reads out the reference region tr from the image stored in each frame memory 3bT, and stores the reference region tr in the memory 2d. The control unit 100d sets the search region sp corresponding to the reference region tr read out, to other memory 3b-T−2, 3b-T−1, 3b-T+1, and 3b-T+2, reads out the search region tp while updating the phase, and stores the search region tp in the memory 2d. The control unit 100d sequentially reads out the reference region tr in an order such as raster scan, for example, while shifting the phase in a predetermined order within the frame memory T, and the memory 2d finally outputs the corresponding pixels for the entire pixels within the frame memory.

For example, in the event that the size of the memory 3d is 5×5, the control unit 100d extracts the reference region tr while shifting the phase in increments of 3×3 pixels as shown in FIG. 23(a) and FIG. 23(b), the corresponding pixels can be obtained for the entire pixel positions within the frame memory T. Accordingly, all the pixels of the frame memory T can be subjected to processing. In this case, the memory 2d obtains nine corresponding pixels with the phases different one from another for readout of one reference region tr, and sequentially outputs these nine corresponding pixels. The class code generating unit 6 generates the class code for each set of the corresponding pixels which have been sequentially output from the memory 2d, based upon the noise components of the pixels.

The coefficient storage unit (ROM) 8d stores the prediction coefficients for each class code which is to be stored in the coefficient storage unit 8 at the point of learning, in the case of the image processing device 1c according to the fourth embodiment. The coefficient storage unit 8d outputs the prediction coefficients based upon the stored class code output from the class code generating unit 6. The estimation computation unit 9 estimates the prediction values based upon the prediction coefficients and the corresponding pixels output from the coefficient storage unit 8d, and outputs the prediction values. Specifically, the estimation computation unit 9 calculates the prediction value y with the above-described Expression (2), for example, based upon the prediction coefficients $a_{T+2}$, $a_{T+1}$, $a_T$, $a_{T−1}$, and $a_{T−2}$, and the corresponding pixels $x_{T+2}$, $x_{T+1}$, $x_T$, $x_{T−1}$, and $x_{T−2}$, output from the coefficient storage unit 8d, and outputs the obtained prediction value y. The prediction value y is a pixel value wherein the noise components have been removed.

The operations of the image processing device having the above-described configuration will be described in brief, regarding only the differences. The control unit 100d stores the input image subjected to noise addition in the frame memory T−2, T−1, T, T+1, and T+2. With the control unit 100d, the pixel values of the pixels on the search region tp within the predetermined search region sp, and the phase information are read out from each frame memory, and are output to the memory 2d. With the readout unit 4c, the corresponding pixels for each element 20d of the memory 2d are read out, and are output to the class code generating unit 6 and the estimation computation unit 9.

With the class code generating unit 6, the noise components are detected based upon the values of the corresponding pixels for each element output from the readout unit 4c, the class code is generated with a predetermined processing as shown in FIG. 23 described above, and the class code is output to the estimation computation unit 9. With the estimation computation unit 9, the above-described predetermined processing is performed based upon the prediction coefficients and corresponding pixels output from the coefficient storage unit (ROM) 8d, prediction values are estimated, and are output.

As described above, the image processing device 1d according to the present embodiment comprises the frame memory 3b-T−2, 3b-T−1, 3b-T, 3b-T+1, and 3b-T+2, the memory 2d, the readout unit 4c for reading out the corresponding pixels for each element within the memory 2d, the class code generating unit 6 for generating a class code according to the corresponding pixels, the coefficient storage unit (ROM) 8d for storing the coefficients corresponding to the class code, the estimation computation unit 9 for generating the prediction values based upon the prediction coefficients and the corresponding pixels output from the coefficient storage unit (ROM) 8d, and the control unit 100d for performing a predetermined control, and thus the image processing device 1d can output the pixels subjected to noise removal in increments of one pixel for the input image having noise stored in the frame memory T.

Furthermore, with the above-described configuration, the pixels or the like necessary for the class classification adaptation processing can be directly searched and output. Accordingly, the procedures wherein, following detection of the motion vectors, the phase correction is performed with the motion vectors so as to extract required pixels, can be simplified, for example.

Sixth Embodiment

FIG. 25 is a functional block diagram that illustrates an image processing device of a sixth embodiment according to the present invention. FIG. 26(a) is a configuration diagram of the memory of the image processing device shown in FIG. 25, and FIG. 26(b) is a diagram which illustrates an element of the memory shown in FIG. 26(a) for storing prediction pixels, and FIG. 26(c) is a functional block diagram which illustrates the element of the memory shown in FIG. 26(a). An image processing device 1e according to the present embodiment comprises memory 2e, the multiple frame memory 3b, e.g., the frame memory 3b-T−2, 3b-T−1, 3b-T, 3b-T+1, and 3b-T+2, coefficient storage unit (ROM) 8e, and a control unit 100e, as shown in FIG. 25.

With the image processing device 1e, each element 20e of the memory 2e has a function for the class classification adaptation processing, which is included in the image processing device 1d of the fifth embodiment. Description will be made regarding only the differences. The memory 2e has 5×5 elements 20e-1 through 20e-25 as shown in FIG. 26(a), for example, and the elements 20e are each connected with wiring.

The element 20e has the multiple pixels 21b, e.g., the pixel 21b-T, 21b-T+2, 21b-T+1, 21b-T-1, and 21b-T-2, the sum-of-absolute-value-of-difference-A storage unit 22b-1, the sum-of-absolute-value-of-difference-B storage unit 22b-2, the multiple subtracter 24b, e.g., subtracters 24b-1 through 24b-4, the multiple absolute value generating unit 25b, e.g., the absolute value generating units 25b-1 through 25b-4, the adder 25O, a comparison updating unit 26e, a class code generating unit 6e, an estimation computation unit 9e, and the addition unit 28b, as shown in FIG. 26(c).

The class code generating unit 6e generates the class code based upon the updating information indicating that the sum of absolute value of the difference has been updated, output from the comparison updating unit 26e, and the pixel values output from the pixels 21b-T, 21b-T+2, 21b-T+1, 21b-T-1, and 21b-T-2, and outputs to the coefficient storage unit (ROM) 8e. Specifically, upon the updating information which indicates that the sum of absolute value of the difference has been updated being input from the comparison updating unit 26e, the class code generating unit 6e generates the class code based upon the pixel values output from the pixels 21b-T, 21b-T+2, 21b-T+1, 21b-T-1, and 21b-T-2, and outputs to the coefficient storage unit (ROM) 8e.

The estimation computation unit 9e estimates the prediction values based upon the prediction coefficients output from the coefficient storage unit (ROM) 8e, and the pixels output from the pixels 21b-T, 21b-T+2, 21b-T+1, 21b-T-1, and 21b-T-2, and outputs the prediction values.

The operations of the image processing device 1e having the above-described configuration will be described only regarding the difference. In the event of performing noise prediction processing, the control unit 100e stores five frames (frames in the range between the frame two frames before the present frame and the frame two frames after the present frame, including the present frame) of the input image in the frame memory 3b-T+2 through 3b-T-2.

The control unit 100e reads out the reference region tr from the image stored in each frame memory 3bT, and stores the reference region tr in the memory 2e. The control unit 100e sets the search region sp corresponding to the reference region tr read out, on other frame memory 3b-T-2, 3b-T-1, 3b-T, 3b-T+1, and 3b-T+2, reads out the search region tp, and stores the search region tp in the memory 2e while updating the phase.

With the control unit 100e, the reference region tr to be read out is sequentially read out in an order such as raster scan while shifting the phase in a predetermined order within the frame memory T so that the memory 2e can finally output the corresponding pixels for all the pixels within the frame memory.

With the element 20e within the memory 2e, upon the updating information which indicates that the sum of absolute value of the difference has been updated being input from the comparison updating unit 26e, the class code generating unit 6e generates the class code based upon the pixel values output from the pixels 21b-T, 21b-T+2, 21b-T+1, 21b-T-1, and 21b-T-2, and outputs the class code to the coefficient storage unit (ROM) 8e.

The coefficient storage unit (ROM) 8e outputs the stored coefficients to the estimation computation unit 9e according to the class code output from the class code generating unit 6e. The estimation computation unit 9e estimates the prediction value based upon the prediction coefficients output from the coefficient storage unit (ROM) 8e and the pixels output from the pixels 21b-T, 21b-T+2, 21b-T+1, 21b-T-1, and 21b-T-2, outputs the prediction value.

The estimation computation unit 9 performs the above-described predetermined processing based upon the prediction coefficients output from the coefficient storage unit (ROM) 8e and the corresponding pixels, the prediction value is estimated, and is output to the frame memory or the like, for example.

As described above, with the image processing device 1e according to the present embodiment, each element 20e further includes the class code generating unit 6e, and the estimation computation unit 9e, thus having a function for the class classification adaptation processing. Specifically, for each updating of the sum of absolute value of the difference, noise removal is performed with the class classification processing using the pixels stored in the pixels T, T+1, T+2, T-1, and T-2, and the predicted pixel is output. With another frame memory or the like, the pixel value is updated for each output of the pixel, thereby finally obtaining an image subjected to noise removal.

Note that the present invention is not restricted to the present embodiment, but rather various arbitrary and suitable modifications may be made. For example, an arrangement may be made wherein the image processing device 1c according to the fourth embodiment and the image processing device 1d according to the fifth embodiment are integrated. Thus, the class code can be generated by learning the noise components, and the noise components can be estimated based upon the generated class code, thereby enabling the generation of a high-resolution image.

Seventh Embodiment

Plane Matching

FIG. 27 is a conceptual diagram for describing the operations of an image processing device of a seventh embodiment according to the present invention.

For example, in the event that there are objects ob1 and ob2, which move over time, in the input image as shown in FIG. 27(a), and the reference block with a predetermined size is set on the image, there is the problem that the reference block could contain multiple objects as shown in FIG. 27(b).

With block matching, the motion vector is obtained as a motion of the entire block, and accordingly, in the event of attempting to obtain the motion of the pixel of interest within the reference block, the motion vector of another object (object ob2) might be mistaken for the motion of the pixel of interest (object ob1), or motion halfway between both objects might be obtained.

With the image processing device according to the present embodiment, plane matching, described later, is performed so as to generate accurate motion vectors even in the event that the reference block contains multiple objects.

FIG. 28 is a conceptual diagram for describing the operations for plane matching performed by the image processing device of the seventh embodiment according to the present invention. Referring to FIG. 28, a description will be made regarding the operations for plane matching performed by the image processing device.

With plane matching, in the event that there is the objects ob1 and ob2 as shown in FIG. 28(a), for example, the reference block is set on the image as shown in FIG. 28(b), the pixels with regard to the same object as the pixel of interest are extracted from the reference block as shown in FIG. 28(c), and matching is performed based upon the extracted pixels.

The processing wherein pixels are extracted for each identical object from the image for plane matching will be referred to as "plane separation".

FIG. 29 is a functional block diagram that illustrates the image processing device of the seventh embodiment according to the present invention. An image processing device 1f according to the present embodiment comprises memory 2f, multiple frame memory 3f, e.g., frame memory 3f-T and 3f-T−1, a readout unit 4f, a control unit 100f, and a plane separation unit 110, as shown in FIG. 29. A description will be made regarding only the differences between the present embodiment and the above-described embodiments.

Let us say that in the event that the size of the input image is w×h, the size of the memory 2f is (w−2)×(h−2), which is almost the same as the number of the pixels on the entire screen, as shown in FIG. 29, for example. The image processing device 1f performs plane separation processing for the entire screen on the frame memory 3f-T−1 beforehand, for example, in order to search motion vectors, and performs processing wherein plane information with regard to each pixel is stored in all the elements within the memory 2f. The frame memory 3f-T stores the frame at the point in time T. The frame memory 3f-T is frame memory with the size of the search region sp (w×h), for example, the pixels within the predetermined search region tp (w−2)×(h−2) are read out by the control unit 100f, for example, and the pixels read out are output to the memory 2f.

The frame memory 3f-T−1 stores the frame at the point in time T−1. The frame memory 3f-T−1 is frame memory with the size of w×h, for example, the pixels within the predetermined reference region tr (w−2)×(h−2) are read out by the control unit 100f, for example, and the pixels read out are output to the memory 2f. The readout unit 4f reads out the motion vector stored in each element of the memory 2f, and outputs the motion vector. The plane separation unit 110 performs plane separation processing, described later, based upon the image data stored in the frame memory 3f-T−1, and outputs the plane information from the results of the processing to the memory 2f. The control unit 100f performs predetermined processing described later.

A description is made below in detail regarding each component.

Memory Structure

FIG. 30(a) is a schematic diagram that illustrates the memory of the image processing device shown in FIG. 29. FIG. 30(b) is an enlarged diagram that illustrates a part of FIG. 30(a). FIG. 30(c) is a functional block diagram that illustrates the element of the memory shown in FIG. 30(b). The memory 2f has multiple elements 20f as shown in FIG. 30(a) and FIG. 30(b). The element 20f includes the pixel 20-1, the pixel 20-2, a pixel difference storage unit 22f-1, a sum-of-difference storage unit 22f-2, the motion vector storage unit 23, the subtracter 24, the absolute value generating unit 25, a comparison updating unit 26f, the updating unit 27, an addition unit 28f, a plane information storage unit 29, and a switch 30, as shown in FIG. 30(c).

The memory 2f outputs the absolute-value-of-differences stored in the eight elements (elements 20f-1 through 20f-4, and 20f-6 through 20f-9, in FIG. 15) near the element of interest (pixel 20f-5 in FIG. 15), to the element of interest with wiring between the pixels 20f as shown in FIG. 15, for example.

Note that a judgment is made regarding whether an output is performed, by the switch 30 for each element 20f. Furthermore, the memory 2f does not only store one element, but also can store two pixels, and compute the absolute value of the difference between the two pixels in the same way as with the memory 2a according to the first embodiment. Furthermore, the memory 2f stores the absolute value of the difference, which is a result therefrom. Moreover, the memory 2f can store the plane information corresponding to the pixels stored in the present embodiment, which is different from the image processing device according to the second embodiment.

Each component will be described below regarding only the differences.

The image difference storage unit 22f-1 outputs the stored absolute value of the difference to the addition unit 28f. The sum-of-difference storage unit 22f-2 outputs updated data to the sum-of-difference storage unit 22a-2 based upon the data output from the addition unit 28f and the sum of absolute value of the difference stored in the sum-of-difference storage unit 22f-2. The addition unit 28f adds the data output from the switches 30 and the sum of absolute value of the difference stored in the pixel difference storage unit 22f-1, and outputs to the comparison updating unit 26f. The comparison updating unit 26f compares the sum-of-absolute-value-of-difference A output from the addition unit 28f with the sum of absolute value of the difference stored in the sum-of-difference storage unit 22a-2 (which will be referred to as sum-of-absolute-value-of-difference B), and in the event that the sum-of-absolute-value-of-difference A is smaller as a result of comparison, the sum-of-absolute-value-of-difference A is stored in the sum-of-difference storage unit 22-f, thereby updating the sum of absolute value of the difference.

In the event that the comparison updating unit 26f performs the above-described updating, the comparison updating unit 26f outputs the updating information, which indicates that the updating has been performed to the updating unit 27. In the event that the sum-of-absolute-value-of-difference A is greater as a result of comparison, the comparison updating unit 26f does not perform updating of the sum-of-absolute-value-of-difference B stored in the sum-of-difference storage unit 22a-2.

The updating unit 27f updates the motion vector stored in the motion vector storage unit 23 based upon the updating information and phase information output from the comparison updating unit 26f. Specifically, in the event that the comparison updating unit 26f outputs the updating information which indicates that the absolute value of the difference has been updated, the updating unit 27f makes the motion vector storage unit 23 store the phase at the point as the motion vector, thereby updating the motion vector.

The addition unit 28f adds the absolute-value-of-difference "a" output from the pixel difference storage unit 22a-1 and the absolute-value-of-differences "a" of the eight elements 20a near the pixel (which will be also referred to as eight-adjacent elements) output from the switches 30 so as to generate the sum-of-absolute-value-of-difference A, and outputs to the comparison updating unit 26f. The plane information storage unit 29 stores the plane information described later.

The switch 30 performs judgment of matching of plane information, and serves as a gate for outputting the absolute-value-of-difference a of each element 20f to the addition unit 28f. For example, the switch 30 outputs the absolute value of the difference to the addition unit 28f according to the plane information with regard to the element of interest 20f and the plane information with regard to the eight elements 20f near the element of interest. Specifically, the switch 30 compares the plane information stored in the plane information storage unit 29 of the element of interest 20f with the plane information stored in the plane information storage unit 29 of each of other eight elements 20f near the element of interest, and in the event of matching, the absolute value of the difference stored in the pixel difference storage unit 22f-1 is output to the addition unit 28f, and conversely in the event of not matching, the absolute-value-of-differences stored in the eight elements 20f near the element of interest are not output to the addition unit 28f.

In the event that the sum of each element 201 is updated, the motion vector at the point is updated from the value stored beforehand, as well.

Plane Separation and Plane Information

FIG. 31 is a diagram for describing the processing performed by the plane separation unit of the image processing device shown in FIG. 29. Each component in the input image such as the background, object, or the like, will be referred to as a "plane". Furthermore, the processing wherein the image is separated into planes will be referred to as "plane separation".

The plane separation unit 110 assigns a predetermined value (label) to each plane subjected to plane separation, e.g., LEVEL 1 is assigned to the plane 1, as shown in FIG. 31, for example. The information which indicates which plane each pixel of the image belongs to will be referred to as "plane information".

A description will be made below regarding a specific example of the method for plane separation.

FIG. 32 is a functional block diagram that illustrates a specific example of the plane separation unit of the image processing device 1f. For example, the plane separation unit 110 separates the input image into predetermined planes using the fact that the luminance and color is generally the same level within the same object, background, or the like, in the image. The plane separation unit 110 comprises a histogram computation unit 111, a peak detection unit 112, a trough detection unit 113, a elimination unit 114, a trough integration unit 115, and a labeling unit 116, as shown in FIG. 32, for example. The histogram computation unit 111 generates a histogram (frequency distribution) for each level (luminance or color) according to the input image, and stores the histogram.

FIG. 33 is a diagram that illustrates a specific example of the histogram generated by the histogram computation unit 111 of the plane separation unit of the image processing device 1f shown in FIG. 32. The horizontal axis indicates the level, and the vertical axis indicates the histogram (frequency).

The histogram copulation unit 111 generates a histogram according to the input image as shown in FIG. 33, for example. The histogram computation unit 111 outputs the generated histogram (frequency distribution) to the peak detection unit 112. The peak detection unit 112 detects the level exhibiting the maximal frequency (peak) in the histogram, and outputs to the trough detection unit 113 based upon the input histogram.

For example, the peak detection unit 112 detects the level exhibiting the highest frequency within the histogram (peak) based upon the histogram output from the histogram computation unit 111, or the histogram output from the elimination unit 114, and outputs the peak to the trough detection unit 113.

The trough detection unit 113 specifies the frequency of the object including the peak based upon the peak of the histogram, for example. For example, the trough detection unit 113 detects two positions of the troughs at both sides of the level peak of the histogram based upon the level exhibiting maximal frequency (peak) output from the peak detection unit 112.

Specifically, the trough detection unit 113 specifies a point as the right trough, wherein the frequency is the minimal in the predetermined range with the peak as the standard, e.g., in the range between the point of the peak and (the point of peak+a), and specifies a point as the left trough, wherein the frequency is the minimal in the predetermined range with the peak as the standard, e.g., in the range between (the point of peak−a) and the point of the peak.

The elimination unit 114 eliminates the frequency of the object including the predetermined peak, for example. For example, the elimination unit 114 eliminates the frequency corresponding to the level in the range between the two left and right troughs with the peak of the histogram as the standard, from the histogram, and outputs to the peak detection unit 112.

FIG. 34 is a specific example of the histogram for describing the operations of the elimination unit of the plane separation unit of the image processing device shown in FIG. 32. The elimination unit 114 eliminates the frequency corresponding to the level in the range between the two left and right troughs with the predetermined peak as the center, from the histogram as shown in FIG. 34, for example, and outputs to the peak detection unit 112. In the event that judgment is made that the frequency corresponding to the all the level in the histogram becomes 0, the elimination unit 114 outputs the frequency of occurrence corresponding to the troughs, to the trough integration unit 115.

The trough integration unit 115 integrates the troughs with the levels close one to another based upon the frequency of each trough output from the elimination unit 114, and outputs to the predetermined labeling unit 116. Specifically, the trough integration unit 115 integrates the troughs with the level close one to another, for each trough. More specifically, other troughs with the levels in the predetermined range with the position of the trough detected at first as the standard, e.g., in the range between (the point of the trough detected at first−b) and (the point of the trough detected at first+b), are integrated into the trough detected at first, thereby eliminating other troughs.

FIG. 35 is a diagram for describing the troughs of the histogram prior to integration processing performed by the trough integration unit of the image processing device shown in FIG. 32. FIG. 36 is a diagram for describing the troughs of the histogram subjected to integration processing performed by the trough integration unit of the image processing device shown in FIG. 32. Specifically, the trough integration unit 115 integrates the troughs with the levels close one to another, as shown in FIG. 36, based upon the frequency of each trough output from the elimination unit 114 as shown in FIG. 35, for example.

The labeling unit 116 assigns a predetermined value (label) to each plane subjected to plane separation according to the input image and the image output from the trough integration unit 115. Specifically, the labeling unit 116 regards the pixels of the input image with the levels in the range between the same pair of troughs, to be contained in the same plane, thereby assigning the same label to the pixels. More specifically, the labeling unit 116 judges which range between the troughs the level (luminance or color) belongs to, for each pixel, and the same label is assigned to the pixels in the same range between the troughs.

FIG. 37 is a flowchart for describing the operations of the plane separation unit of the image processing device shown in FIG. 32. In Step ST201, the histogram computation unit 111 generates a histogram for each value level (luminance or color), and stores the histogram. Furthermore, the histogram computation unit 111 outputs the generated histogram to the peak detection unit 112. In Step ST202, the peak detection unit 112 detects the level exhibiting the maximal frequency in the histogram (peak) based upon the input histogram, and outputs to the trough detection unit 113. Specifically, the peak detection unit 112 detects the level exhibiting the maximal frequency in the histogram (peak) based upon the histogram output from the histogram computation unit 111, or the histogram output from the elimination unit 114, and outputs to the trough detection unit 113.

In Step ST203, the trough detection unit 113 detects the troughs at both sides of the peak. Specifically, the trough detection unit 113 determines the point wherein the frequency is the minimal in the range between the position of the peak and (the position of the peak+a) with the peak as the standard to be the right trough. In the same way, the trough detection unit 113 determines the point wherein the frequency is the minimal in the range between the position of (the position of the peak−a) and the position of the peak with the peak as the standard to be the left trough.

The trough detection unit 113 specifies the frequency corresponding to the object including the peak, for example, based upon the peak of the histogram. For example, the trough detection unit 113 detects the two points of troughs at both sides of the level peak of the histogram based upon the level exhibiting the maximal frequency (peak) output from the peak detection unit 112. Specifically, the trough detection unit 113 determines the point wherein the frequency is the minimal in the predetermined range with the peak as the standard, e.g., in the range between the peak position and (the peak position+a), to be the right trough, and determines the point wherein the frequency is the minimal in the predetermined range with the peak as the standard, e.g., in the range between (the peak position+a) and the peak position, to be the left trough.

In Step ST205, the elimination unit 114 eliminates the frequency corresponding to the level between the two left and right troughs, from the histogram. Furthermore, the elimination unit 114 judges whether or not the frequency corresponding to all the levels becomes 0 in the histogram, and in the event that judgment is made that the frequency is not 0, the flow returns to the processing in Step ST202. On the other hand, with the judgment made by the elimination unit 114 in Step ST205, in the event that the frequency corresponding to all the levels in the histogram becomes 0, the frequency corresponding to the troughs are output to the trough integration unit 115.

In Step ST206, the trough integration unit 115 integrates the troughs with the levels close one to another based upon the frequency of each trough output from the elimination unit 114, and outputs to the predetermined labeling unit 116. Specifically, the trough integration unit 115 integrates the troughs with the levels close one to another, for each trough. More specifically, the trough integration unit 115 integrates other troughs wherein the levels are in the predetermined range with the trough which has been detected at first as the standard, e.g., in the range between (the peak position detected at first−b) and (the peak position detected at first+b), for example, into the peak which has been detected at first, thereby eliminating other troughs.

In Step ST207, the labeling unit 116 assigns a predetermined value (label) to each plane subjected to plane separation according to the input image and the image output from the trough integration unit 115.

Specifically, the labeling unit 116 regards the pixels with the levels between the same pair of troughs, to belong to the same plane, thereby assigning the same label to the pixels. More specifically, the labeling unit 116 judges which ranges between the troughs the level (luminance or color) belongs to, for each pixel, and the same label is assigned to the pixels in the range between the same pair of troughs. Thus, the operation with regard to a series of plane separation ends.

FIG. 38 is a flowchart for describing the operations of the image processing device shown in FIG. 29. A description is made regarding the operations of the image processing device 1$f$ primarily around the device 20$f$, with reference to FIG. 38. For simplification, a description is made with the block size of 3×3 pixels and the search region sp in the range between (−1, −1) and (1, 1) in increments of one pixel, with regard to the memory for performing plane matching.

Here, the element of interest is assumed to be one of the elements wherein the motion vectors are actually stored in FIG. 30($b$). The element at the end of the memory 20$f$ is not the element of interest. For the sake of simplifying description, presume that the size of the image is w×b. The plane separation unit 110 performs the above-described predetermined plane separation processing based upon the image stored in the frame memory 3$f$-T−1, and outputs the plane information from the results of the processing for each element 20$f$ within the memory 2$f$.

Each element 20$f$ stores the plane information output from the plane separation unit 110. Specifically, plane information for one pixel is stored in the plane information storage unit 29 of each element 20$f$ (ST301).

As shown in FIG. 29, each pixel of the reference region tr of (w−2)×(h−2) stored in the frame memory 3$f$-T−1 is stored in each element 20$f$ within the memory 2$f$. Specifically, as shown in FIG. 30($c$), the pixel 20-2 of each element f stores one pixel of the reference region tr.

Next, the region of (w−2)×(h−2) is read out while updating the phase within the search region sp, and each pixel within the region is stored in each element within the memory (ST302). The region of (w−2)×(h−2) will be referred to as "search region tp". As shown in FIG. 30($c$), the pixel 20-1 of each element 20$f$ stores the one pixel of the search region tp.

Updating of the phase and readout of the search region tp are performed nine times with the phase in the range between (−1, −1) and (1, 1) generally in the same way as with the above-described block matching, wherein only the number of pixels of the search region tp is different from that of the block matching, and following performing the processing nine times, the processing ends.

With each element 20, the subtracter 24 generates the difference between the value stored in the pixel 20-1 and the value stored in the pixel 20-2, absolute value generating unit 25 generates the absolute value of the difference (absolute-value-of-difference a) output from the subtracter 24, and the pixel difference storage unit 22$f$-1 stores the absolute-value-of-difference a (ST305).

Next, each element of interest reads out the plane information from the eight elements near the element of interest. Specifically, the switch 30 judges whether or not the plane information stored in the plane information storage unit 29 of the element of interest 20$f$ matches each of plane information stored in the plane information storage unit 29 of the other eight elements 20$f$ near the element of interest. With the switch 30, the absolute-value-of-difference a stored in the pixel difference storage unit 22$f$-1 of the element 20$f$ wherein judgment has been made that the plane information matches that of the element of interest, is read out and is subjected to addition. The addition unit 28$f$ adds the absolute-value-of-differences a output from the switches 30, thereby obtaining the sum-of-absolute-value-of-difference A (ST306).

Next, with each element of interest, the comparison updating unit 26$f$ compares the sum of absolute value of the difference stored beforehand (sum-of-absolute-value-of-difference B) with the sum-of-absolute-value-of-difference A (ST307), and in the event that the sum-of-absolute-value-of-difference A is smaller, the value stored in the sum-of-difference storage unit 22$f$-2 is updated from the sum-of-absolute-value-of-difference B to the sum-of-absolute-value-of-difference A (ST309). Conversely, in the event that the sum-of-absolute-value-of-difference A is greater, the comparison updating unit 26$f$ does not perform updating, the flow proceeds to updating of the next phase and readout of the search region tp. Note that, in the initial stage, the element of interest stores the sum-of-absolute-value-of-difference. In this case, the element of interest stores the initial sum-of-absolute-value-of-difference without restriction.

Subsequently, only in the event that the sum of absolute value of the difference of the element of interest is updated, the motion vector stored in the element of interest beforehand is updated with the phase at the time as the true motion vector (ST310). Thus, at the point that updating of the phase ends, the nine elements of interest each store the minimal value of the sum of absolute value of the difference between pixels in the search region sp and the corresponding motion vector. The readout unit 4$f$ reads out these motion vectors from each element of interest, and outputs the motion vectors.

As described above, the image processing device according to the present embodiment comprises the histogram computation unit 111 for generating a histogram (frequency distribution) for each level (luminance or color) according to the input image, the peak detection unit 112 for detecting the level exhibiting the maximal frequency in the histogram (peak) based upon the histogram, the trough detection unit 113 for specifying the frequency corresponding to the object including the peak, for example, based upon the peak of the histogram, the elimination unit 114 for eliminating the frequency corresponding to the object including the predetermined peak, the trough integration unit 115 for integrating the troughs with the levels close one to another based upon the frequency corresponding to each trough output from the elimination unit 114, the plane separation unit 110 having the labeling unit 116 for assigning a predetermined value (label) to each plane subjected to plane separation according to the input image and the image output from the trough integration unit 115, the plane information storage unit 29 for storing the plane information for each element 20$f$, and the switch 30 for judging of matching of the plane information so as to output the absolute-value-of-difference "a" from each element 20$f$ to the addition unit 28$f$, thereby generating accurate motion vectors even in the event that the reference block contains multiple objects, for example.

Eighth Embodiment

FIG. 39 is a functional block diagram of an image processing device of an eighth embodiment according to the present invention. An image processing device 1$g$ according to the present embodiment comprises memory 2$g$, multiple frame memory 3$g$, e.g., frame memory 3$g$-T and 3$g$-T-1, a readout unit 4$g$, a control unit 100$g$, a plane separation unit 110$g$, and a plane information buffer 120, as shown in FIG. 39.

The difference between the image processing device 1$g$ and the image processing device 1$f$ according to the seventh embodiment is that the image processing device 1$g$ comprises memory 2$g$, multiple frame memory 3$g$, e.g., frame memory 3$g$-T and 3$g$-T-1, a readout unit 4$g$, a control unit 100$g$, a plane separation unit 110$g$, and a plane information buffer 120. A description is made regarding only the differences.

The memory 2$g$ has a predetermined number of elements 20$f$, e.g., 5×5 elements 20$f$. The plane separation unit 110$g$ performs plane separation processing for the reference region tr of the image data stored in the frame memory 3$g$-T-1, e.g., for each reference region tr with the size of 5×5, based upon the pixels within the reference region tr, and outputs the plane information from the results of processing to the plane information buffer 120.

Note that the plane separation unit 110 is not restricted to the above-described arrangement. An arrangement may be made wherein the plane separation unit 110$g$ performs plane separation processing for the image stored in the frame memory 3$g$-T-1 based upon the image data stored in the frame memory 3$g$-T-1, and outputs the plane information from the results of processing to the plane information buffer 120.

The plane information buffer 120 stores the pixels with the entire screen size output from the plane separation unit 110$g$, for example. An arrangement may be made wherein the plane information buffer 120 stores the plane information for each reference region tr of 5×5 output from the plane separation unit 110$g$ in a predetermined position (address), for example. The plane information buffer 120 outputs the plane information at a predetermined position (address) to the memory 2$g$, and makes the plane information storage unit 29 of the corresponding element 20$f$ of the memory 2$g$ store the plane information.

The control unit 100$g$ performs the predetermined processing according to the above-described processing, for example. Furthermore, the control unit 100$g$ controls the frame memory 3$g$, memory 2$g$, and the like, perform writing processing, readout processing, and the like, for the predetermined data, according to the above-described processing. The operations of the image processing device having the above-described configuration will be described only regarding the difference.

The plane separation unit 110$g$ performs plane separation processing for the reference region tr of the image data stored in the frame memory 3$g$-T-1, e.g., for each reference region tr with the size of 5×5, based upon the pixels within the reference region tr, outputs the plane information from the results of the processing to the plane information buffer 120, and the plane information buffer 120 stores the plane information in a predetermined position (address).

Following the above-described processing, in the same way as with the above-described seventh embodiment, with the memory 2$g$, the pixel 21-1 stores the pixels of the reference region tr, and the 21-2 stores the pixels of the search region tp. The subtracter 24 generates the difference between the pixel stored in the pixel 21-1 and the pixel of the search region tp stored in the pixel 21-2, the absolute generating unit 25 generates the absolute-value-of-difference, which is the absolute value of the difference, and the pixel difference storage unit 22-1 stores the absolute-value-of-difference.

The switch 30 compares the plane information stored in the plane information storage unit 29 with the plane information stored in the plane information storage unit 29 of the element 20 near the element of interest, and in the event of matching, the absolute-value-of-difference stored in the pixel difference storage unit 22$f$-1 of the element 20 near the element of interest is output to the addition unit 28$f$ of the pixel of interest 28$f$.

The addition unit 28$f$ adds the absolute-value-of-differences output from the switches 30 and the absolute-value-of-difference stored in the pixel difference storage unit 22$f$-1, and outputs to the comparison updating unit.

The comparison updating unit 26$f$ compares the sum-of-difference stored in the sum-of-difference storage unit 22$f$-2 with the sum-of-difference output from the addition unit 28$f$, and in the event that the sum-of-difference output from the addition unit 28$f$ is smaller, the smaller sum-of-difference is output to the sum-of-difference storage unit 22$f$-2. The sum-of-difference storage unit 22$f$-2 stores the sum-of-difference, thereby being updated.

Furthermore, in the event that the comparison updating unit 26ƒ updates the sum-of-difference stored in the pixel difference storage unit 22ƒ-2, the comparison updating unit 26ƒ outputs the updating information which indicates that updating has been performed, to the updating unit 27.

With the updating unit 27, in the event that the comparison updating unit 26ƒ outputs the updating information that the updating has been performed, the phase information with regard to the search region tp and the reference region tr is stored in the motion vector storage unit 23. The search regions tp with all the phases within the entire search region sp are compared with the reference region tr while updating the phase of the search region tp within the search region sp, thereby generating the motion vector.

As described above, with the image processing device 1g according to the present embodiment, as compared with the image processing device 1ƒ according to the seventh embodiment, the image processing device 1g comprises the plane separation unit 110g for performing plane separation and generating the plane information based upon the image data stored in the frame memory 3g-T−1, and the plane information storage unit 29 for storing the plane information, and the images of the predetermined search region sp and reference region tr are input to the memory 2g including the element 20ƒ with the predetermined size, e.g., the size of 5×5, and only in the event that the plane information with regard to the pixel of interest matches the plane information with regard to the elements 20ƒ near the element of interest, the sum of difference stored in the sum-of-difference storage unit 22ƒ-2 is updated, and only in the event that the sum of the difference is updated, the motion vector is updated, thereby generating accurate motion vectors even in the event that there are multiple objects within the reference region tr.

Furthermore, the image processing device 1g further comprises the plane information buffer 120, and thus, the plane information with the entire screen size is stored therein, thereby enabling predetermined processing to be efficiently performed.

Ninth Embodiment

Correction of Motion Vector Using Plane Information

In a case of the block size for block matching or the area of the plane for plane matching being small, in the event that the input image contains noise, there is greater probability that errors in motion vector detection will occur for each pixel. With an image processing device 1h according to a ninth embodiment, accurate motion vectors are generated even in a case as described above, using the plane information stored in memory 2h of the image processing device 1h.

FIG. 40 is a functional block diagram that illustrates the image processing device of the ninth embodiment according to the present invention. The image processing device 1h performs detection of the motion vectors using the results of plane matching and detection of motion vectors, and the memory structure for storing the plane information.

The image processing device 1h comprises the memory 2ƒ, the multiple frame memory 3ƒ, e.g., the frame memory 3ƒ-T and 3ƒ-T−1, a readout unit 4h, a control unit 100h, a plane separation unit 110h, and a motion vector correction unit 130, as shown in FIG. 40. The memory 2ƒ of the image processing device 1h has the same structure as the memory 2ƒ of the image processing device 1ƒ according to the seventh embodiment. The image processing device 1h also performs generally the same processing as with the image processing device 1ƒ according to the seventh embodiment, such as processing wherein the plane information and motion vector are stored in the memory 2ƒ, and plane matching processing.

FIG. 41 is a diagram for describing the operations of the motion vector correction unit of the image processing device shown in FIG. 40.

The image processing device 1h outputs the motion vector with regard to a certain pixel of interest as shown in FIG. 41, at the point that the detection of motion vectors ends with the memory 2ƒ in the same way as with the image processing device 1ƒ according to the above-described seventh embodiment. A description is now made in detail.

The motion vector correction unit 130 reads out the motion vectors from only the elements within the region centered on the element of interest, e.g., a 5×5 grid-shaped region within memory, having the same plane information as the element of interest, obtains the frequency of occurrence corresponding to the motion vectors read out, and the motion vector with the highest frequency is determined as the motion vector for the element of interest.

Specifically, the motion vector correction unit 130 reads out the motion vectors stored in the motion vector storage unit 23 only from the elements having the same plane information as the plane information stored in the plane information storage unit 29 of the element of interest, for the region centered on the element of interest, e.g., a 5×5 grid-shaped region within memory, output from the readout unit 4h, obtains the frequency corresponding to the motion vectors read out, and determines the motion vector with the highest frequency to be the motion vector for the element of interest.

A description is made in brief regarding the operation of the above-described configuration. With regard to the region centered on the element of interest, e.g., a 5×5 grid-shaped region within memory, the motion vectors stored in the motion vector storage unit 23 are read out by the readout unit 4h only from the elements having the same plane information as the plane information stored in the plane information storage unit 29 of the element of interest.

The motion vector correction unit 130 obtains the frequency corresponding to the motion vectors read out, and determines the motion vector with the highest frequency to be the motion vector for the element of interest. As described above, even in the event that normal matching results in error of the motion vector of the pixel of interest, assuming that the pixels belonging to the same plane around the pixel of interest moves generally at the same velocity, the motion vector correction unit 130 calculates the motion vector regarding which there is great probability that the pixel of interest has the motion vector, thereby enabling the precision of the motion vector to be improved by substituting therewith.

Furthermore, the memory 2ƒ is provided for storing the plane information for each pixel, and thus, accurate motion vectors can be obtained even at the portion around the boundaries of multiple objects wherein detection errors readily occur in the event of obtaining the motion vector. Furthermore, the motion vector with the high frequency of occurrence is obtained for each plane within the region around the pixel of interest, and correction is performed using the motion vectors, and thus accurate motion vectors can be obtained even in the event that detection error of motion vectors readily occurs due to noise, for example.

Obviously, numerous modifications and variations of the present invention are possible in light of the above teachings. It is therefore to be understood that within the scope of the appended claims, the invention may be practiced otherwise than as specifically described herein.

What is claimed is:

1. A semiconductor storage device comprising:
 a memory including a plurality of memory elements, each memory element having a data structure that includes,
  a first pixel information portion configured to hold data indicative of a first pixel of an image block, a second pixel information portion configured to hold data indicative of a second pixel of a search region of another image block, an estimation portion configured to hold data representative of a motion estimation value between the first pixel and the second pixel, and a motion vector information portion configured to hold data representative of a motion vector between the first pixel and the second pixel.

2. The semiconductor storage device of claim 1, wherein:
said estimation portion is configured to replace another difference value with said motion estimation value when an absolute value of said motion estimation value is less than said another difference value.

3. The semiconductor storage device of claim 1, wherein:
the motion estimation value is an absolute value of a difference between the first pixel and second pixel.

4. The semiconductor storage device of claim 1, wherein:
the motion estimation value is a summation of an absolute value of a sum of differences of a plurality of pixels.

5. The semiconductor storage device of claim 1, further comprising:
an estimation value calculation mechanism configured to calculate the motion estimation value;
a comparison mechanism configured to compare the motion estimation value calculated by said estimation value calculation mechanism with a stored estimation value that is stored in said second storage portion; and
a mechanism configured to change a first motion information to a second motion information when indicated to do so by a predetermined comparison result of said comparison mechanism.

6. The semiconductor storage device of claim 1, wherein:
the second motion information being a minimal estimation value.

7. The semiconductor storage device of claim 5, wherein:
the estimation value calculation mechanism includes
a first calculation mechanism configured to calculate an absolute value of a difference between the first pixel information and the second pixel information,
a second calculation mechanism configured to calculate an absolute value of a difference between the first pixel information and third pixel information, and
a summation mechanism configured to add absolute values of differences produced by the first and second calculations mechanisms with the absolute values of differences of other elements selected by a selection mechanism, wherein
the estimation value is a summation of an absolute value of a difference of a plurality of pixels.

8. The semiconductor storage device according to claim 1, wherein said data structure of said memory further comprising:
a plane information portion that is configured to hold plane information about an object.

9. The semiconductor storage device of claim 8, wherein:
the motion estimation value is calculated from the plane information.

10. The semiconductor storage device according to claim 9, further comprising:
an estimation value calculation mechanism configured to calculate the motion estimation value according to a predetermined formula;
a comparison mechanism configured to compare the motion estimation value calculated by said estimation value calculation mechanism from the motion estimation value stored in said memory; and a mechanism configured to change a pixel value associated with a pixel determined to have moved by said comparison mechanism.

11. The semiconductor storage device according to claim 10, wherein:
the estimation value calculation mechanism includes
a first calculation section configured to calculate an absolute value of a difference between the first pixel value and second pixel value,
a selection mechanism configured to select another memory element in accordance with the plane information, and
a summation section configured to add an absolute value of a difference of a first memory element with the absolute value of a difference of the another memory element selected by said selection mechanism, and wherein the motion estimation value is a summation of an absolute value of a difference of a plurality of memory elements.

12. A semiconductor storage device comprising:
a data storage unit having portions, each of said portions including,
a first storage portion for holding pixel motion information,
a second storage portion for holding a motion estimation value, indicative of a frame-to-frame motion between pixels,
a third storage portion for holding first pixel information, and
a fourth storage portion for holding second pixel information, wherein
a first frame that includes the first pixel is different from a second frame that includes the second pixel.

13. The semiconductor storage device of claim 12, further comprising:
an estimation value calculation mechanism configured to calculate the motion estimation value;
a comparison mechanism configured to compare the motion estimation value calculated by said estimation value calculation mechanism from the motion estimation value stored in said second storage portion, and
a mechanism configured to change a pixel value associated with a pixel determined to have moved by said comparison mechanism.

14. The semiconductor storage device according to claim 13, wherein:
the motion estimation value stored in said second storage portion is a minimal motion estimation value.

15. The semiconductor storage device according to claim 14, further comprising:
a fifth storage portion configured to hold third pixel information, wherein
a third frame includes the third pixel information, said third frame being different than said first frame and said second frame.

16. The semiconductor storage device of claim 9, further comprising:
a noise addition mechanism configured to add a noise component to an input image, said input image including said first pixel information.

17. The semiconductor storage device of claim 16, further comprising:
a readout unit configured to output corresponding pixels for respective elements of different frames, said different frames being separated from one another in time;
a class code generating unit configured to receive said corresponding pixels and detect said noise component of said input image and provide a class code output; and
a normal equation addition unit configured to receive said input image, said corresponding pixels from said readout unit and said class code output, and determine a coefficient for said class code that is output by said class code generating unit, and output said coefficient to a coefficient storage device.

18. The semiconductor storage device of claim 17, further comprising:
a control unit configured to control a sequence of image data to be read out of reference regions in said different frames.

19. The semiconductor storage device of claim 9, further comprising:
a readout unit configured to output corresponding pixels for respective elements of different frames, said different frames being separated from one another in time;
a class code generating unit configured to receive said corresponding pixels and provide a class code output used in determining a prediction coefficient for said class code; and
an estimation computation unit configured to estimate a prediction value from said prediction coefficient and pixels from the respective elements of the different frames.

20. The semiconductor storage device according to claim 12, further comprising:
a class code generating unit configured to receive said corresponding pixels and provide a class code output used in determining a prediction coefficient for said class code; and
an estimation computation unit configured to estimate a prediction value from said prediction coefficient and pixels from the respective elements of the different frames.

21. The semiconductor storage device of claim 15, wherein:
the estimation computation unit includes
a first calculation mechanism configured to calculate an absolute value of a difference between the first pixel information and the second pixel information,
a second calculation mechanism configured to calculate an absolute value of a difference between the first pixel information and the third pixel information,
a selection mechanism configured to select other pixel information in accordance with plane information, and
a summation mechanism configured to add absolute values of differences produced by the first and second calculations mechanisms with the absolute values of differences of other elements selected by the selection mechanism, and wherein
the estimation value is a summation of an absolute value of a difference of a plurality of elements.

22. The semiconductor storage device of claim 21, wherein:
at least one of a memory pixel search region and memory pixel reference region being a 5×5 region.

23. The semiconductor storage device of claim 22, further comprising:
a motion vector correction unit configured to correct a motion vector based on a frequency with which motion vectors are read out.

24. The semiconductor storage device of claim 23, wherein:
said motion vector correction unit is configured to determine the motion vector to be used for characterizing pixel motion by selecting a motion vector having a highest frequency.

25. A method for processing image data for facilitating an estimation of a motion vector, comprising steps of:
storing a first pixel information in a first pixel portion of a memory element configured to hold data indicative of a first pixel of an image block;
storing a second pixel information in a second pixel portion of the memory element configured to hold data indicative of a second pixel of a search region of another image block;
storing an estimation information in an estimation portion of the memory element configured to hold data representative of a motion estimation value between the first pixel and the second pixel, and
storing motion vector information in a motion vector portion of the memory element configured to hold data representative of a motion vector between the first pixel and the second pixel;
wherein the memory element is one memory element of a plurality, and each of the memory elements has the same data structure.

26. The method of claim 25, further comprising:
replacing another difference value with said motion estimation value in said motion vector portion when an absolute value of said motion estimation value is less than said another difference value.

27. The method of claim 25, further comprising:
determining the motion estimation value by taking an absolute value of a difference between the first pixel and second pixel.

28. The method of claim 25, wherein:
determining the motion estimation value by taking a summation of an absolute value of a sum of differences of a plurality of pixels.

29. The method of claim 25, further comprising:
calculating the motion estimation value;
comparing the motion estimation value calculated in the calculating step with a stored estimation value that is stored in said second storage portion; and
changing a motion information when indicated by a comparison result of said comparing step.

30. The method according to claim 29, wherein:
the changing step includes changing said motion information to a minimal estimation value.

31. The method of claim 29, wherein:
the calculating step includes
calculating an absolute value of a difference between the first pixel information and the second pixel information,
calculating an absolute value of a difference between the first pixel information and a third pixel information, and
adding absolute values of differences produced by the calculating steps with the absolute values of differences of other elements selected by a selection mechanism, wherein
the estimation value is a summation of an absolute value of a difference of a plurality of pixels.

32. The method according to claim 25, further comprising:
storing plane information about an object in a plane information portion of the memory.

33. The method according to claim 32, further comprising:
calculating the motion estimation value from the plane information.

34. The method according to claim 33, further comprising:
calculating the motion estimation value according to a predetermined formula;
comparing the motion estimation value calculated by said estimation value calculation mechanism with the motion estimation value stored in said memory, and
changing a pixel value associated with a pixel determined to have moved in said comparing step.

35. The method according to claim 34, wherein:
the calculating the motion estimation value step includes calculating an absolute value of a difference between the first pixel and second pixel, selecting another memory element in accordance with the plane information, and adding an absolute value of a difference of a first element with the absolute value of a difference of the another memory element selected in said selecting step, and wherein the motion estimation value is a summation of an absolute value of a difference of a plurality of memory elements.

36. A method for processing image data for facilitating an estimation of a motion vector, comprising steps of:

storing in a first storage portion of a semiconductor memory pixel motion information;

storing in a second storage portion of the semiconductor memory a motion estimation value, indicative of a frame-to-frame motion between pixels, storing in a third storage portion of the semiconductor memory first pixel information, and storing in a fourth storage portion of the semiconductor memory second pixel information, wherein a first frame that includes the first pixel is different from a second frame that includes the second pixel, and the semiconductor memory is one memory element of a plurality, and each of the memory elements has the same data structure.

37. The method according to claim 36, further comprising:

calculating the motion estimation value with an estimation value calculation mechanism;

comparing the motion estimation value calculated by said estimation value calculation mechanism from the motion estimation value stored in said second storage portion; and changing a pixel value associated with a pixel determined to have moved in said comparing step.

38. The method according to claim 37, wherein:

the motion estimation value stored in said second storage portion being a minimal motion estimation value.

39. The method according to claim 38, further comprising:

storing third pixel information in a fifth storage portion of said semiconductor memory, wherein a third frame includes the third pixel information, said third frame being different than said first frame and said second frame.

40. The method according to claim 36, further comprising:

adding a noise component to an input image, said input image including said first pixel information.

41. The method according to claim 40, further comprising:

reading out corresponding pixels for respective elements of different frames, said different frames being separated from one another in time;

receiving said corresponding pixels at a class code generating unit, detecting said noise component, and providing a class code output; and determining a coefficient for said class code, and outputting said coefficient to a coefficient storage device.

42. The method according to claim 41, further comprising:

controlling a sequence of image data to be read out of reference regions in said different frames.

43. The method according to claim 36, further comprising:

outputting corresponding pixels for respective elements of different frames, said different frames being separated from one another in time;

receiving said corresponding pixels at a class code generating unit and providing a class code output used in determining a prediction coefficient for said class code; and estimating a prediction value from said prediction coefficient and pixels from the respective elements of the different frames.

44. The method according to claim 37, further comprising:

receiving said corresponding pixels at a class code generating unit and providing a class code output used in determining a prediction coefficient for said class code; and estimating a prediction value from said prediction coefficient and pixels from the respective elements of the different frames.

45. The method according to claim 44, wherein:

the estimation step includes calculating an absolute value of a difference between the first pixel information and the second pixel information, calculating an absolute value of a difference between the first pixel information and third pixel information, selecting other pixel information in accordance with plane information, adding absolute values of differences produced by the calculating steps with the absolute values of differences of other elements selected in the selecting step, and wherein the estimation value is a summation of an absolute value of a difference of a plurality of elements.

46. The method according to claim 45, wherein:

at least one of a pixel search region and a pixel reference region being a 5×5 region.

47. The method according to claim 46, further comprising:

a motion vector correction unit configured to correct a motion vector based on a frequency with which motion vectors are read out.

48. The method according to claim 47, further comprising:

determining the motion vector to be used for characterizing pixel motion by selecting a motion vector having a highest frequency.

49. An apparatus for processing image data for facilitating an estimation of a motion vector, comprising:

means for calculating motion vectors; and a memory including a plurality of memory elements, each memory element having a data structure that includes, a first pixel information portion configured to hold data indicative of a first pixel of an image block, a second pixel information portion configured to hold data indicative of a second pixel of a search region of another image block, an estimation portion configured to hold data representative of a motion estimation value between the first pixel and the second pixel, and a motion vector information portion configured to hold data representative of a motion vector between the first pixel and the second pixel.

* * * * *